(12) United States Patent
Han et al.

(10) Patent No.: US 12,232,001 B2
(45) Date of Patent: Feb. 18, 2025

(54) COMMUNICATION PROCESSING METHOD, AND COMMUNICATION PROCESSING APPARATUS AND SYSTEM

(71) Applicant: HUAWEI TECHNOLOGIES CO., LTD., Guangdong (CN)

(72) Inventors: Wenyong Han, Shenzhen (CN); Chunsheng Xie, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 408 days.

(21) Appl. No.: 17/680,504

(22) Filed: Feb. 25, 2022

(65) Prior Publication Data

US 2022/0182804 A1 Jun. 9, 2022

Related U.S. Application Data

(63) Continuation of application No. PCT/CN2020/111029, filed on Aug. 25, 2020.

(30) Foreign Application Priority Data

Aug. 28, 2019 (CN) .......................... 201910802950.9

(51) Int. Cl.
*H04W 4/50* (2018.01)
*H04W 40/02* (2009.01)
(Continued)

(52) U.S. Cl.
CPC .............. *H04W 4/50* (2018.02); *H04W 40/02* (2013.01); *H04W 40/24* (2013.01); *H04W 48/18* (2013.01); *H04W 76/12* (2018.02)

(58) Field of Classification Search
CPC ....... H04W 4/50; H04W 40/02; H04W 40/24; H04W 48/18; H04W 76/12; H04W 80/10; (Continued)

(56) References Cited

U.S. PATENT DOCUMENTS

2014/0320587 A1 10/2014 Oyman
2019/0116631 A1* 4/2019 Talebi Fard .......... H04W 80/10
(Continued)

FOREIGN PATENT DOCUMENTS

CN 101127698 A 2/2008
CN 108306998 A 7/2018
(Continued)

OTHER PUBLICATIONS

Chinese Office Action for Application No. 201910802950 dated Apr. 29, 2023, 5 pages.
(Continued)

*Primary Examiner* — Ayaz R Sheikh
*Assistant Examiner* — Louis Samara

(57) ABSTRACT

An example communication method includes a session management function (SMF) network element receiving a first application request requesting a service of a 5G virtual network (5GVN) for a first LAN in a data network. The first application request carries address segment information of the first LAN, information about a target group, and interface information of a first tunnel interface of a first local switch (LSW) in the first LAN. The SMF network element determines a first user plane function (UPF) network element that provides the service of the 5GVN and sends first routing information to the first UPF network element, where the first routing information indicates the first UPF network element to forward received first data to the first tunnel interface when a destination address of the first data is any address included in the address segment information of the first LAN.

19 Claims, 19 Drawing Sheets

(51) Int. Cl.
*H04W 40/24* (2009.01)
*H04W 48/18* (2009.01)
*H04W 76/12* (2018.01)

(58) Field of Classification Search
CPC ..... H04W 12/06; H04W 24/02; H04W 76/19; H04L 12/14; H04B 7/088
See application file for complete search history.

(56) References Cited

U.S. PATENT DOCUMENTS

| | | |
|---|---|---|
| 2019/0124561 A1 | 4/2019 | Faccin et al. |
| 2019/0174449 A1 | 6/2019 | Shan et al. |
| 2019/0215729 A1 | 7/2019 | Oyman et al. |
| 2019/0357301 A1 * | 11/2019 | Li .................. H04L 45/74 |
| 2021/0136854 A1 * | 5/2021 | Kuge ............... H04W 76/19 |
| 2021/0167920 A1 * | 6/2021 | Cha ................ H04B 7/088 |

FOREIGN PATENT DOCUMENTS

| | | | | |
|---|---|---|---|---|
| CN | 108881356 A | | 11/2018 | |
| CN | 109429270 A | | 3/2019 | |
| CN | 109600719 A | * | 4/2019 | ............ H04W 24/02 |
| CN | 109729125 A | | 5/2019 | |
| CN | 109803029 A | | 5/2019 | |
| CN | 110120988 A | | 8/2019 | |
| CN | 110121155 A | | 8/2019 | |
| CN | 111226452 A | * | 6/2020 | ............ H04W 12/06 |
| CN | 111770587 B | * | 11/2023 | ............ H04L 41/14 |
| JP | 7139522 B2 | * | 9/2022 | ............ H04L 12/14 |
| WO | 2018194971 A1 | | 10/2018 | |
| WO | WO-2018177656 A1 | * | 10/2018 | ............ H04L 41/12 |
| WO | 2018196793 A1 | | 11/2018 | |
| WO | WO-2018233419 A1 | * | 12/2018 | ......... H04L 12/1407 |
| WO | WO-2019071472 A1 | * | 4/2019 | |

OTHER PUBLICATIONS

Wen Xuhua et al., Research on Solution to 5G International Roaming Networks, Mobile Communications, Oct. 31, 2018, with an English abstract total 6 pages.
Myung-Ki Shin et al., A way forward for accommodating NFV in 3GPP 5G systems, 2017 International Conference on Information and Communication Technology Convergence (ICTC), Oct. 18-20, 2017, 3 pages.
Chinese Notice of Allowance for Application No. 201910802950.9 dated Jul. 18, 2023, 5 pages.
3GPP TS 23.501 V16.1.0: "3rd Generation Partnership Project; Technical Specification Group Services and System Aspects; System Architecture for the 5G System; Stage 2 (Release 16)", Jun. 2019, total 367 pages.
3GPP TS 32.240 V15.3.0 (Sep. 2018); 3rd Generation Partnership Project; Technical Specification Group Services and System Aspects; Telecommunication management;Charging management; Charging architecture and principles (Release 15), total 60 pages.
Nokia et al., "Introduce IMS over 5GS", 3GPP TSG-SA5 Meeting #119 S5-183570, La Jolla, US, May 14-18, 2018, total 4 pages.
Chinese Office Action for Application No. 201910802950 dated Nov. 2, 2022, 9 pages.
3GPP TR 23.734 V16.2.0 (Jun. 2019)Technical Report3rd Generation Partnership Project; Technical Specification Group Services and System Aspects; Study on enhancement of 5G System (5GS) for vertical and Local Area Network (LAN) services (Release 16), 117 pages.
PCT International Search Report for Application No. PCT/CN2020/111029 dated Aug. 25, 2020, 10 pages.

* cited by examiner

COMMUNICATION PROCESSING METHOD, AND COMMUNICATION PROCESSING APPARATUS AND SYSTEM

CROSS-REFERENCE TO RELATED APPLICATIONS

This application is a continuation of International Application No. PCT/CN2020/111029, filed on Aug. 25, 2020, which claims priority to Chinese Patent Application No. 201910802950.9, filed on Aug. 28, 2019. The disclosures of the aforementioned applications are hereby incorporated by reference in their entireties.

TECHNICAL FIELD

This application relates to communication technologies, and in particular, to a communication processing method, and a communication processing apparatus and system.

BACKGROUND

A service of a fifth generation local area network (5G LAN) or a 5G virtual network (5GVN) in a 5G mobile communication system is a service provided by a current 5G network, and is mainly applied to fields such as home communication, enterprise office, factory manufacturing, internet of vehicles, and power grid upgrades.

Two or more terminal devices in a group may communicate with each other in a 5GVN. For example, mechanical devices in a factory may form a group, and the mechanical devices in the group may send data packets to each other. In the 5GVN, a user plane function (UPF) network element is connected to a terminal device, and the UPF network element is connected to a UPF network element through an Nx interface, and is connected to one LAN in a data network through an N6 interface of a UPF network element in the 5GVN, so that the terminal device can communicate with a group member in the LAN.

It can be learned from the foregoing solution that, in the 5GVN, the UPF network element may be connected to only one LAN in the data network by using a UPF network element. When the UPF network element receives a data packet, if a destination IP address of the data packet is an IP address of a 3GPP terminal device in the group, the UPF network element forwards the data packet to the 3GPP terminal device by using the 5GVN; or if a destination IP address of the data packet is not an IP address of a 3GPP terminal device in the group, the UPF network element forwards, based on default routing information, the data packet to a UPF network element directly connected to the LAN, and then the UPF network element directly connected to the LAN forwards the data packet to the LAN. When the LAN determines, based on the destination IP address of the data packet, that a destination address of the data packet is an IP address of a terminal device in another LAN, the LAN forwards the data packet to the another LAN through a fixed network link. However, there may be no fixed network link between different LANs in the data network. Consequently, a current 5GVN technology may not satisfy a requirement of communication between different LANs in the same data network by using the 5GVN.

SUMMARY

Embodiments of this application provide a communication processing method, and a communication processing apparatus and system, to satisfy a requirement of implementing communication between different LANs in a same data network by using a 5GVN.

A first aspect of the embodiments of this application provides a communication processing method, including:

A session management function (SMF) network element receives a first application request, where the first application request is used to request to provide a service of a 5GVN for a first local area network in a data network, and the first application request carries address segment information of the first LAN, information that is about a target group and that corresponds to the first LAN, and interface information of a first tunnel interface of a first local switch (LSW) in the first local area network. Then, the SMF network element determines a first UPF network element that provides the service of the 5GVN for the first LAN. The SMF network element sends first routing information to the first UPF network element, where the first routing information includes the address segment information of the first LAN and the interface information of the first tunnel interface, the first routing information is used to indicate the first UPF network element to forward received first data to the first tunnel interface, and a destination address of the first data is any address included in the address segment information of the first LAN.

In this embodiment, when the service of the 5GVN is to be provided for the first LAN in the target group, the first routing information delivered by the SMF network element to the first UPF network element carries the address segment information of the first LAN. Therefore, the first UPF network element may forward the received first data whose destination address is any address included in the address segment information of the first LAN to the first tunnel interface based on the first routing information. Therefore, when the service of the 5GVN is to be provided for a plurality of LANs included in the target group by using the technical solutions of this application, a UPF network element may determine a corresponding LAN based on an IP address of received data, and then forward the data to the corresponding LAN based on corresponding routing information by using the 5GVN. This implements communication between different LANs in the same data network by using the 5GVN.

In a possible implementation, the method further includes: The SMF network element determines a first online device, where the first online device is a device that is in the target group and managed by the SMF network element and that has joined the 5GVN. The SMF network element determines a second UPF network element at which the first online device is anchored. The SMF network element sends second routing information to the second UPF network element, where the second routing information is used to indicate the second UPF network element to forward received second data to the first UPF network element, and a destination address of the second data is any address included in the address segment information of the first LAN. In this possible implementation, to implement communication between the first LAN and another online group member in the target group by using the 5GVN corresponding to the target group, the SMF network element may determine the first online device, and install the second routing information on the second UPF network element at which the first online device is anchored, so that the first LAN member can perform data communication with the first online device by using the 5GVN.

In another possible implementation, the second routing information includes the address segment information of the first LAN, an internet protocol (IP) address of the first UPF network element, and a first tunnel endpoint identifier (TEID) of a second tunnel interface of the first UPF network element. In this possible implementation, a specific form of the second routing information is provided. It can be learned from the second routing information that, if the second routing information includes the address segment information of the first LAN, when the UPF network element forwards data whose destination address is the first LAN, the second routing information may be determined based on the destination address of the data, and the data may be forwarded based on the second routing information.

In another possible implementation, after the SMF network element receives the first application request, and before the SMF network element sends the second routing information to the first UPF network element, the method further includes: The SMF network element determines that the first LAN is a group member that is in the target group and that is first anchored at the first UPF network element. The SMF network element determines the first TEID of the second tunnel interface of the first UPF network element. In this possible implementation, the SMF network element may determine whether the first UPF network element has established an N19 tunnel at a group granularity with another UPF network element in the 5GVN corresponding to the target group; and if no N19 tunnel has been established, the SMF network element may indicate the first UPF network element to establish the N19 tunnel on the first UPF network element; and the first UPF network element uses the second tunnel interface as a local tunnel interface of the N19 tunnel, and then notifies the SMF network element of the first TEID of the second tunnel interface.

In another possible implementation, the first online device includes a terminal device; and before the SMF network element sends the first routing information to the first UPF network element, the method further includes: The SMF network element receives a protocol data unit (PDU) session establishment request from the terminal device. Then, the SMF network element determines the second UPF network element at which the terminal device is anchored. The SMF network element obtains an IP address of the terminal device. The SMF network element sends third routing information to the second UPF network element, where the third routing information is used to indicate the second UPF network element to forward received third data to the terminal device, and a destination address of the third data is the IP address of the terminal device. In this possible implementation, a process of providing the service of the 5GVN for the terminal device in the target group is provided: The SMF network element determines, based on the PDU session establishment request initiated by the terminal device, the second UPF network element at which the terminal device is anchored, and delivers the third routing information to the second UPF network element, so that the second UPF network element forwards the third data to the terminal device.

In another possible implementation, the third routing information includes the IP address of the terminal device and interface information of a third tunnel interface that is on the second UPF network element and that is connected to the terminal device. In this possible implementation, a specific form of the third routing information is provided.

In another possible implementation, the first online device includes a second LAN in the data network; and before the SMF network element sends the first routing information to the first UPF network element, the method further includes: First, the SMF network element receives a second application request, where the second application request is used to request to provide the service of the 5GVN for the second LAN in the data network, where the second application request carries address segment information of the second LAN, the information that is about the target group and that corresponds to the second LAN, and interface information of a fourth tunnel interface of a second LSW in the second LAN. The SMF network element sends fourth routing information to the second UPF network element, where the fourth routing information is used to indicate the second UPF network element to forward received fourth data to the fourth tunnel interface, a destination address of the fourth data is any address included in the address segment information of the second LAN, and the fourth routing information includes the address segment information of the second LAN and the interface information of the fourth tunnel interface. In this possible implementation, a process of providing the service of the 5GVN for the second LAN member in the target group is provided: The SMF network element receives the second application request, and then delivers the fourth routing information to the second UPF network element, so that the second UPF network element forwards the fourth data to the second LSW in the second LAN based on the fourth routing information.

In another possible implementation, the method further includes: First, the SMF network element determines a second online device, where the second online device is a device that is in the target group and managed by the SMF network element and that has joined the 5GVN. Then, the SMF network element determines a third UPF network element at which the second online device is anchored. The SMF network element sends fifth routing information to the third UPF network element, where the fifth routing information is used to indicate the third UPF network element to forward received fifth data to the second UPF network element, and a destination address of the fifth data is any address included in the address segment information of the second LAN. In this possible implementation, to implement communication between the second LAN and another online group member in the target group by using the 5GVN corresponding to the target group, the SMF network element may determine the second online device, and install the fifth routing information on the third UPF network element at which the second online device is anchored, so that the second LAN member can perform data communication with the second online device by using the 5GVN.

In another possible implementation, that an SMF network element receives a first application request includes: The SMF network element receives the first application request sent by a network exposure function (NEF) network element, where the first application request further includes a first data network access identifier (DNAI) of the first LAN. That the SMF network element determines a first UPF network element that provides the service of the 5GVN for the first LAN includes: The SMF network element determines the first UPF network element based on the first DNAI. The method further includes: The SMF network element determines interface information of a fifth tunnel interface that is on the first UPF network element and that is connected to the first LSW in the first LAN. The SMF network element sends a first application response to the NEF network element, where the first application response includes the interface information of the fifth tunnel interface. In this possible implementation, in a system architecture in single-SMF network element mode, the SMF network element may determine, based on the first application request sent by the NEF network element, that the service of the 5GVN is to be provided for the first LAN member, and determine, from the first application request, the address segment information of the first LAN member and attribute information of the target group to which the first LAN belongs, for example, the first DNAI of the first LAN and an ID of a slice.

In another possible implementation, that an SMF network element receives a first application request includes: The SMF network element receives the first application request sent by a management device, where the first application request further includes a first DNAI of the first LAN. That the SMF network element determines a first UPF network element that provides the service of the 5GVN for the first LAN includes: The SMF network element determines the first UPF network element based on the first DNAI. The method further includes: The SMF network element sends a first application response to the management device, where the first application response includes interface information of a fifth tunnel interface that is on the first UPF network element and that is connected to the first LSW in the first LAN. In this possible implementation, in a system architecture in multi-SMF network element mode, the SMF network element may determine, based on the first application request sent by the management device, that the service of the 5GVN is to be provided for the first LAN member, and determine, from the first application request, the address segment information of the first LAN member and attribute information of the target group to which the first LAN belongs, for example, the first DNAI of the first LAN and an ID of a slice.

A second aspect of the embodiments of this application provides a communication processing method, including:

A first UPF network element receives first routing information that is sent by an SMF network element for a target group, where the first routing information includes address segment information of a first LAN in a data network and interface information of a first tunnel interface of a first LSW in the first LAN, the first routing information is used to indicate the first UPF network element to forward received first data to the first tunnel interface, a destination address of the first data is any address included in the address segment information of the first LAN, and the target group is a group to which the first LAN belongs. Then, the first UPF network element determines a first group session corresponding to the target group. The first UPF network element installs the first routing information in the first group session. In this possible implementation, after the SMF network element determines that the first LAN is anchored at the first UPF network element, the first UPF network element may receive the first routing information sent by the SMF network element, determine the first group session corresponding to the target group, and then install the first routing information in the first group session, so that the first UPF network element may forward the first data to the first tunnel interface based on the first routing information. This implements communication between group members in the target group by using a 5GVN.

In a possible implementation, the method further includes: The first UPF network element receives fifth routing information sent by the SMF network element for the target group, where the fifth routing information is used to indicate the first UPF network element to forward received fifth data to a second UPF network element, and a destination address of the fifth data is any address in address segment information of a second LAN in the data network. The first UPF network element determines the first group session corresponding to the target group. The first UPF network element installs the fifth routing information in the first group session. In this possible implementation, the first UPF network element receives the fifth routing information sent by the SMF network element, and then installs the fifth routing information in the first group session, so that the first UPF network element can forward the fifth data whose destination address is the second LAN member to the second UPF network element, and then the second UPF network element forwards the fifth data to a fourth tunnel interface. This implements data communication between group members in the target group by using the 5GVN.

In another possible implementation, the fifth routing information includes the address segment information of the second LAN, an IP address of the second UPF network element, and a second TEID of a sixth tunnel interface of the second UPF network element. In this possible implementation, a specific form of the fifth routing information is provided.

In another possible implementation, after the first UPF network element installs the fifth routing information in the first group session, the method further includes: The first UPF network element receives, through a fifth tunnel interface of the first UPF network element, the fifth data sent by a first terminal device in the first LAN. The first UPF network element determines that the fifth data corresponds to the fifth routing information. The first UPF network element forwards the fifth data to the second UPF network element based on the fifth routing information. In this possible implementation, the first UPF network element may forward the fifth data to the second UPF network element through the fifth tunnel interface of the first UPF network element based on the fifth routing information, and then the second UPF network element forwards the fifth data to the fourth tunnel interface. This implements data communication between group members in the target group by using the 5GVN.

In another possible implementation, the first routing information further includes a first TEID of the fifth tunnel interface of the first UPF network element; and before the first UPF network element determines the first group session corresponding to the target group, the method further includes: The first UPF network element allocates the first group session to the first UPF network element. The first UPF network element allocates the first TEID to the fifth tunnel interface of the first UPF network element. In this possible implementation, when the first LAN member is a group member that is first anchored at the first UPF network element, the first UPF network element may allocate the first group session to the target group, establish an N19 tunnel between the first UPF network element and another UPF network element in the 5GVN corresponding to the target group, and use the fifth tunnel interface as a local tunnel interface of the N19 tunnel.

A third aspect of the embodiments of this application provides a communication processing method, including:

A management device sends a first application request to a first SMF network element, where the first application request is used to request to provide a service of a 5GVN for a first LAN in a data network, and the first application request carries address segment information of the first LAN, information that is about a target group and that corresponds to the first LAN, and interface information of a first tunnel interface of a first LSW in the first LAN. The management device receives a first application response sent by the first SMF network element, where the first application response is used to indicate that establishment of first routing information in a first group session of the target group on a first UPF network element is completed, the first routing information is used to indicate the first UPF network element to forward received first data to the first tunnel interface, a destination address of the first data is any address included in the address segment information of the first LAN, the first application response carries the address segment information of the first LAN and interface information of a fifth tunnel interface that is on the first UPF network element and that is connected to the first tunnel interface, and the first UPF network element is a UPF network element determined by the first SMF network element and connected to the first tunnel interface. That is, the first UPF network element is a UPF network element at which a group member in the first LAN is anchored. In other words, all group members in the first LAN communicate with other group members in the target group by using the first UPF network element, and communication data between all the group members in the first LAN and the other group members in the target group needs to pass through the first UPF network element. In this possible implementation, in a system architecture with multi-SMF network element mode, the management device may deliver the first application request to the first SMF network element, so that the first SMF network element determines, from UPF network elements managed by the first SMF network element, the first UPF network element that provides the service of the 5GVN for the first LAN and then delivers the first routing information to the first UPF network element, the first UPF network element may forward the first data to the first LAN based on the first routing information, and then the first SMF network element may feed back the first application response to the management device, to notify the management device that installation of the first routing information in the first group session on the first UPF network element is completed. The management device may be a group service management function (GSMF) network element, a controller, or the like.

In another possible implementation, the method further includes: The management device receives second routing information sent by the first SMF network element. The management device sends the second routing information to a second SMF network element, where the second routing information is used to indicate a second user plane function network element at which a first online device in the target group is anchored to forward received second data to the first UPF network element, a destination address of the second data is any address included in the address segment information of the first LAN, and the first online device is a device that is in the target group and managed by the second SMF network element and that has joined the 5GVN. In this possible implementation, the management device may send the second routing information to the second SMF network element, so that the second SMF network element determines the second UPF network element at which the first online device in the target group is anchored and installs the second routing information on the second UPF network element, the second UPF network element forwards the second data to the first UPF network element based on the second routing information, and then the first UPF network element forwards the second data to the first tunnel interface.

In another possible implementation, the method further includes: The management device sends a second application request to the second SMF network element, where the second application request is used to request to provide the service of the 5GVN for a second LAN in the data network, and the second application request carries address segment information of the second LAN, the information that is about the target group and that corresponds to the second LAN, and interface information of a fourth tunnel interface of a second LSW in the second LAN. The management device receives a second application response sent by the second SMF network element, where the second application response is used to indicate that installation of fourth routing information in a second group session of the target group on the second UPF network element is completed, the fourth routing information is used to indicate the second UPF network element to forward received fourth data to the fourth tunnel interface, a destination address of the fourth data is any address included in the address segment information of the second LAN, the second application response carries interface information of a seventh tunnel interface that is on the second UPF network element and that is connected to the fourth tunnel interface, and the second UPF network element is a UPF network element determined by the second SMF network element and connected to the fourth tunnel interface. That is, the second UPF network element is a UPF network element at which a group member in the second LAN is anchored. In other words, all group members in the second LAN communicate with other group members in the target group by using the first UPF network element, and communication data between all the group members in the second LAN and the other group members in the target group needs to pass through the second UPF network element. In this possible implementation, a specific implementation of providing the service of the 5GVN for the second LAN in the target group is provided, and a process of providing the service of the 5GVN for the second LAN is similar to a process of providing the service of the 5GVN for the first LAN.

In another possible implementation, before the management device sends the first application request to the first SMF network element, the method further includes: The management device obtains a third application request, where the third application request is used to request to provide the service of the 5GVN for the first LAN in the data network, and the third application request carries the address segment information of the first LAN, the information that is about the target group and that corresponds to the first LAN, and the interface information of the first tunnel interface of the first LSW in the first LAN. In this possible implementation, the management device may obtain the third application request used to request to provide the service of the 5GVN for the first LAN, and then determine the address segment information of the first LAN, the information that is about the target group and that corresponds to the first LAN, the interface information of the first tunnel interface of the first LSW in the first LAN, and the like based on the third application request. Then, the management device may send the first application request to the first SMF network element, to request the first SMF network element to select the first UPF network element from the UPF network elements managed by the first SMF network element, to provide the service of the 5GVN for the first LAN.

In another possible implementation, that the management device obtains a third application request includes: The management device receives the third application request sent by an NEF network element. After the management device sends the first application request to the first SMF network element, the method further includes: The management device determines the interface information of the fifth tunnel interface. The management device sends a third application response to the NEF network element, where the third application response carries the interface information of the fifth tunnel interface. In this possible implementation, the management device determines, based on the third application request sent by the NEF network element, that the service of the 5GVN is to be provided for the first LAN, and determines, from the third application request, the address segment information of the first LAN and attribute information of the target group to which the first LAN belongs, for example, a first DNAI of the first LAN and an ID of a slice.

A fourth aspect of the embodiments of this application provides a communication processing system. The communication processing system includes:

- an SMF network element, configured to: receive a first application request, where the first application request is used to request to provide a service of a 5GVN for a first local area network in a data network, and the first application request carries address segment information of the first LAN, information that is about a target group and that corresponds to the first LAN, and interface information of a first tunnel interface of a first LSW in the first local area network; determine a first UPF network element that provides the service of the 5GVN for the first local area network; and send first routing information to the first UPF network element, where the first routing information includes the address segment information of the first LAN and the interface information of the first tunnel interface, the first routing information is used to indicate the first UPF network element to forward received first data to the first tunnel interface, and a destination address of the first data is any address included in the address segment information of the first LAN; and
- a first UPF network element, configured to: receive the first routing information that is sent by the SMF network element for the target group, where the target group is a group to which the first LAN belongs; determine a first group session corresponding to the target group; and install the first routing information in the first group of sessions, where the target group is a group to which the first LAN belongs.

In this possible implementation, a communication processing system is provided. The communication processing system has a system architecture in single-SMF mode. That is, one SMF network element manages all group members. This implementation describes the following: When the service of the 5GVN is to be provided for the first LAN member in the target group, the SMF network element allocates, to the first LAN, the first UPF network element at which the first LAN is anchored, and delivers the first routing information to the first UPF network element for anchoring. Then, the first UPF network element installs the first routing information in the first group session corresponding to the target group.

In a possible implementation, the communication processing system further includes a second UPF network element.

The SMF network element is further configured to: determine a first online device, where the first online device is a device that is in the target group and managed by the SMF network element and that has joined the 5GVN; determine the second UPF network element at which the first online device is anchored; and send second routing information to the UPF network element, where the second routing information is used to indicate the second UPF network element to forward received second data to the first UPF network element, and a destination address of the second data is any address included in the address segment information of the first LAN.

The second UPF network element is configured to: receive the second routing information that is sent by the SMF network element for the target group; determine, on the second UPF network element, a second group session corresponding to the target group; and install the second routing information in the second group session.

In this possible implementation, in the system architecture in the single-SMF network element mode, to enable the first LAN to perform data communication with another online group member in the target group by using the 5GVN corresponding to the target group, the SMF network element delivers the second routing information to the second UPF network element at which the first online device in the target group is anchored, so that the second UPF network element installs the second routing information in the second group session corresponding to the target group; and the second UPF network element may forward the second data whose destination address is the first LAN to the first UPF network element based on the second routing information. This implements communication between the first LAN and the another online member in the target group by using the 5GVN.

In another possible implementation, the second routing information includes the address segment information of the first LAN, an IP address of the first UPF network element, and a first TEID of a second tunnel interface of the first UPF network element.

In another possible implementation, the SMF network element is further configured to: determine that the first LAN is a group member that is in the target group and that is first anchored at the first UPF network element; and determine the first TEID of the second tunnel interface of the first UPF network element. In this possible implementation, the SMF network element may determine whether the first UPF network element has established an N19 tunnel at a group granularity with another UPF network element in the 5GVN corresponding to the target group; and if no N19 tunnel has been established, the SMF network element may indicate the first UPF network element to establish the N19 tunnel on the first UPF network element; and the first UPF network element uses the second tunnel interface as a local tunnel interface of the N19 tunnel, and then notifies the SMF network element of the first TEID of the second tunnel interface.

In another possible implementation, the first online device includes a terminal device. The SMF network element is further configured to: receive a PDU session establishment request from the terminal device; determine the second UPF network element at which the terminal device is anchored; obtain an IP address of the terminal device; and send third routing information to the second UPF network element, where the third routing information is used to indicate the second UPF network element to forward received third data to the terminal device, and a destination address of the third data is the IP address of the terminal device.

The second UPF network element is configured to: receive the third routing information sent by the SMF network element; and install the third routing information in an N4 session of the terminal device.

In this possible implementation, in the system architecture in the single-SMF network element mode, the 3GPP terminal device in the target group may join the 5GVN in a process of initiating the PDU session establishment request to the SMF network element; after receiving the PDU session establishment request from the terminal device, the SMF network element may determine the second UPF network element at which the terminal device is anchored, and deliver the third routing information to the second UPF network element; and then the second UPF network element installs the third routing information in the N4 session of the terminal device.

In another possible implementation, the third routing information includes the IP address of the terminal device and interface information of a third tunnel interface that is on the second UPF network element and that is connected to the terminal device.

In another possible implementation, the first online device includes a second LAN in the data network. The SMF network element is further configured to: receive a second application request, where the second application request is used to request to provide the service of the 5GVN for the second LAN in the data network, and the second application request carries address segment information of the second LAN, the information that is about the target group and that corresponds to the second LAN, and interface information of a fourth tunnel interface of a second LSW in the second LAN; and send fourth routing information to the second UPF network element, where the fourth routing information is used to indicate the second UPF network element to forward received fourth data to the fourth tunnel interface, a destination address of the fourth data is any address included in the address segment information of the second LAN, and the fourth routing information includes the address segment information of the second LAN and the interface information of the fourth tunnel interface.

The second UPF network element is configured to: receive the fourth routing information that is sent by the SMF network element for the target group; determine the second group session; and install the fourth routing information in the second group session. In this possible implementation, in the system architecture in the single-SMF network element mode, a process of providing the service of the 5GVN for the second LAN is provided, and the process is similar to a process of providing the service of the 5GVN for the first LAN. To be specific, the SMF network element determines the second UPF network element that provides the service of the 5GVN for the second LAN, and delivers the fourth routing information to the second UPF network element; and then the second UPF network element installs the fourth routing information in the second group session corresponding to the target group, so that the second UPF network element can forward the fourth data to the fourth tunnel interface based on the fourth routing information.

A fifth aspect of the embodiments of this application provides a communication processing system. The communication processing system includes a management device, a first SMF network element, and a first UPF network element.

The management device is configured to: receive a third application request, where the third application request is used to request the management device to provide a service of a 5GVN for a first LAN in a data network and determine the first UPF network element that provides the service of the 5GVN for the first LAN, and the third application request carries address segment information of the first LAN, information that is about a target group and that corresponds to the first LAN, and interface information of a first tunnel interface of a first LSW in the first LAN; and send a first application request to the first SMF network element, where the first application request is used to request the first SMF network element to provide the service of the 5GVN for the first LAN in the data network and determine the first UPF network element that provides the service of the 5GVN for the first LAN, and the first application request carries the address segment information of the first LAN, the information that is about the target group and that corresponds to the first LAN, and the interface information of the first tunnel interface of the first LSW in the first LAN.

The first SMF network element is configured to: receive the first application request sent by the management device; determine the first UPF network element that provides the service of the 5GVN for the first LAN; and send first routing information to the first UPF network element, where the first routing information is used to indicate the first UPF network element to forward received first data to the first tunnel interface, and a destination address of the first data is any address included in the address segment information of the first LAN.

The first UPF network element is configured to: receive the first routing information that is sent by the first SMF network element for the target group; determine a first group session corresponding to the target group; and install the first routing information in the first group session.

The management device is further configured to receive a first application response sent by the first SMF network element, where the first application response is used to indicate that installation of the first routing information in the first group session of the target group on the first UPF network element is completed, and the first application response carries interface information of a fifth tunnel interface that is on the first UPF network element and that is connected to the first tunnel interface.

In this possible implementation, in a system architecture in multi-SMF network element mode, group members in the target group may be managed by different SMF network elements, and the management device is deployed in a network and responsible for managing information about all group members in the target group. When the management device needs to provide the service of the 5GVN for a group member, for example, when the management device needs to provide the service of the 5GVN for the first LAN member, the management device may select the first SMF network element for the first LAN according to a specific rule; the first SMF network element may determine the first UPF network element at which the first LAN is anchored, and then deliver the first routing information to the first UPF network element, so that the first UPF network element installs the first routing information.

In a possible implementation, the communication processing system further includes a second SMF network element and a second UPF network element.

The management device is further configured to: receive second routing information sent by the first SMF network element; and send the second routing information to the second SMF network element, where the second routing information is used to indicate the second UPF network element at which a first online device in the target group is anchored to forward received second data to the first UPF network element, a destination address of the second data is any address included in the address segment information of the first LAN, and the first online device is a device that is in the target group and managed by the second SMF network element and that has joined the 5GVN.

The second SMF network element is configured to: receive the second routing information sent by the management device; determine the first online device; determine the second UPF network element at which the first online device is anchored; and send the second routing information to the second UPF network element.

The second UPF network element is configured to: receive the second routing information that is sent by the second SMF network element for the target group; determine, on the second UPF network element, a second group session corresponding to the target group; and install the second routing information in the second group session. To enable the first LAN to perform data communication with another online group member in the target group by using the 5GVN corresponding to the target group, the first SMF network element may send the second routing information to the management device; then, the management device may deliver the second routing information to the second SMF network element, so that the second SMF network element determines the first online device in the target group, and delivers the second routing information to the second UPF network element at which the first online device is anchored; and the second UPF network element may forward the second data to the first UPF network element based on the second routing information. This implements communication between the first LAN and another online device in the target group by using the 5GVN corresponding to the target group.

In another possible implementation, the second routing information includes the address segment information of the first LAN, an IP address of the first UPF network element, and a first TEID of a second tunnel interface of the first UPF network element.

In another possible implementation, the first SMF network element is further configured to: determine that the first LAN is a group member that is in the target group and that is first anchored at the first UPF network element; and determine the first TEID of the second tunnel interface of the first UPF network element. In this possible implementation, the first SMF network element may determine whether the first UPF network element has established an N19 tunnel at a group granularity with another UPF network element in the 5GVN corresponding to the target group; and if no N19 tunnel has been established, the first SMF network element may indicate the first UPF network element to establish the N19 tunnel on the first UPF network element; and the first UPF network element uses the second tunnel interface as a local tunnel interface of the N19, and then notifies the first SMF network element of the first TEID of the second tunnel interface.

In another possible implementation, the second SMF network element is further configured to: receive a PDU session establishment request from a terminal device; determine the second UPF network element at which the terminal device is anchored; obtain an IP address of the terminal device; and send third routing information to the second UPF network element, where the third routing information is used to indicate the second UPF network element to forward received third data to the terminal device, a destination address of the third data is the IP address of the terminal device, and the terminal device is a group member in the target group.

The second UPF network element is further configured to: receive the third routing information sent by the second SMF network element; and install the third routing information in an N4 session of the terminal device. In this possible implementation, in the system architecture in the multi-SMF network element mode, the 3GPP terminal device in the target group may join the 5GVN in a process of initiating the PDU session establishment request to the second SMF network element; after receiving the PDU session establishment request from the terminal device, the second SMF network element may determine the second UPF network element at which the terminal device is anchored, and deliver the third routing information to the second UPF network element, so that the second UPF network element can forward the third data whose destination address is the terminal device to the terminal device based on the third routing information.

In another possible implementation, the third routing information includes the IP address of the terminal device and interface information of a third tunnel interface that is on the second UPF network element and that is connected to the terminal device.

In another possible implementation, the management device is further configured to send a second application request to the second SMF network element, where the second application request is used to request to provide the service of the 5GVN for a second LAN in the data network, and the second application request carries address segment information of the second LAN, the information that is about the target group and that corresponds to the second LAN, and interface information of a fourth tunnel interface of a second LSW in the second LAN.

The second SMF network element is further configured to: receive the second application request sent by the management device; determine the second UPF network element that provides the service of the 5GVN for the second LAN; and send fourth routing information to the second UPF network element, where the fourth routing information is used to indicate the second UPF network element to forward received fourth data to the fourth tunnel interface, and a destination address of the fourth data is any address included in the address segment information of the second LAN.

The second UPF network element is further configured to: receive the fourth routing information that is sent by the second SMF network element for the target group; determine the second group session corresponding to the target group; and install the fourth routing information in the second group session.

The management device is further configured to receive a second application response sent by the second SMF network element, where the second application response is used to indicate that installation of the fourth routing information in the second group session of the target group on the second UPF network element is completed, and the second application response carries interface information of a seventh tunnel interface that is on the second UPF network element and that is connected to the fourth tunnel interface. In this possible implementation, in the system architecture in the multi-SMF network element mode, a process of providing the service of the 5GVN for the second LAN is provided, and the process is similar to a process of providing the service of the 5GVN for the first LAN. To be specific, the second SMF network element determines the second UPF network element that provides the service of the 5GVN for the second LAN, and delivers the fourth routing information to the second UPF network element; and then the second UPF network element installs the fourth routing information in the second group session corresponding to the target group, so that the second UPF network element can forward the fourth data to the fourth tunnel interface based on the fourth routing information.

A sixth aspect of the embodiments of this application provides a communication processing apparatus. The communication processing apparatus includes:

a transceiver module, configured to receive a first application request, where the first application request is used to request to provide a service of a 5GVN for a first local area network in a data network, and the first application request carries address segment information of the first LAN, information that is about a target group and that corresponds to the first LAN, and interface information of a first tunnel interface of a first LSW in the first local area network; and a processing module, configured to determine a first UPF network element that provides the service of the 5GVN for the first local area network.

The transceiver module is further configured to send first routing information to the first UPF network element, where the first routing information includes the address segment information of the first LAN and the interface information of the first tunnel interface, the first routing information is used to indicate the first UPF network element to forward received first data to the first tunnel interface, and a destination address of the first data is any address included in the address segment information of the first LAN.

In a possible implementation, the processing module is further configured to:

determine a first online device, where the first online device is a device that is in the target group and managed by the SMF network element and that has joined the 5GVN; and determine, by the SMF network element, a second UPF network element at which the first online device is anchored.

The transceiver module is further configured to:

send second routing information to the second UPF network element, where the second routing information is used to indicate the second UPF network element to forward received second data to the first UPF network element, and a destination address of the second data is any address included in the address segment information of the first LAN.

In another possible implementation, the second routing information includes the address segment information of the first LAN, an IP address of the first UPF network element, and a first TEID of a second tunnel interface of the first UPF network element.

In another possible implementation, the processing module is further configured to:

determine that the first LAN is a group member that is in the target group and that is first anchored at the first UPF network element; and determine the first TEID of the second tunnel interface of the first UPF network element.

In another possible implementation, the first online device includes a terminal device. The transceiver module is further configured to:

receive a PDU session establishment request from the terminal device.

The processing module is further configured to:

determine the second UPF network element at which the terminal device is anchored.

The transceiver module is further configured to:

obtain an IP address of the terminal device; and send third routing information to the second UPF network element, where the third routing information is used to indicate the second UPF network element to forward received third data to the terminal device, and a destination address of the third data is the IP address of the terminal device.

In another possible implementation, the third routing information includes the IP address of the terminal device and interface information of a third tunnel interface that is on the second UPF network element and that is connected to the terminal device.

In another possible implementation, the first online device includes a second LAN in the data network. The transceiver module is further configured to:

receive a second application request, where the second application request is used to request to provide the service of the 5GVN for the second LAN in the data network, and the second application request carries address segment information of the second LAN, the information that is about the target group and that corresponds to the second LAN, and interface information of a fourth tunnel interface of a second LSW in the second LAN; and send fourth routing information to the second UPF network element, where the fourth routing information is used to indicate the second UPF network element to forward received fourth data to the fourth tunnel interface, a destination address of the fourth data is any address included in the address segment information of the second LAN, and the fourth routing information includes the address segment information of the second LAN and the interface information of the fourth tunnel interface.

In another possible implementation, the processing module is further configured to:

determine a second online device, where the second online device is a device that is in the target group and managed by the communication processing apparatus and that has joined the 5GVN; and determine a third UPF network element at which the second online device is anchored.

The transceiver module is further configured to:

send fifth routing information to the third UPF network element, where the fifth routing information is used to indicate the third UPF network element to forward received fifth data to the second UPF network element, and a destination address of the fifth data is any address included in the address segment information of the second LAN.

In another possible implementation, the transceiver module is specifically configured to:

receive the first application request sent by an NEF network element, where the first application request further includes a first DNAI of the first LAN.

The processing module is specifically configured to:

determine the first UPF network element based on the first DNAI; and determine interface information of a fifth tunnel interface that is on the first UPF network element and that is connected to the first LSW in the first LAN.

The transceiver module is further configured to:

send a first application response to the NEF network element, where the first application response includes the interface information of the fifth tunnel interface.

In another possible implementation, the transceiver module is specifically configured to:

receive the first application request sent by a management device, where the first application request further includes a first DNAI of the first LAN.

The processing module is specifically configured to:

determine the first UPF network element based on the first DNAI.

The transceiver module is further configured to:

send a first application response to the management device, where the first application response includes interface information of a fifth tunnel interface that is on the first UPF network element and that is connected to the first LSW in the first LAN.

A seventh aspect of the embodiments of this application provides a communication processing apparatus. The communication processing apparatus includes:

a transceiver module, configured to: receive first routing information that is sent by an SMF network element for a target group, where the first routing information includes address segment information of a first LAN in a data network and interface information of a first tunnel interface of a first LSW in the first LAN, the first routing information is used to indicate the first UPF network element to forward received first data to the first tunnel interface, a destination address of the first data is any address included in the address segment information of the first LAN, and the target group is a group to which the first LAN belongs; and a processing module, configured to: determine a first group session corresponding to the target group; and install the first routing information in the first group session.

In a possible implementation, the transceiver module is further configured to:

receive fifth routing information that is sent by the SMF network element for the target group, where the fifth routing information is used to indicate the first UPF network element to forward received fifth data to a second UPF network element, and a destination address of the fifth data is any address in address segment information of a second LAN in the data network.

The processing module is further configured to: determine the first group session corresponding to the target group; and install the fifth routing information in the first group session.

In another possible implementation, the fifth routing information includes the address segment information of the second LAN, an IP address of the second UPF network element, and a second TEID of a sixth tunnel interface of the second UPF network element.

In another possible implementation, the transceiver module is further configured to:

receive, through a fifth tunnel interface of the communication processing apparatus, the fifth data sent by a first terminal device in the first LAN.

The processing module is further configured to determine that the fifth data corresponds to the fifth routing information.

The transceiver module is further configured to forward the fifth data to the second UPF network element based on the fifth routing information.

In another possible implementation, the first routing information further includes a first TEID of the fifth tunnel interface of the communication processing apparatus. The processing module is further configured to:

allocate the first group session to the communication processing apparatus; and allocate the first TEID to the fifth tunnel interface of the communication processing apparatus.

An eighth aspect of the embodiments of this application provides a communication processing apparatus. The communication processing apparatus includes:

a transceiver module, configured to: send a first application request to a first SMF network element, where the first application request is used to request to provide a service of a 5GVN for a first LAN in a data network, and the first application request carries address segment information of the first LAN, information that is about a target group and that corresponds to the first LAN, and interface information of a first tunnel interface of a first LSW in the first LAN; and the transceiver module, configured to: receive a first application response sent by the first SMF network element, where the first application response is used to indicate that establishment of first routing information in a first group session of the target group by the first UPF network element is completed, the first routing information is used to indicate the first UPF network element to forward received first data to the first tunnel interface, a destination address of the first data is any address included in the address segment information of the first LAN, the first application response carries interface information of a fifth tunnel interface that is on the first UPF network element and that is connected to the first tunnel interface, and the first UPF network element is a UPF network element determined by the first SMF network element and connected to the first tunnel interface, in other words, the first UPF network element is a UPF network element at which a group member in the first LAN is anchored, in other words, all group members in the first LAN communicate with other group members in the target group by using the first UPF network element, and communication data between all the group members in the first LAN and the other group members in the target group needs to pass through the first UPF network element.

In a possible implementation, the transceiver module is further configured to:

receive second routing information sent by the first SMF network element; and send the second routing information to a second SMF network element, where the second routing information is used to indicate a second user plane function network element at which a first online device in the target group is anchored to forward received second data to the first UPF network element, a destination address of the second data is any address included in the address segment information of the first LAN, and the first online device is a device that is in the target group and managed by the second SMF network element and that has joined the 5GVN.

In another possible implementation, the transceiver module is further configured to:

send a second application request to the second SMF network element, where the second application request is used to request to provide the service of the 5GVN for a second LAN in the data network, and the second application request carries address segment information of the second LAN, the information that is about the target group and that corresponds to the second LAN, and interface information of a fourth tunnel interface of a second LSW in the second LAN; and receive a second application response sent by the second SMF network element, where the second application response is used to indicate that installation of fourth routing information in a second group session of the target group on the second UPF network element is completed, the fourth routing information is used to indicate the second UPF network element to forward received fourth data to the fourth tunnel interface, a destination address of the fourth data is any address included in the address segment information of the second LAN, the second application response carries interface information of a seventh tunnel interface that is on the second UPF network element and that is connected to the fourth tunnel interface, and the second UPF network element is a UPF network element determined by the second SMF network element and connected to the fourth tunnel interface, in other words, the second UPF network element is a UPF network element at which a group member in the second LAN is anchored, in other words, all group members in the second LAN communicate with other group members in the target group by using the first UPF network element, and communication data between all the group members in the second LAN and the other group members in the target group needs to pass through the second UPF network element.

In another possible implementation, the transceiver module is further configured to:

obtain a third application request, where the third application request is used to request to provide the service of the 5GVN for the first LAN in the data network, and the third application request carries the address segment information of the first LAN, the information that is about the target group and that corresponds to the first LAN, and the interface information of the first tunnel interface of the first LSW in the first LAN.

In another possible implementation, the communication processing apparatus further includes a processing module.

The transceiver module is specifically configured to:

receive the third application request sent by an NEF network element.

The processing module is configured to:

determine the interface information of the fifth tunnel interface.

The transceiver module is specifically configured to:

send a third application response to the NEF network element, where the third application response carries the interface information of the fifth tunnel interface.

A ninth aspect of the embodiments of this application provides a communication processing apparatus. The communication processing apparatus includes a processor, a memory, an input/output device, and a bus. The memory stores computer instructions. The processor executes the computer instructions in the memory, to implement any one of the implementations of the first aspect.

In a possible implementation of the ninth aspect, the processor, the memory, and the input/output device are separately connected to the bus.

A tenth aspect of the embodiments of this application provides a communication processing apparatus. The communication processing apparatus includes a processor, a memory, an input/output device, and a bus. The memory stores computer instructions. The processor executes the computer instructions in the memory, to implement any one of the implementations of the second aspect.

In a possible implementation of the tenth aspect, the processor, the memory, and the input/output device are separately connected to the bus.

An eleventh aspect of the embodiments of this application provides a communication processing apparatus. The communication processing apparatus includes a processor, a memory, an input/output device, and a bus. The memory stores computer instructions. The processor executes the computer instructions in the memory, to implement any one of the implementations of the third aspect.

In a possible implementation of the eleventh aspect, the processor, the memory, and the input/output device are separately connected to the bus.

A twelfth aspect of the embodiments of this application provides a chip system. The chip system includes a processor and an input/output port. The processor is configured to implement the processing functions described in the communication processing method according to the first aspect. The input/output port is configured to implement the sending and receiving functions described in the communication processing method according to the first aspect.

In a possible design, the chip system further includes a memory. The memory is configured to store program instructions and data that are used to implement the functions described in the communication processing method according to the first aspect.

The chip system may include a chip, or may include a chip and another discrete component.

A thirteenth aspect of the embodiments of this application provides a chip system. The chip system includes a processor and an input/output port. The processor is configured to implement the processing functions described in the communication processing method according to the second aspect. The input/output port is configured to implement the sending and receiving functions described in the communication processing method according to the second aspect.

In a possible design, the chip system further includes a memory. The memory is configured to store program instructions and data that are used to implement the functions described in the communication processing method according to the second aspect.

The chip system may include a chip, or may include a chip and another discrete component.

A fourteenth aspect of the embodiments of this application provides a chip system. The chip system includes a processor and an input/output port. The processor is configured to implement the processing functions described in the communication processing method according to the third aspect. The input/output port is configured to implement the sending and receiving functions described in the communication processing method according to the third aspect.

In a possible design, the chip system further includes a memory. The memory is configured to store program instructions and data that are used to implement the functions described in the communication processing method according to the third aspect.

The chip system may include a chip, or may include a chip and another discrete component.

A fifteenth aspect of the embodiments of this application provides a computer-readable storage medium. The computer-readable storage medium stores computer instructions. When the computer instructions are run on a computer, the computer is enabled to perform the communication processing method according to any one of the possible implementations of the first aspect, the second aspect, or the third aspect.

A sixteenth aspect of the embodiments of this application provides a computer program product. The computer program product includes a computer program or instructions. When the computer program or instructions are run on a computer, the computer is enabled to perform the communication processing method according to any one of the possible implementations of the first aspect, the second aspect, or the third aspect.

It can be learned from the foregoing technical solutions that the embodiments of this application have the following advantages:

It can be learned from the foregoing technical solutions that, when the service of the 5GVN is to be provided for the first LAN in the target group, the first routing information delivered by the SMF network element to the first UPF network element carries the address segment information of the first LAN. Therefore, the first UPF network element may forward the received first data whose destination address is any address included in the address segment information of the first LAN to the first tunnel interface based on the first routing information. Therefore, when the service of the 5GVN is to be provided for a plurality of LANs included in the target group by using the technical solutions of this application, a UPF network element may determine a corresponding LAN based on an IP address of received data, and then forward the data to the corresponding LAN based on corresponding routing information by using the 5GVN. This implements communication between different LANs in the same data network by using the 5GVN.

DESCRIPTION OF EMBODIMENTS

Embodiments of this application provide a communication processing method, and a communication processing apparatus and system, to satisfy a requirement of implementing communication between different LANs in a same data network by using a 5GVN.

Figure 1A:
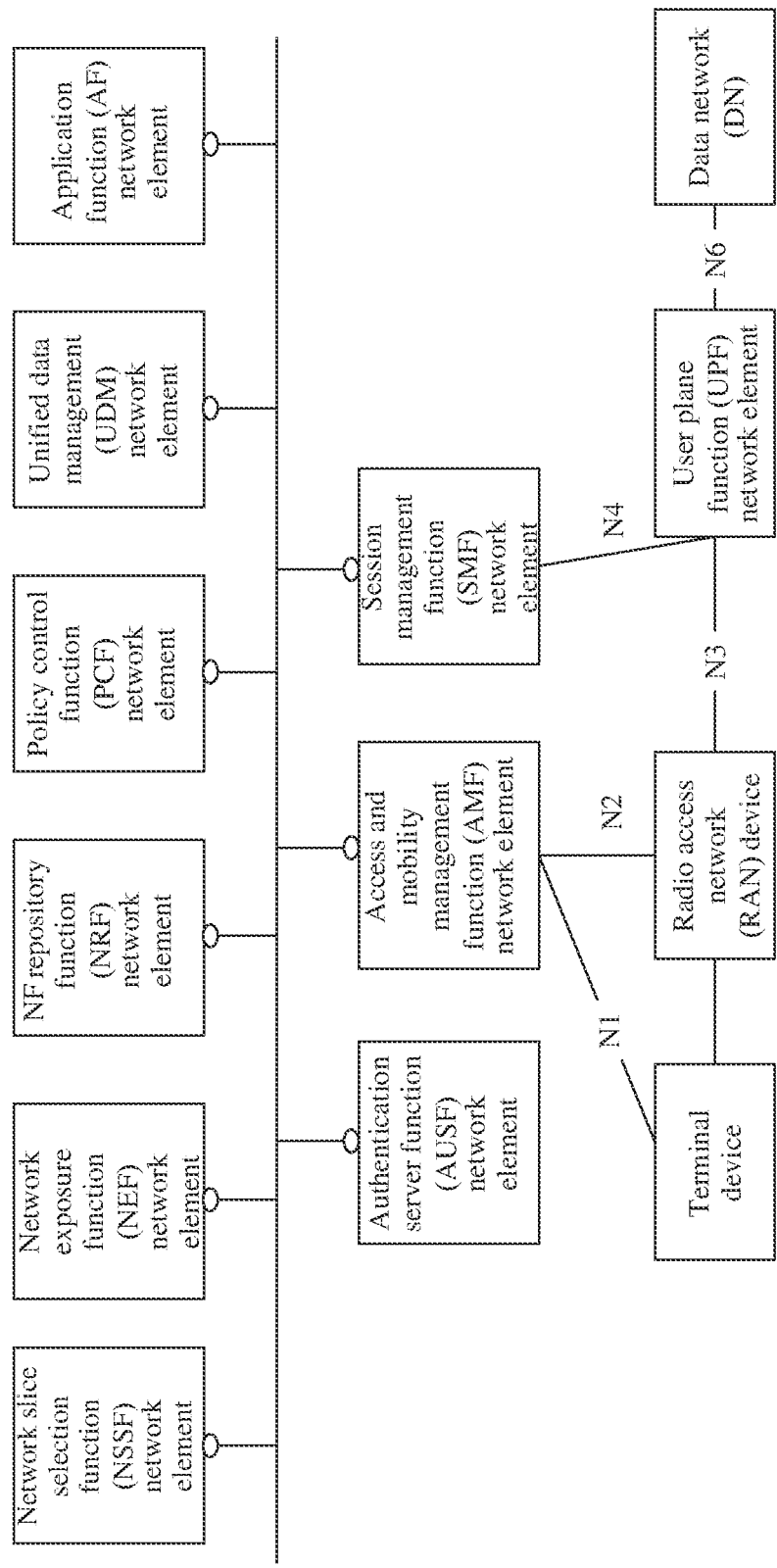
FIG. 1A is a schematic diagram of a structure of a 3rd generation partnership project network based on a 5G communication technology according to an embodiment of this application.

Refer to FIG. 1A. FIG. 1A is a schematic diagram of a structure of a 3rd generation partnership project (3GPP) network based on a 5G communication technology. The network shown in FIG. 1A mainly includes a terminal device, a radio access network (RAN) device, a data network, and core network elements. The core network elements include a UPF network element and control plane function network elements. Specifically, the control plane function network elements include but are not limited to an access and mobility management function (AMF) network element, an SMF network element, an authentication server function (AUSF) network element, an application function (AF) network element, a unified data management (UDM) network element, a policy control function (PCF) network element, a network exposure function (NEF) network element, an NF repository function (NRF) network element, and a network slice selection function (NSSF) network element.

The following describes functions of the network elements included in the network shown in FIG. 1A.

The terminal device is also referred to as user equipment (UE), a mobile station (MS), a mobile terminal (MT), or the like. The terminal device is a device having wireless transceiving function, and is ingress for interaction between a mobile user and the network. The terminal device can provide basic computing and storage capabilities, display a service window to the user, and receive an input operation of the user. In a 5G communications system, the terminal device establishes a signal connection and a data connection to the RAN device by using a new radio technology, to transmit a control signal and service data to the network.

The terminal device may be deployed on land, including an indoor device, an outdoor device, a handheld device, or a vehicle-mounted device, or may be deployed on a water surface (for example, on a ship), or may be deployed in the air (for example, on aircraft, a balloon, or a satellite). For example, the terminal device may include a mobile phone (or referred to as a "cellular" phone), a computer having a mobile terminal, a portable, pocket-sized, handheld, computer-built-in, or in-vehicle mobile apparatus, or an intelligent wearable device. For example, the terminal device is a device such as a personal communication service (PCS) phone, a cordless phone, a session initiation protocol (SIP) phone, a wireless local loop (WLL) station, or a personal digital assistant (PDA).

Alternatively, the terminal device may be a device with a limitation, for example, a device with low power consumption, a device with a limited storage capability, or a device with a limited computing capability. For example, the terminal device includes an information sensing device such as a bar code reader, a radio frequency identification (RFID) device, a sensor, a global positioning system (GPS), or a laser scanner.

By way of example and not limitation, in the embodiments of this application, an intelligent wearable device is a general term for wearable devices such as glasses, gloves, watches, clothes, and shoes that are developed by applying wearable technologies to intelligent designs of daily wear. The intelligent wearable device is a portable device that is directly worn by a user or integrated into clothes or an accessory of a user. The intelligent wearable device is not only a hardware device, but also implements a powerful function through software support, data exchange, and cloud interaction. Generalized intelligent wearable devices include full-featured and large-sized devices that can implement complete or partial functions without depending on smartphones, for example, smart watches or smart glasses, and devices that focus on only one type of application function and need to work with other devices such as smartphones, for example, various smart bands, smart helmets, or smart jewelry for monitoring physical signs.

Alternatively, the terminal device may be a virtual reality (VR) device, an augmented reality (AR) device, a wireless terminal in industrial control, a wireless terminal in self driving (driverless), a wireless terminal in remote medical surgery, a wireless terminal in a smart grid, a wireless terminal in transportation safety, a wireless terminal in a smart city, a wireless terminal in a smart home, or the like.

A RAN may be a network including a plurality of RAN devices, and implement functions such as a radio physical layer function, resource scheduling, radio resource management, radio access control, and mobility management. The RAN device is connected to the UPF network element through an N3 interface, to transmit data of the terminal device. The RAN device establishes a control plane signaling connection to the AMF network element through an N2 interface, to implement a function such as radio access bearer control.

The data network is a data network that provides a service for a user. In an actual communication process, a client is usually located on the terminal device, and a server is usually located in the data network. The data network may be a private network, for example, a LAN, may be an external network that is not managed and controlled by an operator, for example, the internet, or may be a dedicated network jointly deployed by operators, for example, a network that provides an IP multimedia subsystem (IMS) service.

The UPF network element is a function network element on a user plane, and is mainly responsible for connecting to an external network. The UPF network element performs related functions of a serving gateway (SGW) and a packet data network gateway (PDN-GW) in long term evolution (LTE). Specifically, the UPF may forward a user data packet according to a routing rule of the SMF, for example, send uplink data to the data network or another UPF network element, or forward downlink data to another UPF network element or the RAN device.

The AMF network element is responsible for access management and mobility management of the terminal device, for example, status maintenance of the terminal device, reachability management of the terminal device, forwarding of a mobility management non-access-stratum (MM NAS) message, and forwarding of a session management (SM) N2 message. In actual application, the AMF network element may implement a mobility management function of an MME in an LTE network framework, and may further implement an access management function.

The SMF network element is responsible for session management, and allocates or releases resources for a session of the terminal device. The resources include session quality of service (QoS), a session path, a routing rule, and the like. The SMF network element is also configured to manage communication between group members in a group.

The AUSF network element is configured to perform security authentication on the terminal device.

The AF network element may be a third-party application control platform, or may be a device deployed by an operator. The AF network element may provide services for a plurality of application servers.

The UDM network element may store subscription information of the terminal device.

The PCF network element is configured to perform user policy management, and is similar to a policy and charging rules function (PCRF) network element in LTE. The PCF network element is mainly responsible for policy authorization, quality of service, and generation of a charging rule, and delivering a corresponding rule to the UPF network element by using a routing rule generated by the SMF network element, to implement installation of a corresponding policy and rule.

The NEF network element is configured to expose a network function to a third party through a northbound application programming interface (API).

The NRF network element is configured to provide functions of storing and selecting network function entity information for another network element.

The NSSF network element is configured to select a network slice for the terminal device.

In the network shown in FIG. 1A, network elements related to this application mainly include the terminal device, the UPF network element, the SMF network element, the NEF network element, and the AF network element.

Figure 1B:
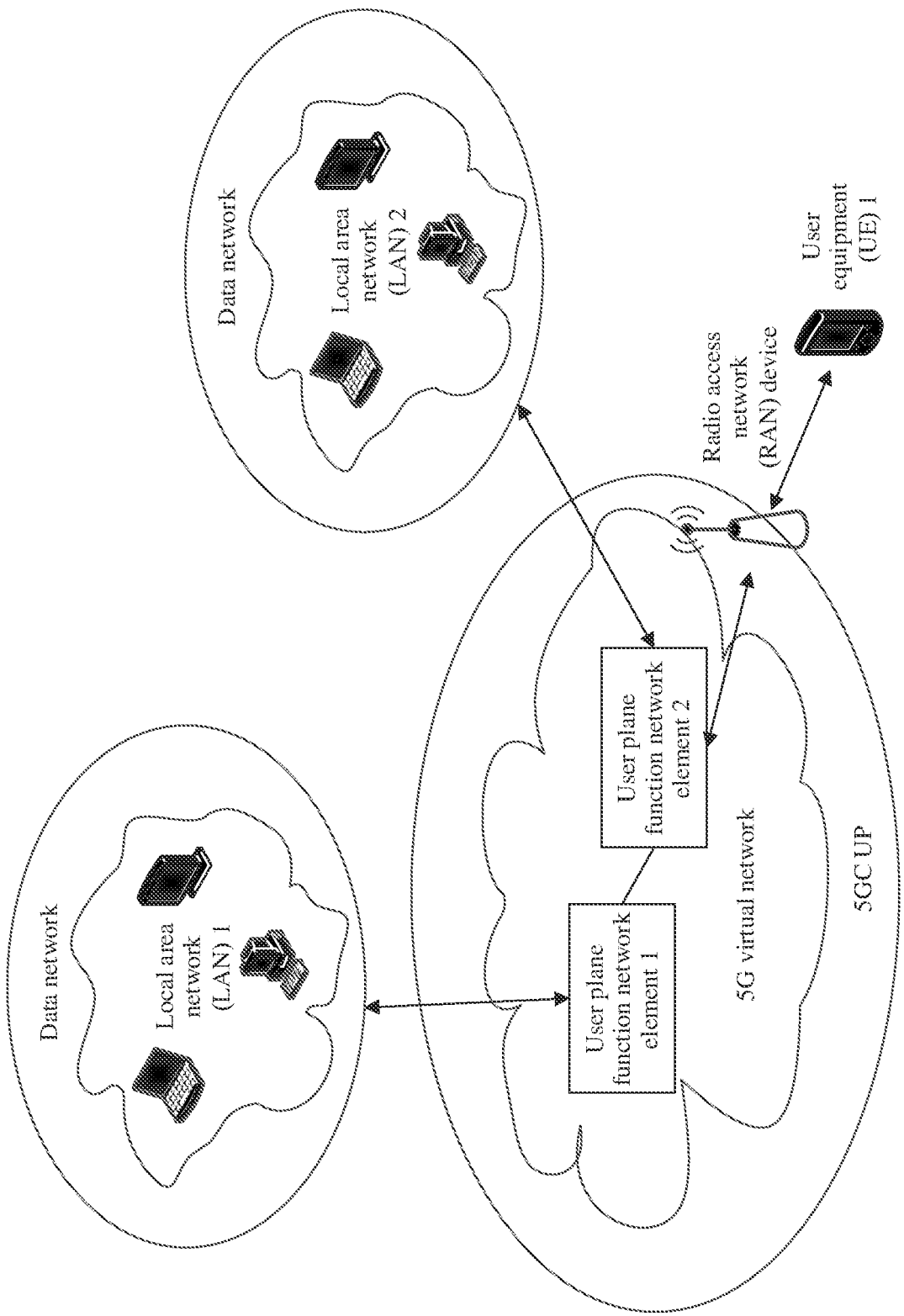
FIG. 1B is a schematic diagram of an application scenario of a communication processing method according to an embodiment of this application.

The following describes an application scenario of this application. Refer to FIG. 1B. FIG. 1B is a schematic diagram of an application scenario according to an embodiment of this application. FIG. 1B mainly shows a scenario in which a service of a 5GVN is to be provided when this application is applied to a 5G communication system, and that a terminal device is UE is used as an example for description. In FIG. 1B, UE 1, and a LAN 1 and a LAN 2 in a data network are group members in a target group. The UE is connected to a UPF 1 via a RAN device, and services of a 5GVN are to be provided for the LAN 1 and the LAN 2 by using a communication processing method in the embodiments of this application. As shown in FIG. 1B, the LAN 1 is connected to the UPF 1, and the LAN 2 is connected to a UPF 2. In this case, the 5GVN corresponding to the target group includes the UPF 1 and the UPF 2, and group members in the target group can perform data communication by using the 5GVN.

It should be noted that the quantities of UPF network elements and UEs shown in FIG. 1B are merely examples. In actual application, the 5G communication system shown in FIG. 1B may further include more terminal devices, and may include more UPF network elements. In addition, in the scenario in FIG. 1B in which the service of the 5GVN is to be provided, although the UPF network element, the UE, and the data network are shown, the content is included but not limited thereto. For example, an SMF network element and an NEF network element may be further included. This is merely an example for describing the application scenario of the communication processing method in this application.

In addition, FIG. 1A and FIG. 1B are merely intended to describe the technical solutions in the embodiments of this application more clearly, but do not constitute a limitation on the technical solutions provided in the embodiments of this application. In other words, the embodiments of this application are also applicable to a future communication network, for example, a 6G communication network or a 7G communication network, and names of the foregoing related network elements are also not limited, and may be replaced by names of network elements having same or similar functions in the future communication network. This is not limited in this application.

To help a reader understand the solutions in the embodiments of this application, the following describes some technical terms used in this application.

1. Group member: Group members include a 3GPP terminal device member and one or more LAN members in a data network. One local area network member may include one or more devices distributed in the data network, for example, a personal computer (PC). One data network may include one or more local area networks, and each local area network may include one or more device members belonging to a group. For example, one group may include UE 1, UE 2, a LAN 1, and a LAN 2. The LAN 1 includes a PC 1, a PC 2, and a PC 3, and the LAN 2 may include a PC 4 and a PC 5.

2. UPF network element for anchoring: The UPF network element for anchoring is defined at two different granularities: 1. The UPF network element for anchoring is defined at a granularity of a 3GPP terminal device. The UPF network element for anchoring is a UPF network element that is allocated by an SMF network element to the terminal device in a process in which the terminal device establishes a PDU session. To be specific, the UPF network element for anchoring is a UPF network element at which a PDU session of the terminal device is anchored, and the terminal device exchanges data with another communication object in a network by using the UPF for anchoring. 2. The UPF network element for anchoring is defined at a granularity of a LAN in a data network. The UPF network element for anchoring is a UPF network element connected to the LAN in the data network. To be specific, the UPF network element for anchoring is a UPF network element connected to the LAN through an N6 interface, and a device in the LAN may exchange data with another communication object in a network by using the UPF for anchoring.

3. Online device: The online device is a group member that is in a group and that has joined a 5GVN. Joining the 5GVN means that the group member can perform 5GVN communication with a group member in the group. For example, one UE in the group accesses a UPF 1 through an N3 interface, and communicates with another group member in the group by using the UPF 1. Alternatively, one LAN member in the group accesses a UPF 2 through an N6 interface, and communicates with another group member in the group by using the UPF 2.

4. System architecture in single-SMF network element mode: The system architecture in the single-SMF network element mode means that, in a 5G communication system, one SMF network element manages all group members, and when a service of a 5GVN is to be provided for a group member, the SMF network element is responsible for allocating a UPF for anchoring to the group member, and delivering routing information to the UPF network element for anchoring, so that the UPF network element updates a route.

5. System architecture in multi-SMF network element mode: The system architecture in the multi-SMF network element mode means that, in a 5G communication system, group members in a group may be managed by different SMF network elements, and one GSMF may be deployed in a network and responsible for managing information of all group members (for example, including a group ID corresponding to the group members and a DNAI of a group member). When the GSMF needs to provide a service of a 5GVN for a group member, the GSMF selects an SMF network element for the group member according to a specific rule, for example, a location of the group member, and then the SMF network element is responsible for allocating a UPF for anchoring to the group member, and delivering routing information to the UPF network element for anchoring, so that the UPF network element installs the routing information, and the group member has a route for data communication with another online group member.

Next, before the technical solutions of this application are described in detail in corresponding embodiments, a process in which a UPF network element updates routing information when a LAN member in a target group joins a 5GVN and a process in which a UPF network element updates routing information when a 3GPP terminal device in a target group joins a 5GVN are first separately described.

1. When a 3GPP terminal device in a target group joins a 5GVN, routing information indicating a route to the 3GPP terminal device is installed in a first N4 session on a UPF network element at which the terminal device is anchored. The N4 session is an N4 session at a level of the terminal device. The UPF network element installs routing information indicating a route to another online group member in the target group in a group session corresponding to the target group on the UPF network element, and another UPF network element in the 5GVN corresponding to the target group installs the routing information indicating the route to the terminal device in a group session corresponding to the target group on the another UPF network element, to enable the terminal device to communicate with the another online group member in the target group by using the 5GVN corresponding to the target group.

2. When a LAN member in a target group joins a 5GVN, routing information indicating a route to the LAN member is installed in a group session corresponding to the target group on a UPF network element at which the LAN member is anchored. The UPF network element installs routing information indicating a route to another online group member in the target group in a group session corresponding to the target group on the UPF network element, and another UPF network element in the 5GVN corresponding to the target group installs the routing information indicating the route to the LAN member in a group session corresponding to the target group on the another UPF network element, to enable the LAN member to communicate with the another online group member in the target group by using the 5GVN corresponding to the target group.

Figure 2A:
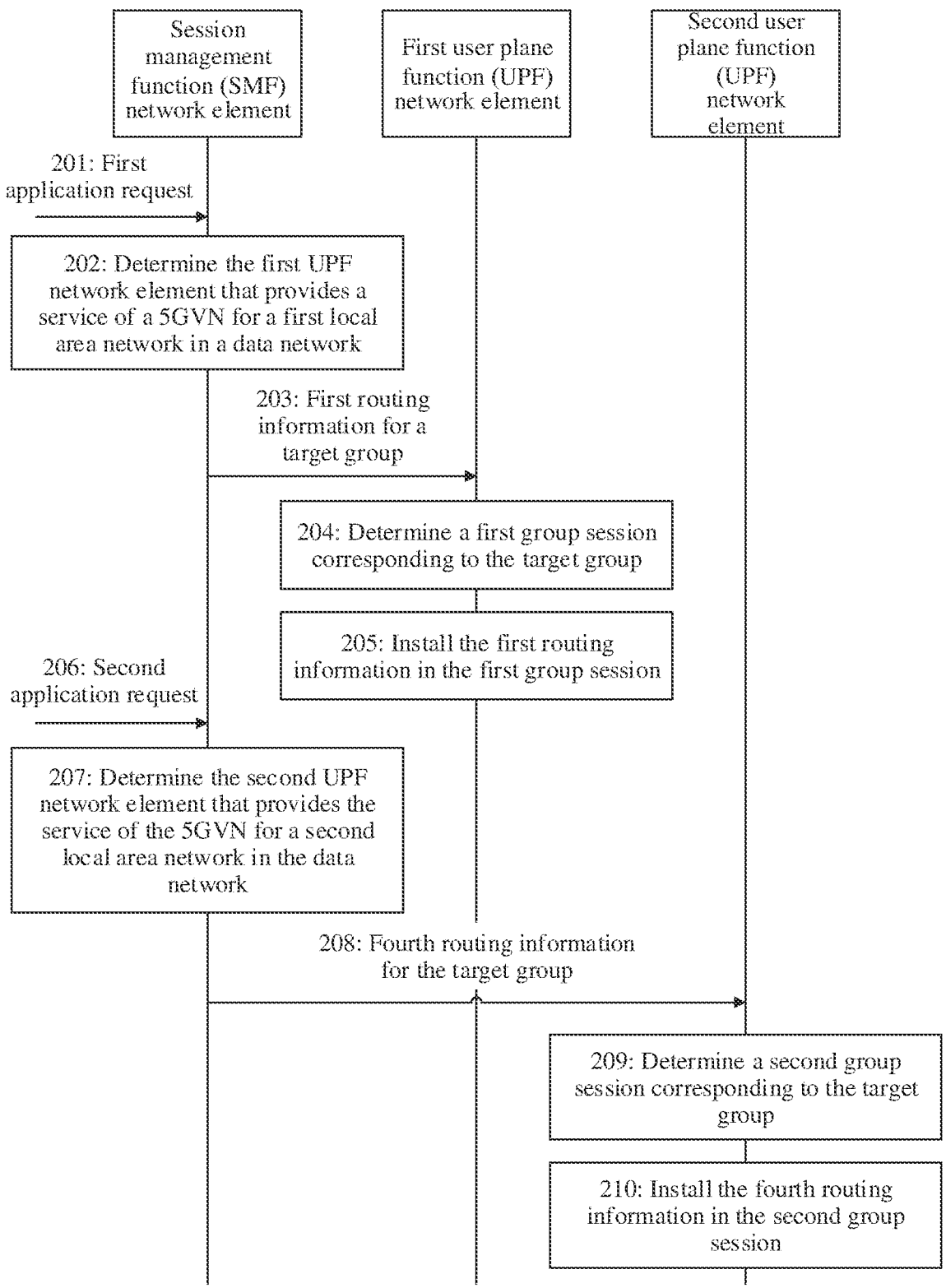
FIG. 2A is a schematic diagram of an embodiment of a communication processing method according to an embodiment of this application.

Refer to FIG. 2A. FIG. 2A is a schematic diagram of a communication processing method according to an embodiment of this application. As shown in FIG. 2A, the method includes the following steps.

201: An SMF network element receives a first application request.

The first application request is used to request to provide a service of a 5GVN for a first LAN member in a target group, the first application request carries address segment information of the first LAN, information that is about the target group and that corresponds to the first LAN, and interface information of a first tunnel interface of a first LSW in the first LAN, and the target group is a group to which the first LAN belongs. For example, as shown in FIG. 1B, address segment information of the LAN 1 may be represented as 172.167.0.0/16. To be specific, all addresses in the network segment 172.167.0.0/16 are addresses included in the LAN 1. The addresses included in the LAN 1 may alternatively be represented by using a table, as shown in Table 1. Table 1 is specifically shown as follows:

TABLE 1

| Address segment information of the LAN 1 includes: | 172.167.0.0 |
| | 172.167.0.1 |
| | 172.167.0.2 |
| | 172.167.0.3 |
| | 172.167.0.4 |

Note:
Table 1 includes only some IP addresses in the network segment corresponding to the LAN 1.

Note: Table 1 includes only some IP addresses in the network segment corresponding to the LAN 1.

Optionally, the first application request further carries attribute information of the target group, for example, an ID of a slice and a first DNAI of the first LAN. The interface information of the first tunnel interface includes an IP address of the first LSW and a tunnel identifier of the first tunnel interface.

It should be noted that the first LAN may be a group member in the target group, or the first LAN may not be a group member in the target group (in this case, the first application request is further used to request to add the first LAN to the target group).

Specifically, the SMF network element may receive the first application request in the following manners:

Manner 1: The SMF network element receives the first application request sent by an NEF network element.

Specifically, a third-party network element or an AF network element sends the first application request to the SMF network element by invoking an open interface of the NEF network element. The manner 1 is mainly applied to a system architecture in single-SMF network element mode. The SMF network element delivers routing information to a corresponding UPF network element. For details, refer to a system architecture in single-SMF network element mode shown in FIG. 2B.

Manner 2: The SMF network element receives the first application request sent by a management device.

The management device includes a group service management function (GSMF) module, a controller, or the like. The manner 2 is mainly applied to a system architecture in multi-SMF network element mode. The management device determines a corresponding SMF network element, and the SMF network element delivers routing information to a corresponding UPF network element. FIG. 2C is a schematic diagram of a system architecture in multi-SMF network element mode. In FIG. 2C, the management device is a GSMF network element.

202: The SMF network element determines a first UPF network element that provides the service of the 5GVN for the first local area network in a data network.

Optionally, the first application request carries the first DNAI of the first LAN. The SMF network element may determine, based on the first DNAI, the first UPF network element that provides the service of the 5GVN for the first LAN. That is, the first UPF network element is a first UPF network element at which a group member in the first LAN is anchored. In other words, all group members in the first LAN communicate with other group members in the target group by using the first UPF network element, and communication data between all the group members in the first LAN and the other group members in the target group needs to pass through the first UPF network element.

203: The SMF network element sends first routing information for the target group to the first UPF network element.

The first routing information is used to indicate the first UPF network element to forward received first data to the first tunnel interface, the first routing information includes the address segment information of the first LAN and the interface information of the first tunnel interface of the first LSW in the first LAN, and a destination address of the first data is any address included in the address segment information of the first LAN. For example, as shown in FIG. 1B, the address segment information of the LAN 1 includes 172.167.0.0/16, and the destination address of the first data is 172.167.0.3/32. It can be learned that the destination address of the first data is one address in the address segment information.

Optionally, the first routing information further includes interface information of a fifth tunnel interface that is on the first UPF network element and that is connected to the first tunnel interface, and the interface information of the fifth tunnel interface includes an IP address of the first UPF network element and a tunnel identifier of the fifth tunnel interface.

In this embodiment, when the first routing information carries the interface information of the fifth tunnel interface that is on the first UPF network element and that is connected to the first tunnel interface, this embodiment further includes step 203a, and step 203a is performed before step 203. Step 203a: The SMF network element determines the interface information of the fifth tunnel interface that is on the first UPF network element and that is connected to the first tunnel interface.

204: The first UPF network element determines a first group session corresponding to the target group.

Optionally, when the first LAN is a group member that is in the target group and that is first anchored at the first UPF network element, the first UPF network element allocates the first group session of the target group.

205: The first UPF network element installs the first routing information in the first group session.

Figure 2B:
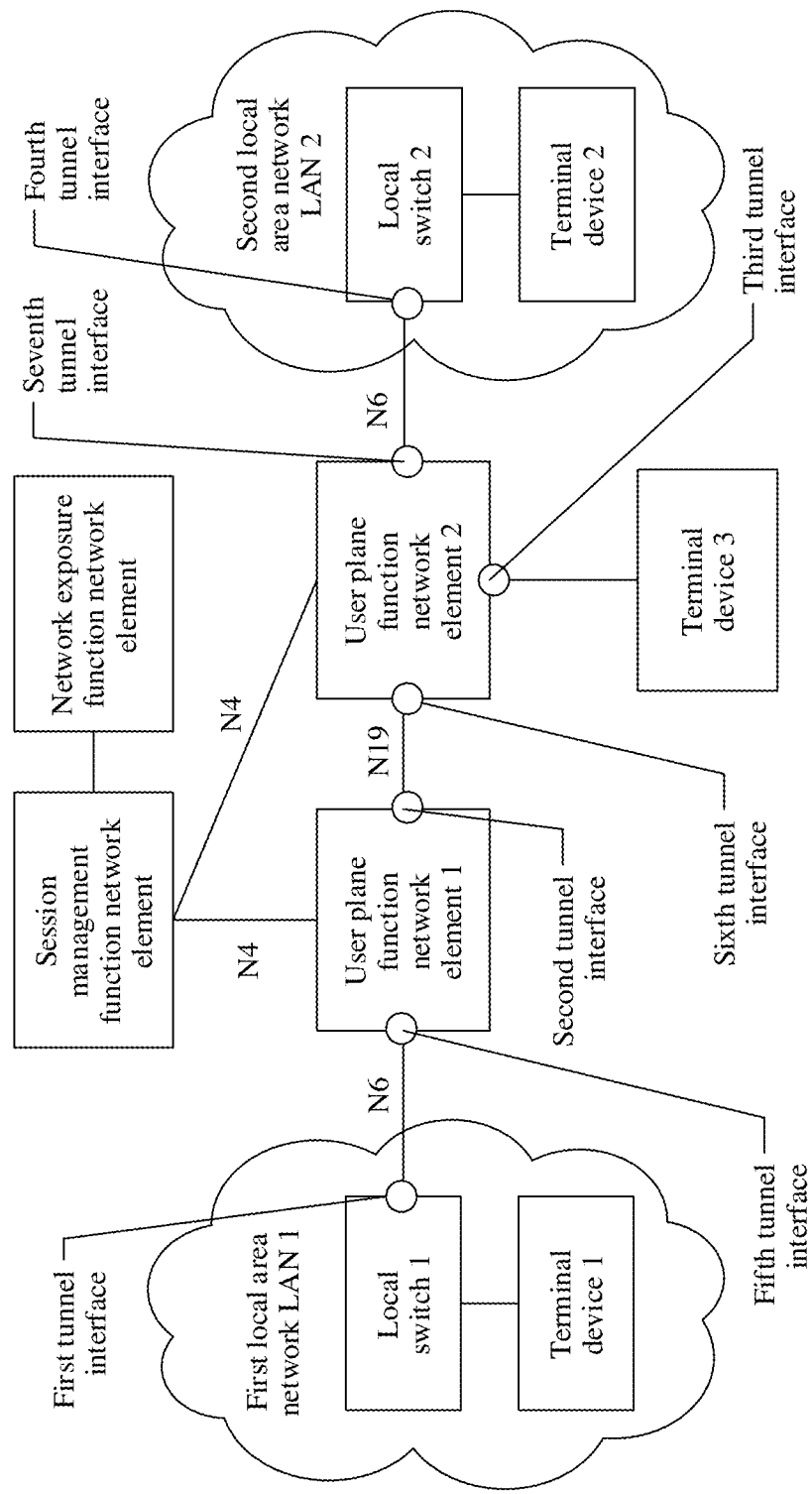
FIG. 2B is a schematic diagram of a scenario of a communication processing method according to an embodiment of this application.
Figure 2C:
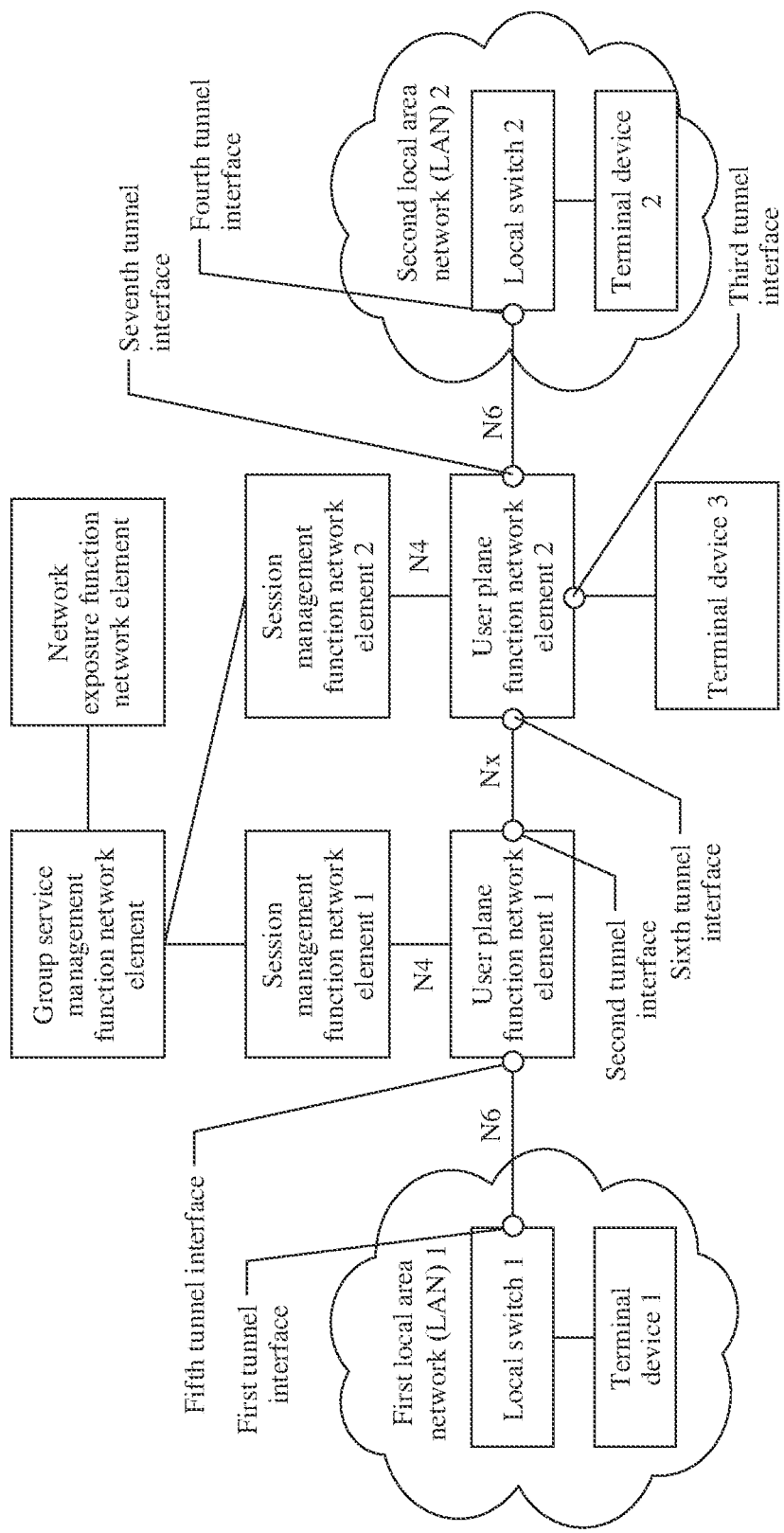
FIG. 2C is a schematic diagram of another scenario of a communication processing method according to an embodiment of this application.

For example, with reference to FIG. 2B, a UPF 1 installs the first routing information indicating a route to a LAN 1 in the first group session. Specifically, content included in the first routing information indicating the route to the LAN 1 is described in Table 2.

TABLE 2

| Group ID of the target group | Destination node | Route to the destination node |
| --- | --- | --- |
| 1 | 172.167.0.0/16 | IP address of an LSW 1, IP address of the UPF 1, tunnel identifier of a first tunnel interface, and tunnel identifier of a second tunnel interface of the UPF 1 |

The group ID of the target group is 1, the destination node is the LAN 1, and the address segment information of the LAN 1 is 172.167.0.0/16. The route to the destination node includes the IP address of the LSW 1, the IP address of the UPF 1, the tunnel identifier of the first tunnel interface, and the tunnel identifier of the second tunnel interface of the UPF 1.

In this technical solution of this application, start addresses and destination addresses of tunnels connecting UPF network elements and LANs in the target group each are different (for example, as shown in FIG. 2B, the UPF 1 is connected to the LSW 1 in the LAN 1, a UPF 2 is connected to an LSW 2 in a LAN 2, and start addresses and destination addresses of the two tunnels are different). Therefore, in this application, a virtual extensible local area network (VXLAN) tunneling technology is used to allocate a VNI to a tunnel between a UPF network element and a network device (for example, a switch) connected to a LAN in the target group, to identify the tunnel. To be specific, tunnels between network devices and UPF network elements may be identified by using a same VXLAN network identifier (VNI). For example, as shown in FIG. 2B, the VNI is used to identify a tunnel between the first tunnel interface and the fifth tunnel interface, and is also used to identify a tunnel between a fourth tunnel interface of the LSW 2 in the LAN 2 and a seventh tunnel interface of the UPF 2. It can be learned that the first routing information indicating the route to the LAN 1 may be represented as shown in Table 3:

TABLE 3

| Group ID of the target group | Destination node | Route to the destination node |
|---|---|---|
| 1 | 172.167.0.0/16 | IP address of the LSW 1 + VNI |

206: The SMF network element receives a second application request.

The second application request is used to request to provide the service of the 5GVN for a second LAN member in the target group, and the second application request carries address segment information of the second LAN, the information that is about the target group and that corresponds to the second LAN, and interface information of a fourth tunnel interface of a second LSW in the second LAN. A group to which the second LAN belongs is the same as the group to which the first LAN belongs, and both the first LAN and the second LAN belong to the target group.

Optionally, the second application request further carries attribute information of the target group, for example, the ID of the slice and a second DNAI of the second LAN. The interface information of the fourth tunnel interface includes an IP address of the second LSW and a tunnel identifier of the fourth tunnel interface.

It should be noted that the second LAN may be a group member in the target group, or the second LAN may not be a group member in the target group (in this case, the second application request is further used to request to add the second LAN to the target group). In addition, a manner in which the SMF network element receives the second application request is similar to the foregoing manner in which the SMF network element receives the first application request in step 201. Details are not described herein again.

207: The SMF network element determines a second UPF network element that provides the service of the 5GVN for the second local area network in the data network.

Optionally, the SMF network element may determine, based on the second DNAI carried in the second application request, the second UPF network element that provides the service of the 5GVN for the second LAN. That is, the second UPF network element is a UPF network element at which a group member in the second LAN is anchored. In other words, all group members in the second LAN communicate with other group members in the target group by using the second UPF network element, and communication data between all the group members in the second LAN and the other group members in the target group needs to pass through the first UPF network element.

208: The SMF network element sends fourth routing information for the target group to the second UPF network element.

The fourth routing information is used to indicate the second UPF network element to forward received fourth data to the fourth tunnel interface, the fourth routing information includes the address segment information of the second LAN and the interface information of the fourth tunnel interface of the second LSW in the second LAN, and a destination address of the fourth data is any address included in the address segment information of the second LAN. For example, as shown in FIG. 1B, the address segment information of the LAN 2 includes 172.168.0.0/16, and the destination address of the fourth data is 172.167.0.2/32. It can be learned that the destination address of the fourth data is one of addresses in the address segment information.

Optionally, the fourth routing information further carries interface information of a seventh tunnel interface that is on the second UPF network element and that is connected to the fourth tunnel interface, and the interface information of the seventh tunnel interface includes an IP address of the second UPF network element and a tunnel identifier of the seventh tunnel interface. When the fourth routing information carries the interface information of the seventh tunnel interface, this embodiment further includes step 208a, and step 208a is performed before step 208. Step 208a: The SMF network element determines the interface information of the seventh tunnel interface that is on the second UPF network element and that is connected to the fourth tunnel interface.

209: The second UPF network element determines a second group session corresponding to the target group.

Optionally, when the second LAN is a group member that is in the target group and that is first anchored at the second UPF network element, the second UPF network element allocates the second group session corresponding to the target group.

210: The second UPF network element installs the fourth routing information in the second group session.

Description is provided with reference to FIG. 2B. The fourth routing information that is of a route to the LAN 2 and that is installed by the UPF 2 in the second group session may be specifically represented as follows:

TABLE 4

| Group ID of the target group | Destination node | Route to the destination node |
|---|---|---|
| 1 | 172.168.0.0/16 | IP address of the LSW 2 + VNI |

The group ID of the target group is 1, the destination node is the LAN 2, and the address segment information of the LAN 2 is 172.168.0.0/16. The route from the UPF 2 to the destination node (the LAN 2) includes the IP address of the LSW 2 and the VNI, and the VNI is an identifier of the tunnel between the fourth tunnel interface of the LSW 2 and the seventh tunnel interface of the UPF 2.

In this embodiment of this application, when the service of the 5GVN is to be provided for the first LAN member in the target group, the first routing information delivered by the SMF network element to the first UPF network element carries the address segment information of the LAN. Therefore, the first UPF network element may forward the received first data to the first tunnel interface based on the first routing information, where the destination address of the first data is any address included in the address segment information of the first LAN. It can be learned from the embodiment shown in FIG. 2A that a process of providing the service of the 5GVN for the second LAN member in the target group is also similar. Therefore, when the service of the 5GVN is to be provided for a plurality of LANs included in the target group by using the technical solutions of this application, a UPF network element may determine a corresponding LAN based on an IP address of received data, and then forward the data to the corresponding LAN based on corresponding routing information by using the 5GVN. This implements communication between different LANs in the same data network by using the 5GVN.

In this embodiment of this application, FIG. 2A shows the processes of providing the service of the 5GVN for each of the LAN 1 and the LAN 2 in the target group. It can be learned from the embodiment shown in FIG. 2A that processes of providing services of the 5GVN for different LANs in the target group are similar. In subsequent embodiments, descriptions are provided by using an example in which the service of the 5GVN is to be provided for the first LAN, and this manner is also applicable a case in which the service of the 5GVN is to be provided for another LAN in the target group.

In this embodiment of this application, when delivering routing information to a UPF network element, the SMF network element may send the routing information to the UPF network element in a manner of a request message, and the UPF network element feeds back a response message to the SMF network element, to indicate that establishment of the routing information in a group session of the target group is completed. This manner is merely used as an example for description in subsequent embodiments.

In this embodiment of this application, a VNI is allocated to a tunnel between a UPF network element and a LAN in the target group by using the VXLAN tunneling technology, and the VNI is used to identify the tunnel between the UPF network element and the LAN in the target group. In subsequent embodiments, an implementation in which one VNI is allocated in the 5GVN to identify tunnels between UPF network elements and LANs in the target group is used as an example for description.

In this embodiment of this application, as described in FIG. 2A, when the service of the 5GVN is to be provided for the first LAN, establishment of an N6 tunnel between the first UPF network element and the first LSW is involved; and establishment of an N19 tunnel at a group granularity between UPF network elements is involved, so that the first LAN can perform data communication with another online group member in the target group by using the 5GVN corresponding to the target group. The following provides descriptions with reference to the system architecture in the single-SMF network element mode in FIG. 2B.

1. Establishment of the N6 tunnel between the first UPF network element and the first LAN: Configure the first routing information on the first UPF network element, where the first routing information is used to indicate the first UPF network element to forward the first data whose destination address is any address included in the address segment information of the first LAN to the first tunnel interface through the N6 tunnel.

The SMF network element determines the first UPF network element that provides the service of the 5GVN for the first LAN member. The SMF network element indicates the first UPF network element to establish the N6 tunnel between the first UPF network element and the first LAN, where the N6 tunnel is the tunnel between the fifth tunnel interface of the UPF 1 and the first tunnel interface of the LSW 1 in the LAN 1 shown in FIG. 2B. In this case, the first UPF network element needs to allocate a tunnel identifier to the fifth tunnel interface of the first UPF network element. Then, the SMF network element installs the first routing information on the first UPF network element.

2. Establishment of an N19 tunnel at a group granularity between the first UPF network element and the second UPF network element: Install seventh routing information on the first UPF network element, where the seventh routing information is used to indicate the first UPF network element to forward seventh data whose address is a first online device to the second UPF network element through the N19 tunnel; and install second routing information on the second UPF network element, where the second routing information is used to indicate to forward second data whose destination address is any address included in the address segment information of the first LAN to the first UPF network element through the N19 tunnel, so that the first UPF network element forwards the second data to the first tunnel interface based on the first routing information.

If the SMF network element determines that the first online device in the target group is anchored at the second UPF network element, the SMF network element indicates the first UPF network element to establish the N19 tunnel at a group granularity between the first UPF network element and the second UPF network element. As shown in FIG. 2B, the N19 tunnel is a tunnel between the second tunnel interface of the UPF 1 and a sixth tunnel interface of the UPF 2, the UPF 1 needs to allocate a first TEID to the second tunnel interface, and the UPF 2 needs to allocate a second TEID to the sixth tunnel interface.

Figure 3A:
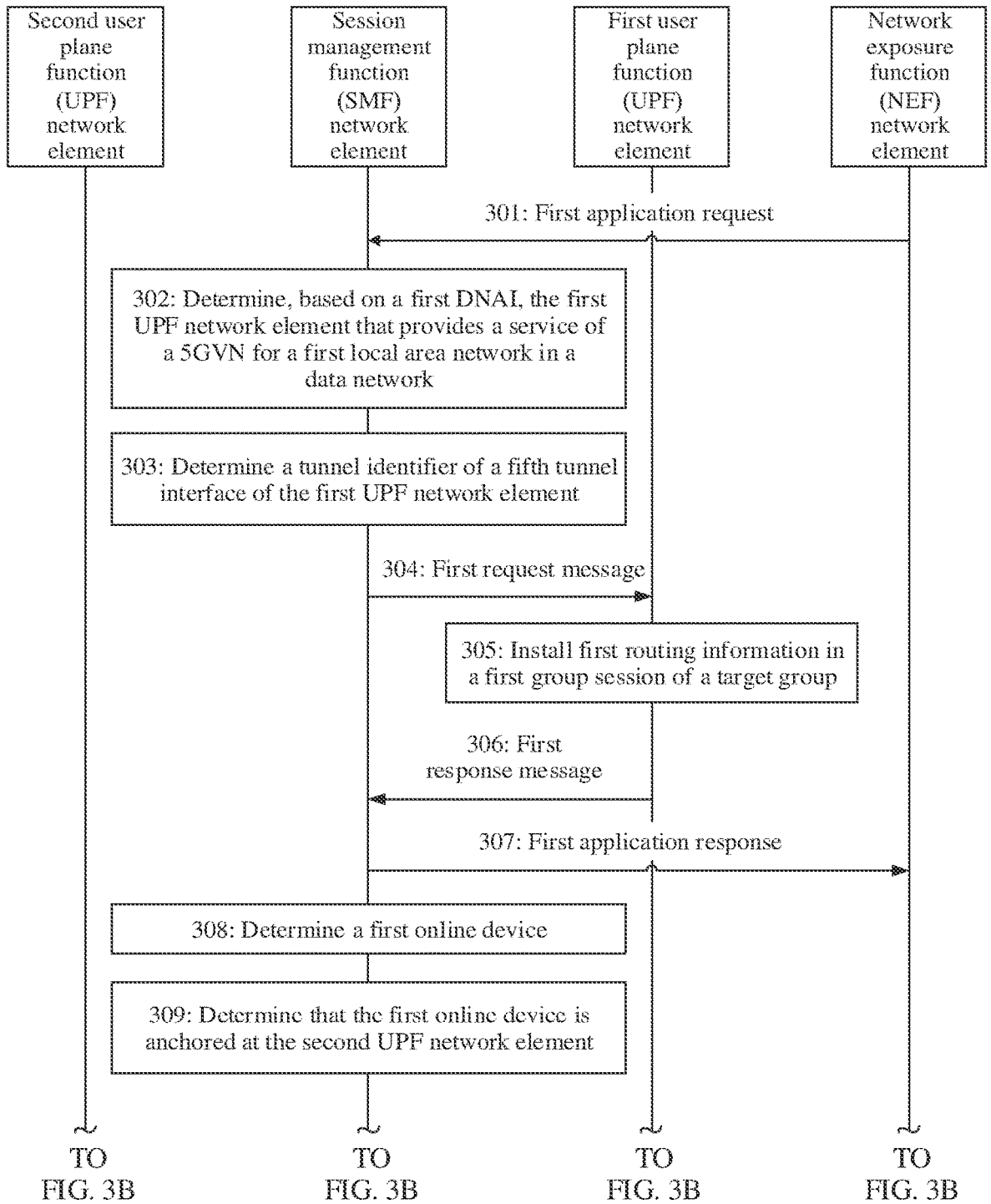
FIG. 3A and FIG. 3B are a schematic diagram of another embodiment of a communication processing method according to an embodiment of this application.
Figure 3B:
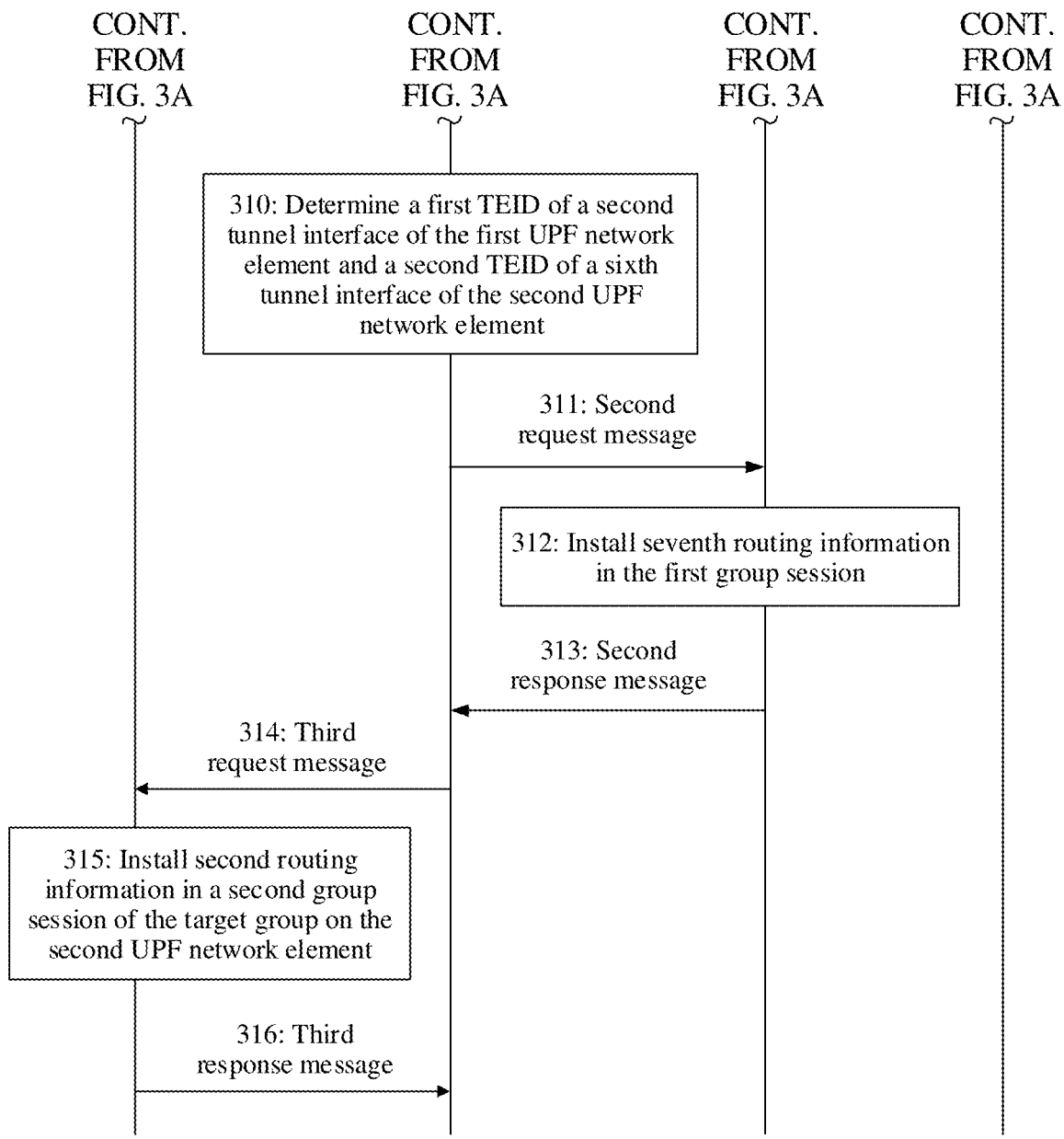

The following provides descriptions with reference to an embodiment shown in FIG. 3A and FIG. 3B. FIG. 3A and FIG. 3B are a schematic diagram of an embodiment of a communication processing method according to an embodiment of this application. In FIG. 3A and FIG. 3B, the method includes the following steps.

301: An NEF network element sends a first application request to an SMF network element.

302: The SMF network element determines, based on a first DNAI, a first UPF network element that provides a service of a 5GVN for a first LAN in a data network.

Step 301 and step 302 are similar to step 201 and step 202 in FIG. 2A. For details, refer to the related descriptions in step 201 and step 202 shown in FIG. 2A. The details are not described herein again.

303: The SMF network element determines a tunnel identifier of a fifth tunnel interface of the first UPF network element.

After determining the first UPF network element at which the first LAN is anchored, the SMF network element indicates the first UPF network element to establish an N6 tunnel between the first UPF network element and a first LSW in the first LAN. For example, as shown in FIG. 2B, the first UPF network element may allocate a tunnel identifier to the fifth tunnel interface on the first UPF network element, that is, use the fifth tunnel interface as one end of the N6 tunnel connected to the first UPF network element, and then notify the SMF network element, so that the SMF network element determines the tunnel identifier of the fifth tunnel interface. In this case, the SMF network element may determine that the N6 tunnel is a tunnel between a first tunnel interface of the first LSW and the fifth tunnel interface of the first UPF network element.

304: The SMF network element sends a first request message to the first UPF network element.

The first request message is used to request to install first routing information in a first group session of a target group on the first UPF network element. The first routing information is used to indicate the first UPF network element to forward received first data to the first tunnel interface. The first request message carries address segment information of the first LAN, an IP address of the first LSW in the first LAN, and a VNI. The VNI is an identifier of the tunnel between the fifth tunnel interface that is on the first UPF network element and that is connected to the first LSW and the first tunnel interface of the first LSW in the first LAN. A destination address of the first data is any address included in the address segment information of the first LAN.

In this embodiment, with respect to a VNI, if the SMF network element determines that a corresponding VNI has been allocated to the target group, the SMF network element directly uses the VNI, and does not need to re-allocate a VNI. If the SMF network element does not allocate a corresponding VNI to the target group, the SMF network element allocates a VNI to the target group, and uses the VNI as the identifier of the tunnel between the first tunnel interface of the first LSW in the first LAN and the fifth tunnel interface on the first UPF network element.

305: The first UPF network element installs the first routing information in the first group session of the target group.

The first request message carries information about the target group to which the first LAN belongs, for example, a group ID of the target group. The first UPF network element determines the target group based on the group ID, and installs the first routing information in the first group session of the target group, where the first routing information includes the address segment information of the first LAN, the IP address of the first LSW in the first LAN, and the VNI.

306: The first UPF network element sends a first response message to the SMF network element.

The first response message is used to indicate that installation of the first routing information in the first group session is completed.

307: The SMF network element sends a first application response to the NEF network element.

The first application response carries an IP address of the first UPF network element and the VNI of the N6 tunnel. The N6 tunnel is the tunnel between the first tunnel interface and the fifth tunnel interface. The VNI is the identifier of the tunnel between the first tunnel interface and the fifth tunnel interface.

308: The SMF network element determines a first online device.

For example, as shown in FIG. 2B, the SMF network element may determine that first online devices in the target group include a 3GPP terminal device 3 and a second LAN in the data network.

309: The SMF network element determines that the first online device is anchored at a second UPF network element.

As shown in FIG. 2B, the first online devices include the 3GPP terminal device 3 and the second LAN in the data network, and both the first online devices are anchored at the second UPF network element.

310: The SMF network element determines a first TEID of a second tunnel interface of the first UPF network element and a second TEID of a sixth tunnel interface of the second UPF network element.

The SMF network element determines that the first online devices in the target group are anchored at the second UPF network element, and the first LAN is a first group member that is in the target group and that is anchored at the first UPF network element. In this case, the SMF network element indicates the first UPF network element to establish an N19 tunnel at a group granularity between the first UPF network element and the second UPF network element. The first UPF network element determines the second tunnel interface as a local tunnel interface of the N19 tunnel at a group granularity, allocates the first TEID to the second tunnel interface, and then notifies the SMF network element. The second UPF network element determines the sixth tunnel interface as a local tunnel interface of the N19 tunnel, and allocates the second TEID to the sixth tunnel interface. In this case, as shown in FIG. 2B, the N19 tunnel at a group granularity is a tunnel between the second tunnel interface of the first UPF network element and the sixth tunnel interface of the second UPF network element. The SMF network element determines the first TEID of the second tunnel interface and the second TEID of the sixth tunnel interface.

311: The SMF network element sends a second request message to the first UPF network element.

The second request message is used to request to install seventh routing information in the first group session on the first UPF network element. The seventh routing information is used to indicate the first UPF network element to forward received seventh data to the second UPF network element. The second request message carries address segment information of the first online device, an IP address of the second UPF network element, and the second TEID of the sixth tunnel interface. A destination address of the seventh data is an IP address of the first online device.

312: The first UPF network element installs the seventh routing information in the first group session.

The second request message carries information about the target group to which the first online device belongs, for example, a group ID of the target group. The first UPF network element determines the target group based on the group ID, and installs the seventh routing information in the first group session of the target group, where the seventh routing information includes the address segment information of the first online device, the IP address of the second UPF network element, and the second TEID of the sixth tunnel interface. For example, as shown in FIG. 2B, the first online devices include the terminal device 3 and the LAN 2. In this case, the seventh routing information may be represented as shown in Table 5.

TABLE 5

| Group ID of the target group | Destination node | Route to the destination node |
|---|---|---|
| 1 | 172.166.0.3/32 | IP address of the second UPF network element + second TEID of the sixth tunnel interface |
| 1 | 172.167.0.0/16 | IP address of the second UPF network element + second TEID of the sixth tunnel interface |

The destination nodes include the terminal device 3 and the LAN 2, address segment information of the terminal device 3 is 172.166.0.3/32, and address segment information of the LAN 2 is 172.167.0.0/16. The route from the first UPF network element to the first online device includes the IP address of the second UPF network element and the TEID of the sixth tunnel interface.

313: The first UPF network element sends a second response message to the SMF network element.

The second response message is used to indicate that installation of the seventh routing information in the first group session is completed.

314: The SMF network element sends a third request message to the second UPF network element.

The third request message is used to request to install second routing information in a second group session of the target group on the second UPF network element. The second routing information is used to indicate the second UPF network element to forward received second data to the first UPF network element. The second request message carries the address segment information of the first LAN, the IP address of the first UPF network element, and the first TEID of the second tunnel interface of the first UPF network element. A destination address of the second data is any address included in the address segment information of the first LAN.

315: The second UPF network element installs the second routing information in the second group session of the target group on the second UPF network element.

The second routing information includes the address segment information of the first LAN, the IP address of the first UPF network element, and the first TEID of the second tunnel interface of the first UPF network element. For example, as shown in FIG. 2B, the second routing information may be represented as shown in Table 6.

TABLE 6

| Group ID of the target group | Destination node | Route to the destination node |
|---|---|---|
| 1 | 172.167.0.0/16 | IP address of the first UPF network element + first TEID of the second tunnel interface |

The address segment information of the LAN 1 is 172.167.0.0/16. The IP address of the first UPF network element and the first TEID of the second tunnel interface are used by the second UPF network element to forward the second data to the first UPF network element, so that the first UPF network element forwards the second data to the first tunnel interface.

316: The second UPF network element sends a third response message to the SMF network element.

The second response message is used to indicate that installation of the second routing information in the second group session is completed.

It should be noted that, as shown in FIG. 2B, if the terminal device 3 and the second LAN go online after the first LAN, the first online devices do not include the terminal device 3 and the LAN 2, and therefore a UPF network element at which the first online devices are anchored does not include the UPF 2. In this case, the SMF network element does not deliver the second routing information to the UPF 2, and does not deliver the seventh routing information to the UPF 1. When the UPF 2 receives data whose destination address is any address included in the address segment information of the first LAN, if the UPF 2 cannot find routing information corresponding to the data, the UPF 2 reports an unknown-route report to the SMF network element, where the unknown-route report carries an IP address of a terminal device in the first LAN, and the SMF network element delivers the second routing information to the UPF 2, so that the UPF 2 may install the second routing information in a first session, and forward the data to the UPF 1 based on the second routing information.

In this embodiment of this application, in the system architecture in the single-SMF network element mode, when the service of the 5GVN is to be provided for the first LAN in the target group, the first routing information delivered by the SMF network element to the first UPF network element carries the address segment information of the first LAN. Therefore, the first UPF network element may forward the received first data whose destination address is any address included in the address segment information of the first LAN to the first tunnel interface based on the first routing information. The SMF network element delivers the second routing information to the second UPF network element at which the first online device in the target group is anchored, and delivers the seventh routing information to the first UPF network element, where the second routing information carries the address segment information of the first LAN, and the seventh routing information carries the address segment information of the first online device, so that the first UPF network element forwards the seventh data whose destination address is any address included in the address segment information of the first online device to the second UPF network element based on the seventh routing information, and then the second UPF network element forwards the seventh data to the first online device. The second UPF network element forwards the second data whose destination address is any address included in the address segment information of the first LAN to the first UPF network element based on the second routing information. Then, the first UPF network element forwards the second data to the first tunnel interface. This satisfies a requirement of implementing data communication between group members in the target group by using the 5GVN.

Figure 4A:
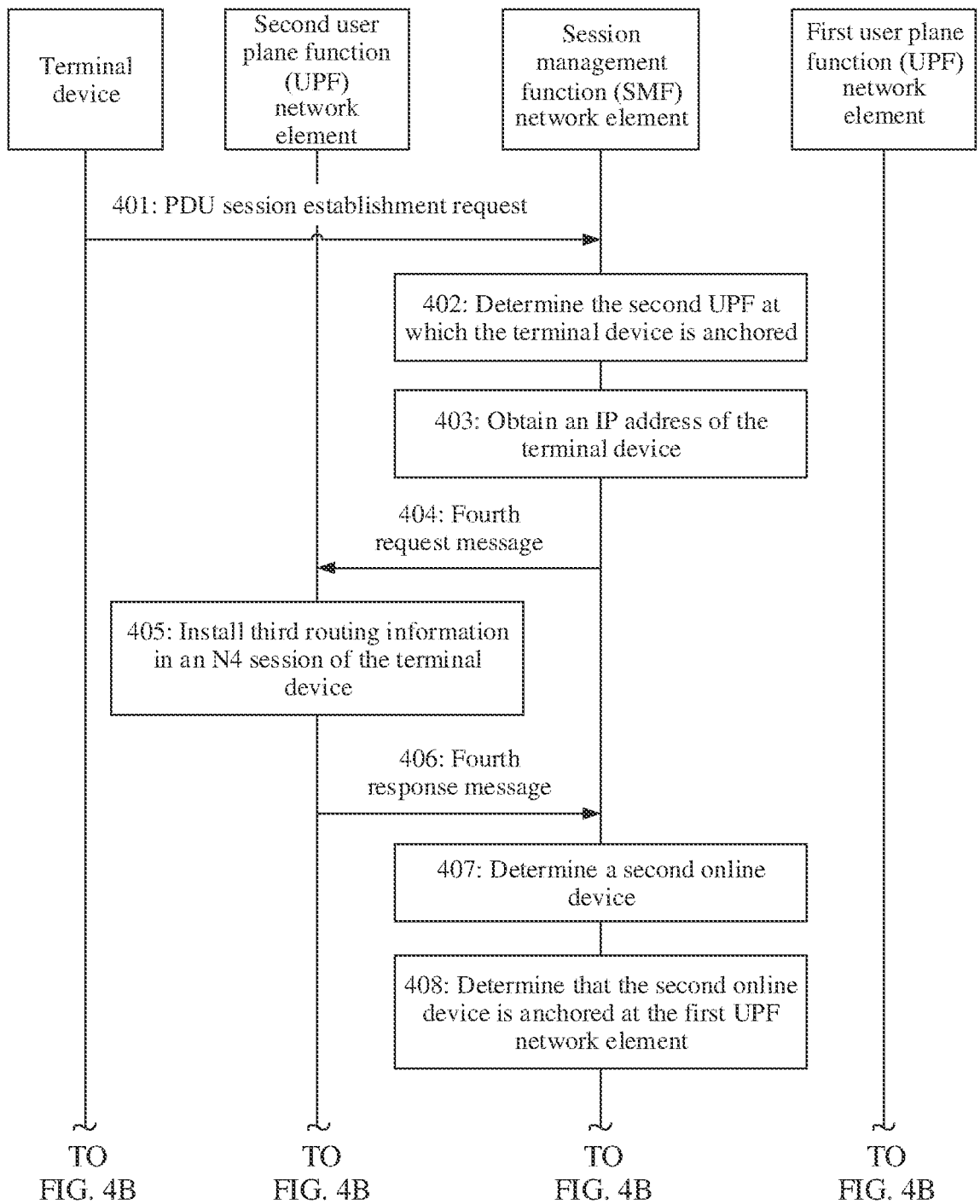
FIG. 4A and FIG. 4B are a schematic diagram of another embodiment of a communication processing method according to an embodiment of this application.
Figure 4B:
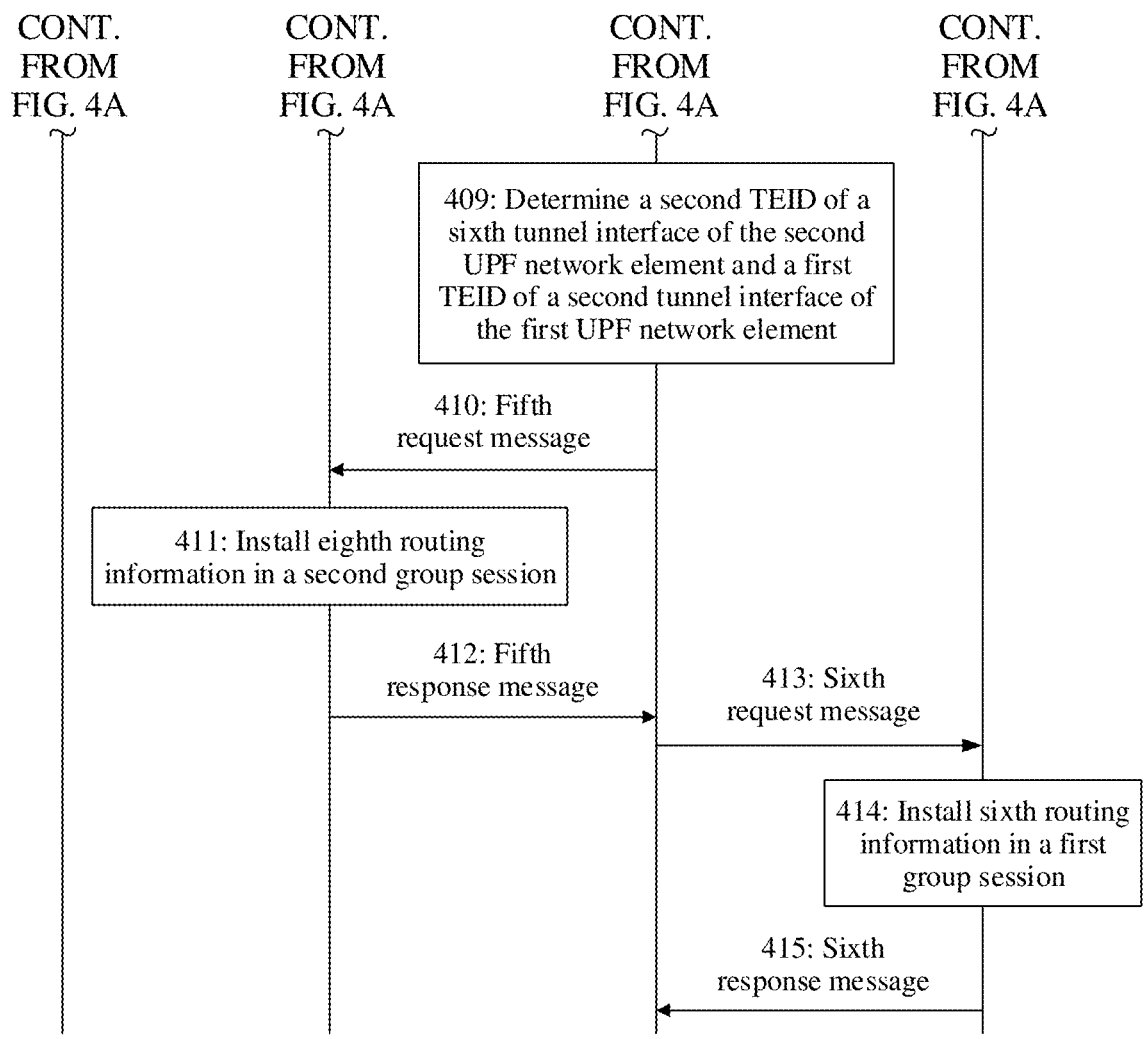

In the embodiment shown in FIG. 3A and FIG. 3B, a process of providing the service of the 5GVN for the first LAN is described based on the system architecture in the single-SMF network element mode. The following describes, by using an embodiment shown in FIG. 4A and FIG. 4B, a process of providing a service of a 5GVN for a 3GPP terminal device in a target group in a system architecture in single-SMF network element mode. As shown in FIG. 4A and FIG. 4B, the method includes the following steps.

401: A terminal device sends a PDU session establishment request to an SMF network element.

402: The SMF network element determines a second UPF network element at which the terminal device is anchored.

The SMF network element allocates the second UPF network element to the terminal device. In other words, a PDU session of the terminal device is anchored at the second UPF network element. For example, as shown in FIG. 2B, the SMF network element determines the UPF 2 at which an online terminal device 3 is anchored.

403: The SMF network element obtains an IP address of the terminal device.

In the system architecture in the single-SMF network element mode, the SMF network element obtains the IP address of the terminal device in the following manners:

1. The SMF network element allocates the IP address to the terminal device.

2. The second UPF network element allocates the IP address to the terminal device, and then sends the IP address of the terminal device to the SMF network element.

404: The SMF network element sends a fourth request message to the second UPF network element.

The fourth request message is used to request the second UPF network element to install third routing information. The third routing information is used to indicate the second UPF network element to forward received third data to the terminal device. A destination address of the third data is the IP address of the terminal device. The third request message carries address segment information of the terminal device. The address segment information of the terminal device includes the IP address of the terminal device and a subnet mask length. For example, as shown in FIG. 2B, an IP address of the terminal device 3 is 172.166.0.1, and a subnet mask of the terminal device 3 is 32 bits. To be specific, address segment information of the terminal device 3 is 172.166.0.1/32.

405: The second UPF network element installs the third routing information in an N4 session of the terminal device.

The second UPF network element establishes an N4 session for the terminal device, where the N4 session is an N4 session at a level of the terminal device. Then, the second UPF network element installs the third routing information in the N4 session. The third routing information includes the address segment information of the terminal device and interface information of a third tunnel interface that is on the second UPF network element and that is connected to the terminal device. The interface information of the third tunnel interface includes an IP address of the second UPF network element and a tunnel identifier of the third tunnel interface. For example, as shown in FIG. 2B, the UPF 2 establishes the third routing information indicating a route to the terminal device 3, as shown in Table 7.

TABLE 7

| Destination node | Route to the destination node |
|---|---|
| 172.166.0.1/32 | IP address of the second UPF network element + tunnel identifier of the third tunnel interface |

The destination node is the terminal device 3, and an address of the destination node is 172.166.0.1/32. The route from a first UPF network element to the destination node (the terminal device 3) includes the IP address of the second UPF network element and the tunnel identifier of the third tunnel interface.

406: The second UPF network element sends a fourth response message to the SMF network element.

The fourth response message is used to indicate that installation of the third routing information in a second group session is completed.

407: The SMF network element determines a second online device.

For example, as shown in FIG. 2B, the SMF determines that online devices in the target group include the LAN 1 and the LAN 2. The LAN 2 is anchored at the first UPF network element, and the third routing information indicating the route to the terminal device 3 has been installed on the first UPF network element. Therefore, the SMF network element can determine that the LAN 1 is the second online device.

408: The SMF network element determines that the second online device is anchored at the first UPF network element.

For example, as shown in FIG. 2B, the LAN 1 is anchored at the UPF 1.

409: The SMF network element determines a first TEID of a second tunnel interface of the first UPF network element and a second TEID of a sixth tunnel interface of the second UPF network element.

Step 409 is similar to step 310 in FIG. 3A and FIG. 3B. For details, refer to the related descriptions in step 310 in FIG. 3A and FIG. 3B. The details are not described herein again.

410: The SMF network element sends a fifth request message to the second UPF network element.

The fifth request message is used to request to install eighth routing information in the second group session of the target group on the second UPF network element. The eighth routing information is used to indicate the second UPF network element to forward received eighth data to the first UPF network element, so that the first UPF network element forwards the eighth data to a first tunnel interface. A destination address of the eighth data is any address included in the address segment information of the first LAN. The fifth request message carries the address segment information of the first LAN, an IP address of the first UPF network element, and the first TEID of the second tunnel interface.

411: The second UPF network element installs the eighth routing information in the second group session.

The second UPF network element determines that the first LAN is a group member in the target group, and then installs the eighth routing information in the second group session of the target group, where the eighth routing information includes the IP address of the first UPF network element and the first TEID of the second tunnel interface. Specifically, with reference to FIG. 2B, the second online device includes the LAN 1, and the eighth routing information may be represented as shown in Table 8.

TABLE 8

| Group ID of the target group | Destination node | Route to the destination node |
|---|---|---|
| 1 | 172.167.0.0/16 | IP address of the first UPF network element + first TEID of the second tunnel interface |

The destination node is the LAN 1, and an address of the destination node is 172.167.0.0/16. The route from the second UPF network element to the destination node (the LAN 1) includes the IP address of the first UPF network element and the first TEID of the second tunnel interface.

412: The second UPF network element sends a fifth response message to the SMF network element.

The fifth response message is used to indicate that installation of the eighth routing information in the second group session is completed.

413: The SMF network element sends a sixth request message to the first UPF network element.

The sixth request message is used to request to install sixth routing information in a first group session on the first UPF network element. The sixth request message carries the address segment information of the terminal device, the IP address of the second UPF network element, and the second TEID of the sixth tunnel interface of the second UPF network element. The sixth routing information is used to indicate the first UPF network element to forward received sixth data to the second UPF network element. A destination address of the sixth data is the IP address of the terminal device. For example, as shown in FIG. 2B, the UPF 1 may forward the received sixth data to a fifth tunnel interface on the UPF 2, and then the UPF 2 forwards the sixth data to the terminal device 3 through a fourth tunnel interface.

414: The first UPF network element installs the sixth routing information in the first group session.

For example, as shown in FIG. 2B, the sixth routing information indicating a route to the terminal device 3 and that is established on the UPF 1 is shown in Table 9.

TABLE 9

| ID of the target group | Destination node | Route to the destination node |
|---|---|---|
| 1 | 172.166.0.1/32 | IP address of the second UPF network element + second TEID of the sixth tunnel interface |

The destination node is the terminal device 3. The route from the first UPF network element to the destination node (the terminal device 3) includes the IP address of the second UPF network element and the second TEID of the sixth tunnel interface.

415: The first UPF network element sends a sixth response message to the SMF network element.

The sixth response message is used to indicate that establishment of the sixth routing information in the first group session on the first UPF network element is completed.

In this embodiment of this application, in the system architecture in the single-SMF network element mode, when the service of the 5GVN is to be provided for the 3GPP terminal device, in a process of initiating the PDU session establishment request to the SMF network element, the terminal device requests to provide the service of the 5GVN for the terminal device. The SMF network element determines that the PDU session of the terminal device is anchored at the second UPF network element, and installs the third routing information indicating a route to the terminal device on the second UPF network element. Then, the SMF network element determines the second online device in the target group, and installs the sixth routing information on the first UPF network element at which the second online device is anchored, where the sixth routing information is used to indicate the first UPF network element to forward the sixth data whose destination address is the terminal device to the second UPF network element. Then, the second UPF network element forwards the sixth data to the terminal device through the third tunnel interface. This implements data communication between the 3GPP terminal device in the target group and another group member in the target group by using the 5GVN.

In this embodiment of this application, as described in FIG. 2A, when the service of the 5GVN is to be provided for the first LAN, establishment of an N6 tunnel between the first UPF network element and the first LSW is involved. In addition, to enable the first LAN to perform data communication with another online group member in the target group by using the 5GVN corresponding to the target group, the following provides descriptions with reference to the system architecture in the multi-SMF network element mode shown in FIG. 2C.

1. Establishment of the N6 tunnel between the first UPF network element and the first LAN: Configure first routing information on the first UPF network element, where the first routing information is used to indicate the first UPF network element to forward first data whose destination address is any address included in the address segment information of the first LAN to the first tunnel interface through the N6 tunnel.

A GSMF network element selects a first SMF network element for the first LAN according to a specific rule, for example, a location of the first LAN. Then, the first SMF network element is responsible for determining a UPF network element at which the first LAN is anchored, and the first SMF network element determines the first UPF network element at which the first LAN is anchored. Then, the first SMF network element indicates the first UPF network element to establish the N6 tunnel between the first UPF network element and the first LAN, where the N6 tunnel is, for example, a tunnel between a fifth tunnel interface of a UPF 1 and a first tunnel interface of an LSW 1 in a LAN 1 shown in FIG. 2C. The first UPF network element allocates the fifth tunnel interface as one end of the N6 tunnel connected to the first UPF network element, allocates a tunnel identifier to the fifth tunnel interface, and notifies the first SMF network element. Then, the SMF network element installs the first routing information on the first UPF network element.

2. Establishment of an N19 tunnel at a group granularity between the first UPF network element and the second UPF network element: Install seventh routing information on the first UPF network element, where the seventh routing information is used to indicate the first UPF network element to forward seventh data whose address is a first online device to the second UPF network element through the N19 tunnel; and install second routing information on the second UPF network element, where the second routing information is used to indicate to forward second data whose destination address is any address included in the address segment information of the first LAN to the first UPF network element through the N19 tunnel, so that the first UPF network element forwards the second data to the first tunnel interface based on the first routing information.

The first SMF network element indicates the first UPF network element to establish an N19 tunnel at a group granularity with another UPF network element in the 5GVN corresponding to the target group. Then, the first UPF network element determines the second tunnel interface of the first UPF network element as a local tunnel interface of the N19 tunnel connected to the first UPF network element, allocates the first TEID to the second tunnel interface, and notifies the first SMF network element. Then, the first SMF network element sends the second routing information to the GSMF network element, where the second routing information is used to indicate the first online device to forward the second data to the first UPF network element. Then, the first UPF network element forwards the second data to the first tunnel interface. Then, the GSMF network element sends the second routing information to a second SMF network element. The second SMF network element determines the second UPF network element at which the first online device is anchored, and indicates the second UPF network element to establish an N19 tunnel at a group granularity with another UPF network element in the 5GVN corresponding to the target group. Then, the second UPF network element allocates the sixth tunnel interface as a local tunnel interface of the N19 tunnel connected to the second UPF network element, and allocates the second TEID to the sixth tunnel interface. As shown in FIG. 2B, the N19 tunnel is the tunnel between the second tunnel interface of the UPF 1 and the sixth tunnel interface of the UPF 2. Then, the first SMF network element installs the second routing information on the second UPF network element, the GSMF network element sends the seventh routing information to the first SMF network element, and the first SMF network element installs the seventh routing information on the first UPF network element.

Figure 5A:
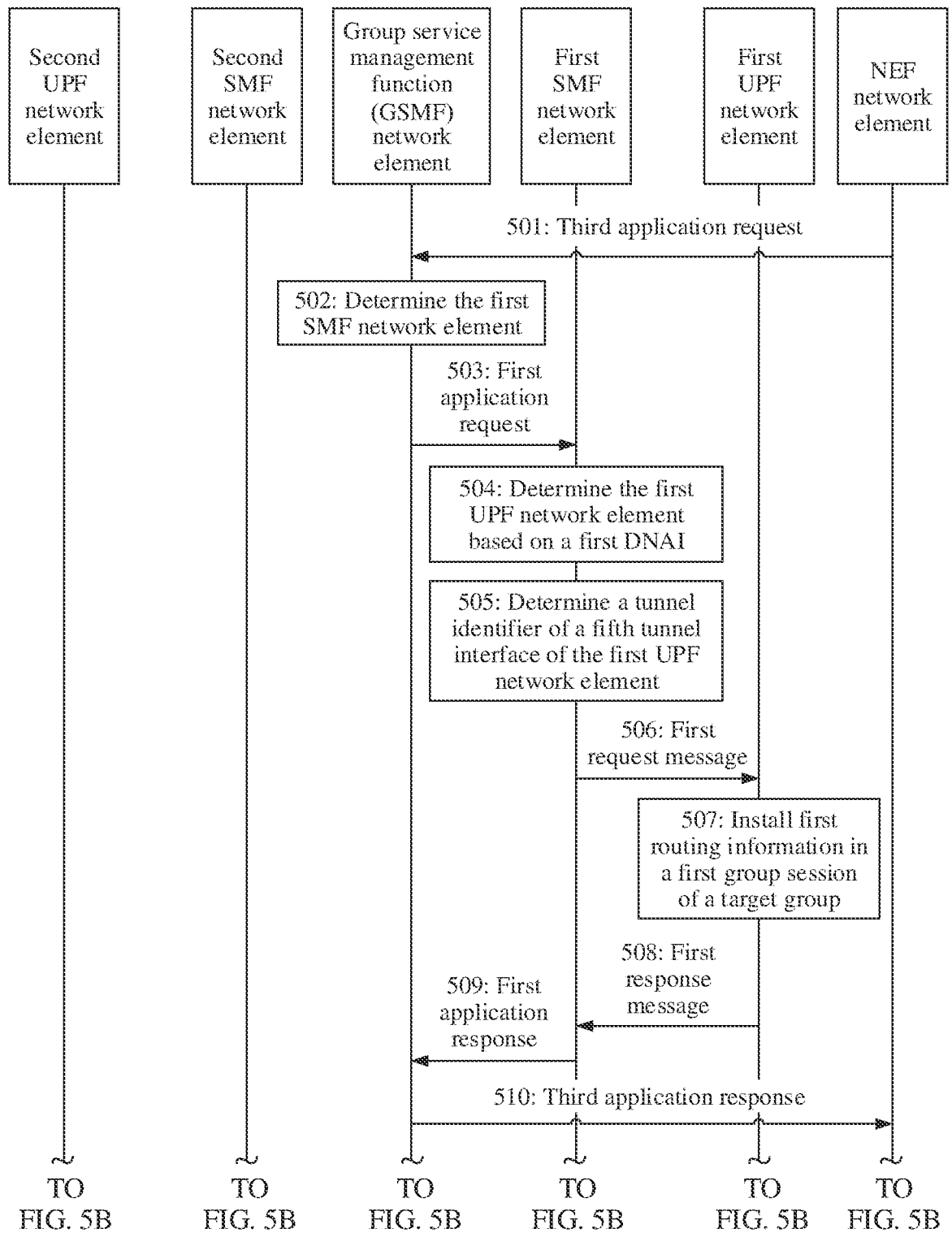
FIG. 5A to FIG. 5C are a schematic diagram of another embodiment of a communication processing method according to an embodiment of this application.
Figure 5B:
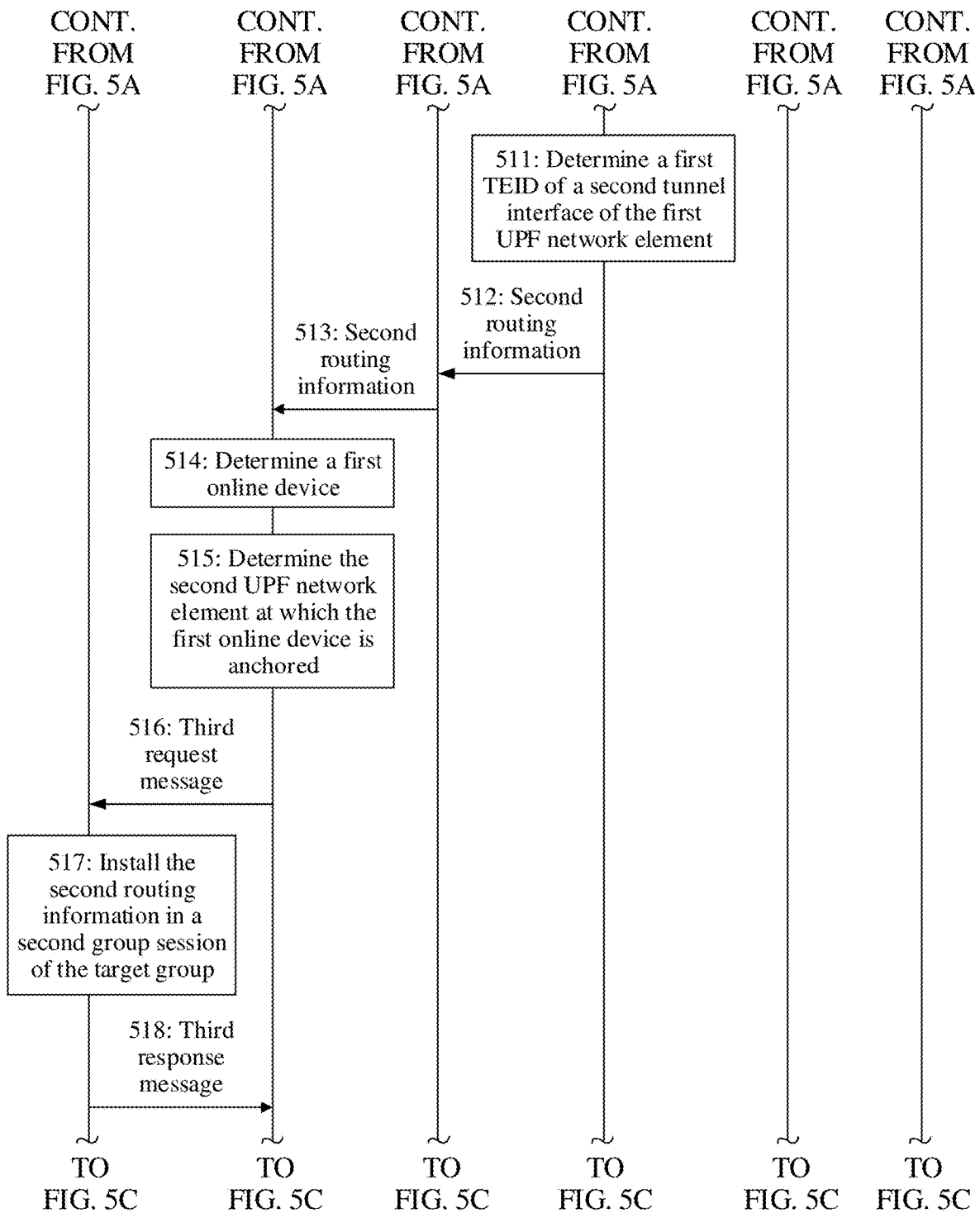
Figure 5C:
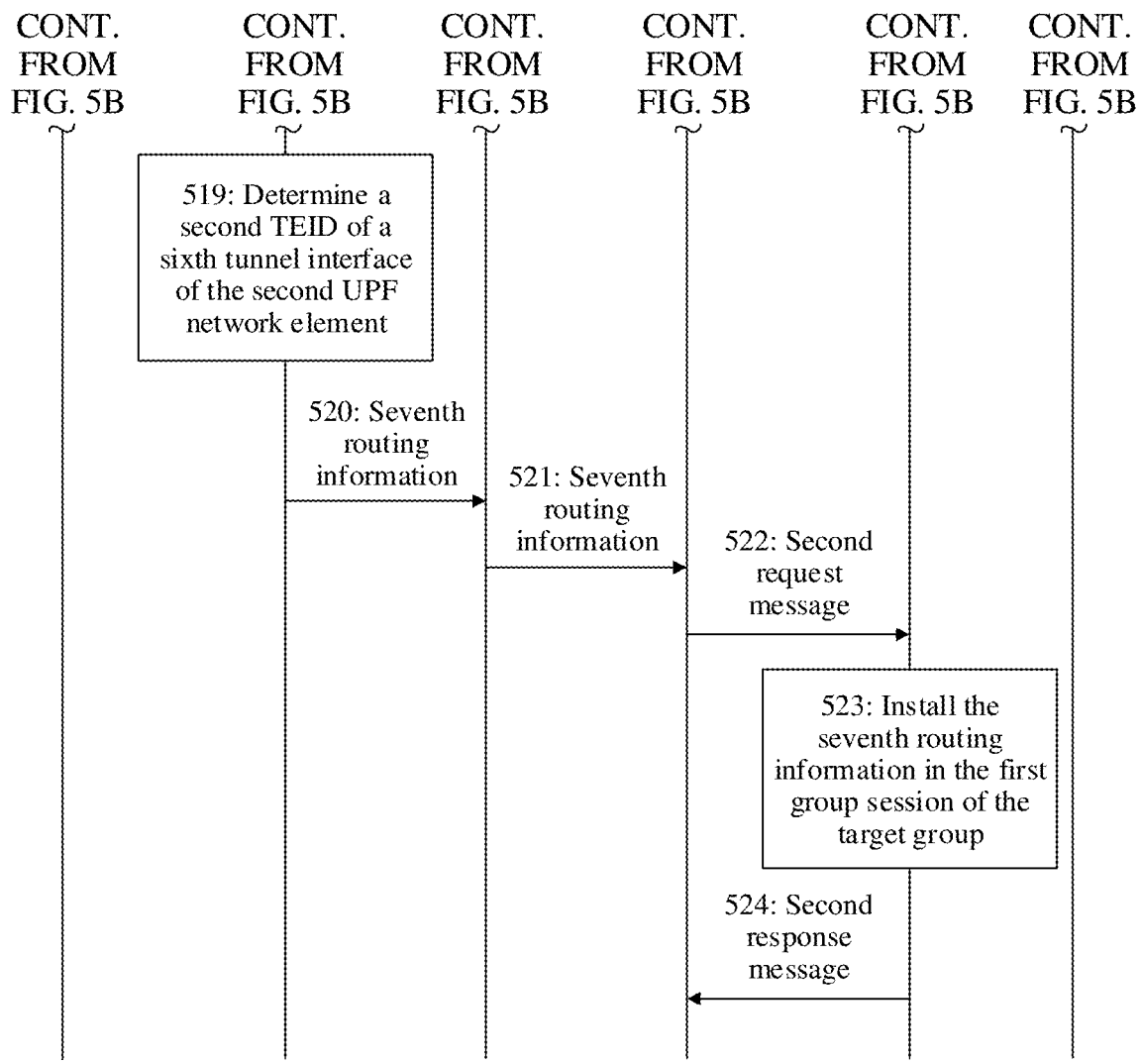

The following provides descriptions with reference to an embodiment shown in FIG. 5A to FIG. 5C. FIG. 5A to FIG. 5C are a schematic diagram of another embodiment of a communication processing method according to an embodiment of this application. In FIG. 5A to FIG. 5C, the method includes the following steps.

501: An NEF network element sends a third application request to a GSMF network element.

The third application request is used to request to provide a service of a 5GVN for a first LAN in a data network. The third application request carries address segment information of the first LAN, information that is about a target group and that corresponds to the first LAN, and interface information of a first tunnel interface of a first LSW in the first LAN. The target group is a group to which the first LAN belongs.

Optionally, the third application request further carries attribute information of the target group, for example, an ID of a slice and a first DNAI of the first LAN. The interface information of the first tunnel interface includes an IP address of the first LSW and a tunnel identifier of the first tunnel interface.

502: The GSMF network element determines a first SMF network element.

Optionally, the GSMF network element determines the first SMF network element based on the first DNAI. Specifically, the GSMF network element determines a region of the first LAN based on the first DNAI. Then, the GSMF network element selects, based on the region of the first LAN, the first SMF network element that is close to the first LAN or the first SMF network element that belongs to the same region as the first LAN, where the first SMF network element is responsible for delivering routing information indicating a route to the first LAN to a corresponding UPF network element.

503: The GSMF network element sends a first application request to the first SMF network element.

The first application request is used to request to provide the service of the 5GVN for the first LAN in the data network. The first application request carries the address segment information of the first LAN, an IP address of the first LSW in the first LAN, and a VNI. The VNI is an identifier of a tunnel between a tunnel interface that is on a first UPF network element and that is connected to the first LSW and the first tunnel interface of the first LSW in the first LAN.

In this embodiment of this application, the GSMF network element may allocate a VNI to a tunnel between a UPF network element and a LAN in the target group by using a VXLAN tunneling technology. If the GSMF network element has allocated a VNI to a tunnel between another LAN and the UPF network element in the target group, the GSMF network element directly uses the VNI, and does not need to re-allocate a VNI. However, if there is no connection between the another LAN and the UPF network element in the 5GVN, the GSMF network element may allocate a VNI to identify a tunnel between the UPF network element and the LAN in the target group.

504: The first SMF network element determines the first UPF network element based on the first DNAI.

505: The first SMF network element determines a tunnel identifier of a fifth tunnel interface of the first UPF network element.

506: The first SMF network element sends a first request message to the first UPF network element.

507: The first UPF network element installs first routing information in a first group session of the target group.

508: The first UPF network element sends a first response message to the first SMF network element.

Step 504 to step 508 are similar to step 302 to step 306 in FIG. 3A and FIG. 3B. For details, refer to the related descriptions in step 302 to step 306 in FIG. 3A and FIG. 3B. The details are not described herein again.

509: The first SMF network element sends a first application response to the GSMF network element.

The first application response is used to indicate that an operation of anchoring the first LAN in the data network at the first UPF network element for providing the service of the 5GVN for the first LAN is completed. The first application response carries an IP address of the first UPF network element and the tunnel identifier of the fifth tunnel interface.

510: The GSMF network element sends a third application response to the NEF network element.

The third application response is used to indicate that an operation in which the NEF network element anchors the first LAN in the data network at the first UPF network element for providing the service of the 5GVN for the first LAN is completed. The third application response carries the IP address of the first UPF network element and the VNI.

511: The first SMF network element determines a first TEID of a second tunnel interface of the first UPF network element.

After the first SMF network element determines the first UPF network element that provides the service of the 5GVN for the first LAN, the first SMF network element may indicate the first UPF network element to establish an N19 tunnel at a group granularity with another UPF network element in the 5GVN corresponding to the target group. In this case, the first UPF network element allocates the first TEID to the second tunnel interface of the first UPF network element, and uses the second tunnel interface as a local tunnel interface of the N19 tunnel at a group granularity. If the first UPF network element has established the N19 tunnel at a group granularity between the first UPF network element and the another UPF network element in the 5GVN corresponding to the target group, the first SMF network element determines the second tunnel interface that is on the first UPF network element and that is connected to the N19 tunnel, and determines the first TEID of the second tunnel interface.

512: The first SMF network element sends second routing information to the GSMF network element.

The second routing information is used to indicate to forward second data to the second tunnel interface of the first UPF network element. A destination address of the second data is any address included in the address segment information of the first LAN. The second routing information includes the address segment information of the first LAN, the IP address of the first UPF network element, and the first TEID of the second tunnel interface.

513: The GSMF network element sends the second routing information to a second SMF network element.

Optionally, the GSMF network element may send the second routing information to the second SMF network element, so that the second online device in the target group in a network managed by the second SMF network element can perform data communication with the first LAN.

It should be noted that, for example, as shown in FIG. 2C, if the LAN 2 has not been anchored at a second UPF network element before the service of the 5GVN is provided for the LAN 1, the GSMF network element may determine to synchronize the second routing information with the second SMF network element side. However, if no online group member in the target group has been anchored at the UPF network element managed by the second SMF network element, the GSMF network element does not synchronize the second routing information with the second SMF network element. In this case, when the second UPF network element receives the second data whose destination address is any address included in the network segment of the first LAN, if the second UPF network element cannot locally find corresponding routing information on the second UPF network element, before step 513 is performed, this embodiment further includes step 513a and step 513b. Step 513a is: The second UPF network element sends an unknown-route report to the second SMF network element, where the unknown-route report carries an IP address in the second data. Step 513b: The GSMF network element receives the unknown-route report of the second UPF network element sent by the second SMF network element.

514: The second SMF network element determines a first online device.

515: The second SMF network element determines that the first online device is anchored at the second UPF network element.

516: The second SMF network element sends a third request message to the second UPF network element.

517: The second UPF network element installs the second routing information in a second group session of the target group.

518: The second UPF network element sends a third response message to the second SMF network element.

Step 514 to step 518 are similar to step 308 and step 309 and step 311 to step 313 in FIG. 3A and FIG. 3B. For details, refer to the related descriptions in step 308 and step 309 and step 311 to step 313 in FIG. 3A and FIG. 3B. The details are not described herein again.

519: The second SMF network element determines a second TEID of a sixth tunnel interface of the second UPF network element.

After the second SMF network element determines the second UPF network element that provides the service of the 5GVN for a second LAN, the second SMF network element may indicate the second UPF network element to establish an N19 tunnel at a group granularity with another UPF network element in the 5GVN corresponding to the target group. If the second UPF network element establishes an N19 tunnel at a group granularity with the first UPF network element, the second UPF network element uses the sixth tunnel interface of the second UPF network element as a local tunnel interface of the N19 tunnel at a group granularity, and allocates the second TEID to the sixth tunnel interface.

520: The second SMF network element sends seventh routing information to the GSMF network element.

The seventh routing information is used to indicate the first UPF network element to forward received seventh data to the second UPF network element. A second request message carries address segment information of the first online device, an IP address of the second UPF network element, and the second TEID of the sixth tunnel interface. A destination address of the seventh data is the IP address of the first online device.

521: The GSMF network element sends the seventh routing information to the first SMF network element.

522: The first SMF network element sends the second request message to the first UPF network element.

523: The first UPF network element installs the seventh routing information in the first group session of the target group.

524: The first UPF network element sends a second response message to the first SMF network element.

Step 522 to step 524 are similar to step 311 to step 313 in FIG. 3A and FIG. 3B. For details, refer to the related descriptions in step 311 to step 313 in FIG. 3A and FIG. 3B. The details are not described herein again.

In this embodiment of this application, in a system architecture in multi-SMF network element mode, when the service of the 5GVN is to be provided for the first LAN in the data network, the first routing information delivered by the first SMF network element to the first UPF network element carries the address segment information of the first LAN. Therefore, the first UPF network element may forward received first data whose destination address is any address included in the address segment information of the LAN to the first tunnel interface based on the first routing information. Then, the second SMF network element delivers the second routing information to the second UPF network element at which the first online device in the target group is anchored. In this case, the second UPF network element may forward the second data whose destination address is any address included in the address segment information of the first LAN to the first UPF network element, and then the first UPF network element forwards the second data to the first tunnel interface. This satisfies a requirement of implementing data communication between group members in the target group by using the 5GVN.

Figure 6A:
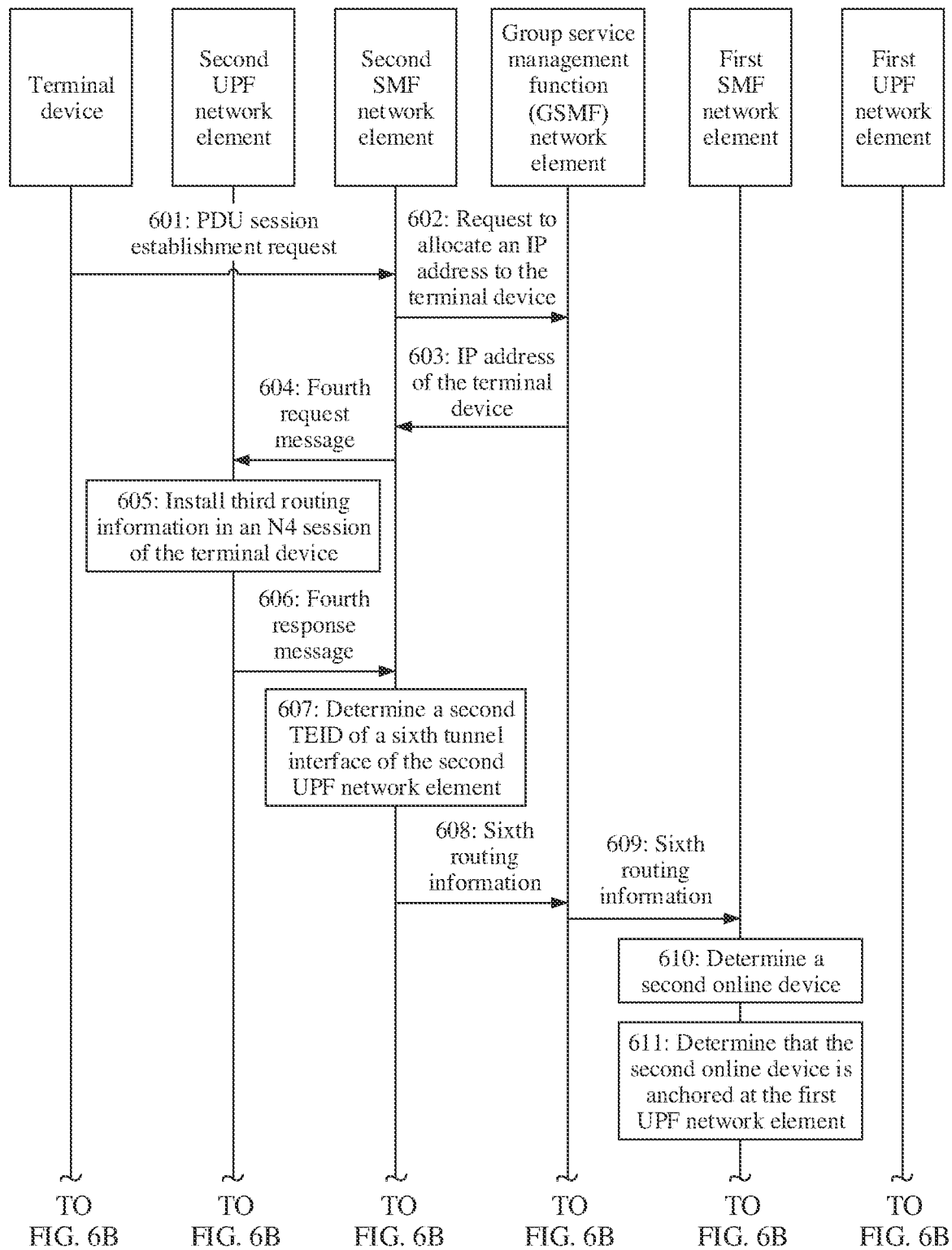
FIG. 6A and FIG. 6B are a schematic diagram of another embodiment of a communication processing method according to an embodiment of this application.
Figure 6B:
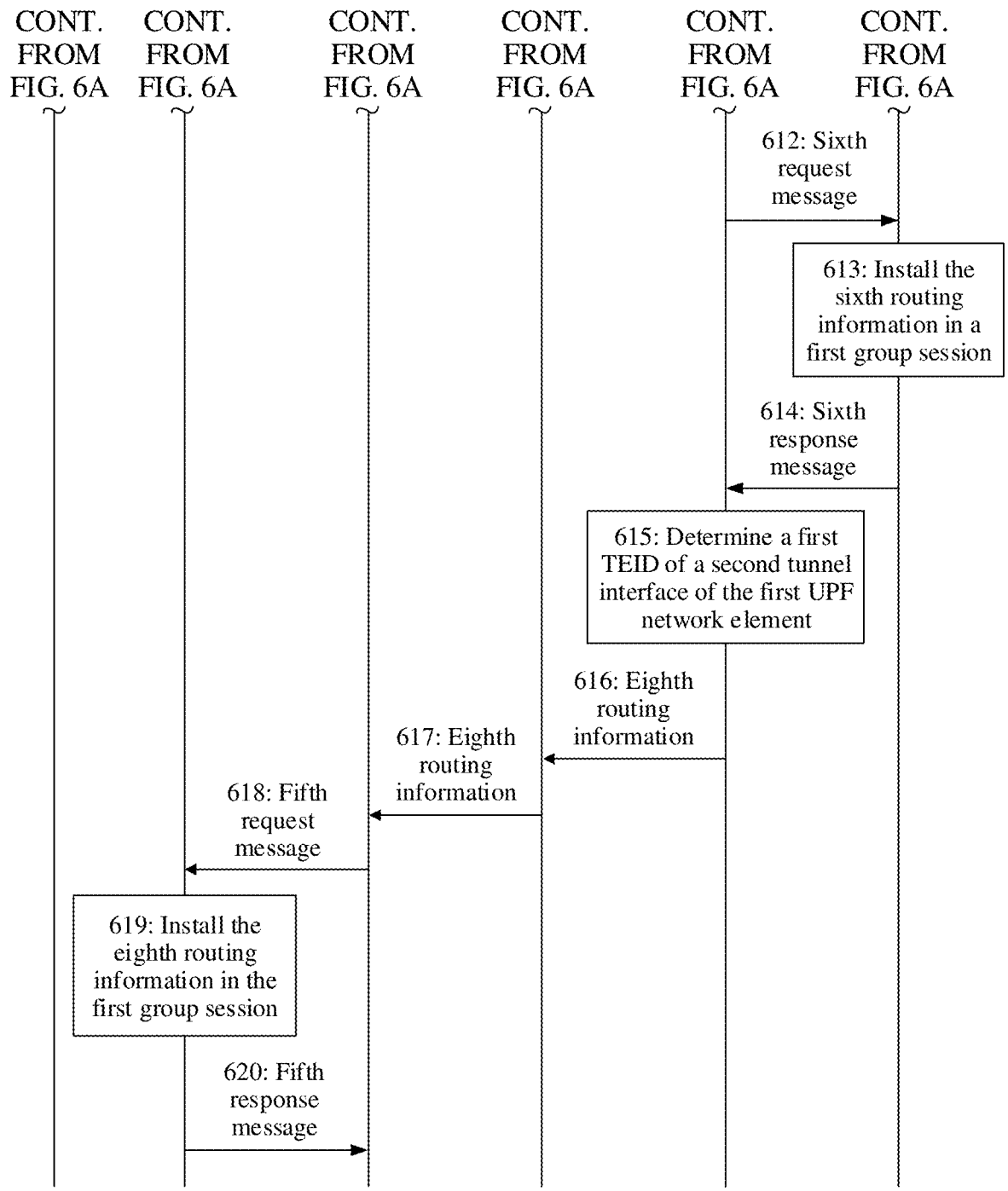

In the embodiment shown in FIG. 5A to FIG. 5C, a process of providing the service of the 5GVN for the first LAN is described based on the system architecture in the multi-SMF network element mode. The following describes, by using an embodiment shown in FIG. 6A and FIG. 6B, a process of providing a service of a 5GVN for a 3GPP terminal device in a target group in a system architecture in multi-SMF network element mode. As shown in FIG. 6A and FIG. 6B, the method includes the following steps.

601: A terminal device sends a PDU session establishment request to a second SMF network element.

602: The second SMF network element requests a GSMF network element to allocate an IP address to the terminal device.

To avoid an IP address conflict that occurs on 3GPP terminal devices in the target group, the second SMF network element may request the GSMF network element to allocate the IP address to the terminal device.

603: The GSMF network element sends the IP address of the terminal device to the second SMF network element.

For example, as shown in FIG. 2C, an IP address of a terminal device 3 is 172.166.0.1.

604: The second SMF network element sends a fourth request message to a second UPF network element.

605: The second UPF network element installs third routing information in an N4 session of the terminal device.

606: The second UPF network element sends a fourth response message to the second SMF network element.

Step 604 to step 606 are similar to step 404 to step 406 in FIG. 4A and FIG. 4B. For details, refer to the related descriptions in step 404 to step 406 in FIG. 4A and FIG. 4B. The details are not described herein again.

607: The second SMF network element determines a second TEID of a sixth tunnel interface of the second UPF network element.

After the SMF network element determines that the terminal device is anchored at the second UPF network element, the SMF network element may indicate the second UPF network element to establish an N19 tunnel at a group granularity with another UPF network element in the 5GVN corresponding to the target group. In this case, the second UPF network element may allocate the sixth tunnel interface of the second UPF network element as one end of the N19 tunnel, allocate the second TEID to the sixth tunnel interface, and then notify the second SMF network element. However, if the second UPF network element has established the N19 tunnel at a group granularity with the another UPF network element in the 5GVN corresponding to the target group, the second SMF network element determines the second TEID of the sixth tunnel interface of the second UPF network element.

608: The second SMF network element sends sixth routing information to the GSMF network element.

The sixth routing information is used to indicate a first UPF network element to forward received sixth data to the second UPF network element. A destination address of the sixth data is the IP address of the terminal device. The sixth routing information includes address segment information of the terminal device, an IP address of the second UPF network element, and the second TEID of the sixth tunnel interface.

609: The GSMF network element sends the sixth routing information to a first SMF network element.

Optionally, the GSMF network element may send the sixth routing information to the first SMF network element, so that a second online device in the target group in a network managed by the first SMF network element can perform data communication with the terminal device by using the 5GVN corresponding to the target group.

610: The first SMF network element determines the second online device.

611: The first SMF network element determines that the second online device is anchored at the first UPF network element.

612: The first SMF network element sends a sixth request message to the first UPF network element.

613: The first UPF network element installs the sixth routing information in a first group session.

614: The first UPF network element sends a sixth response message to the first SMF network element.

Step 610 to step 614 are similar to step 407 and step 408 and step 410 to step 412 in FIG. 4A and FIG. 4B. For details, refer to the related descriptions in step 407 and step 408 and step 410 to step 412 in FIG. 4A and FIG. 4B. The details are not described herein again.

615: The first SMF network element determines a first TEID of a second tunnel interface of the first UPF network element.

After the first SMF network element determines that the second online device is anchored at the first UPF network element, the first SMF network element may indicate the first UPF network element to establish an N19 tunnel at a group granularity with another UPF network element in the 5GVN corresponding to the target group. In this case, the first UPF network element uses the second tunnel interface of the first UPF network element as a local tunnel interface of the N19 tunnel, allocates the first TEID to the second tunnel interface, and then notifies the first SMF network element. However, if the first UPF network element has established the N19 tunnel at a group granularity with the another UPF network element in the 5GVN corresponding to the target group, the first SMF network element determines the first TEID of the second tunnel interface of the first UPF network element.

616: The first SMF network element sends eighth routing information to the GSMF network element.

The eighth routing information is used to indicate the second UPF network element to forward received eighth data to the first UPF network element, so that the first UPF network element forwards the eighth data to a first tunnel interface. A destination address of the eighth data is any address included in address segment information of a first LAN. The eighth routing information includes the address segment information of the terminal device, an IP address of the first UPF network element, and the first TEID of the second tunnel interface.

617: The GSMF network element sends the eighth routing information to the second SMF network element.

618: The second SMF network element sends a fifth request message to the second UPF network element.

619: The second UPF network element installs the eighth routing information in a second group session.

620: The second UPF network element sends a fifth response message to the second SMF network.

Step 618 to step 620 are similar to step 410 to step 412 in FIG. 4A and FIG. 4B. For details, refer to the related descriptions in step 410 to step 412 in FIG. 4A and FIG. 4B. The details are not described herein again.

In this embodiment of this application, in the system architecture in the multi-SMF network element mode, in a process of initiating the PDU session establishment request to the second SMF network element, the terminal device requests to provide the service of the 5GVN for the terminal device. The second SMF network element determines that the PDU session of the terminal device is anchored at the second UPF network element, and installs the third routing information indicating a route to the terminal device on the second UPF network element. Then, the second SMF network element returns the sixth routing information to the GSMF network element. The first SMF network element determined by the GSMF network element delivers the sixth routing information to the first UPF network element, and installs the sixth routing information on the first UPF network element, where the sixth routing information is used to indicate the first UPF network element to forward the sixth data whose destination address is the terminal device to the second UPF network element. The second UPF network element forwards the sixth data to the terminal device through a third tunnel interface. This implements data communication between the 3GPP terminal device in the target group and another group member in the target group by using the 5GVN.

Figure 7:
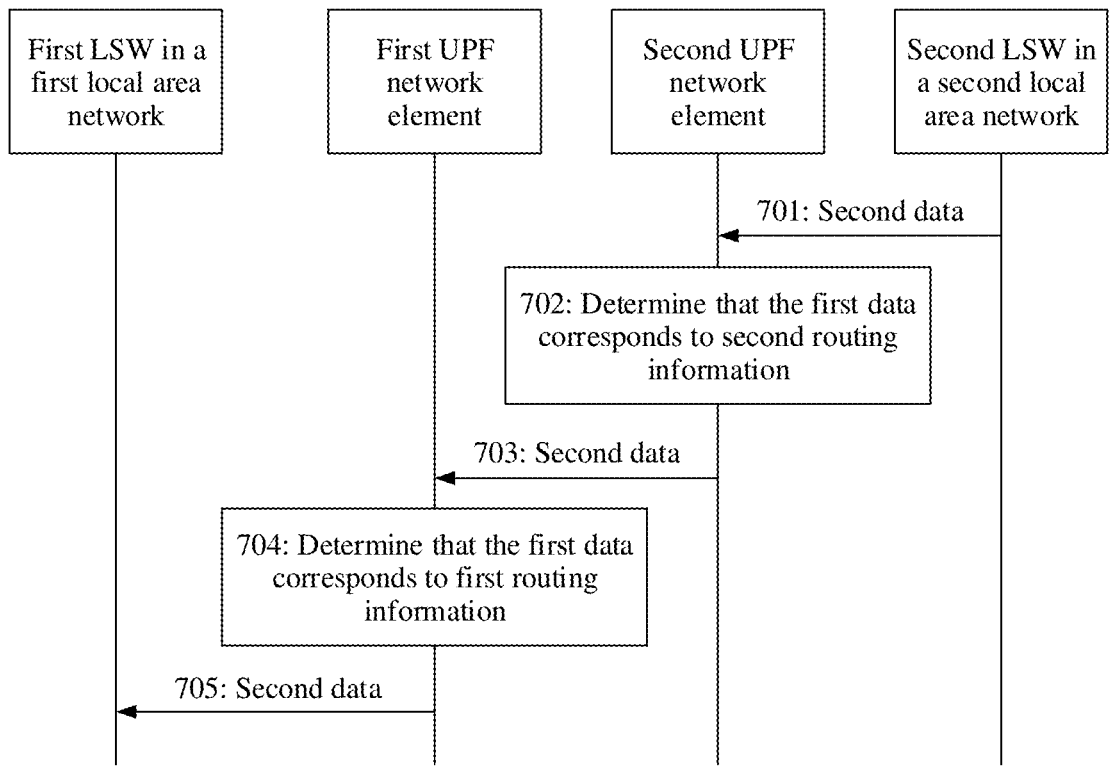
FIG. 7 is a schematic diagram of another embodiment of a communication processing method according to an embodiment of this application.

The foregoing embodiments describe the process of providing the service of the 5GVN for the LAN in the target group in the data network and the process of providing the service of the 5GVN for the 3GPP terminal device in the target group. The following describes, by using an embodiment shown in FIG. 7, a process of performing data communication between different LANs in a target group by using the 5GVN. Refer to FIG. 7. Descriptions are provided by using as an example in which data of a PC 1 in a second LAN is forwarded to a PC 2 in a first LAN in FIG. 7. The method is also applicable to data communication performed between other LANs in the target group by using the 5GVN, and the method includes the following steps.

701: A second LSW in the second LAN sends second data to a second UPF network element.

A destination address of the second data is any address in address segment information of the first LAN. For example, as shown in FIG. 2B, the address segment information of the LAN 1 is 172.167.0.0/16, and the destination address of the second data is 172.167.0.2/32. It can be learned that the destination address of the second data is one of addresses included in the LAN 1. In addition, the LSW 2 in the second LAN stores routing information indicating a route to the UPF 2. Specifically, the NEF network element may send the routing information indicating the route to the UPF 2 to the LSW 2. The second LSW may send the second data to a seventh tunnel interface of the UPF 2 through a fourth tunnel interface based on the routing information indicating the route to the UPF 2.

702: The second UPF network element determines that the second data corresponds to second routing information.

For example, with reference to FIG. 2B and Table 6, the address of the destination node is the address segment information of the LAN 1. The destination address of the second data is 172.167.0.2/32, and therefore the second UPF network element may determine, according to Table 6, that the first data corresponds to the second routing information. The second routing information includes an IP address of a first UPF network element and a first TEID of a second tunnel interface of the first UPF network element.

703: The second UPF network element forwards the second data to the first UPF network element based on the second routing information.

The second UPF network element may encapsulate the second data based on the first TEID of the second tunnel interface, and forward the second data to the second tunnel interface of the first UPF network element.

704: The first UPF network element determines that the second data corresponds to first routing information.

For example, with reference to FIG. 2B, the UPF 1 decapsulates the received second data. Then, it can be learned from Table 3 that the destination node is the address segment information of the LAN 1. The destination address of the second data is 172.167.0.2/32, and therefore the UPF 1 may determine that the second data corresponds to the first routing information. The first routing information includes an IP address of an LSW 1 and a VNI. The VNI is an identifier of a tunnel between a first tunnel interface of the LSW 1 and a fifth tunnel interface of the first UPF network element.

705: The first UPF network element sends the second data to a first LSW in the first LAN.

For example, as shown in FIG. 2B, the UPF 1 determines the fifth tunnel interface of the UPF 1 and the first tunnel interface of the LSW 1 based on the VNI, and then the UPF 1 forwards the second data to the first tunnel interface of the LSW 1 through the fifth tunnel interface.

In this embodiment of this application, the second LSW in the second LAN sends the second data to the second UPF network element, where the destination address of the second data is any address included in the address segment information of the first LAN. Then, the second UPF network element determines that the second data corresponds to the second routing information, and forwards the second data to the second tunnel interface of the first UPF network element based on the second routing information. After receiving the second data, the first UPF network element may determine that the second data corresponds to the first routing information, and sends the second data to the first tunnel interface of the first LSW in the first LAN based on the first routing information. It can be learned that, according to the technical solution of this application, data communication can be performed between different LANs in a same data network by using the 5GVN.

Figure 8:
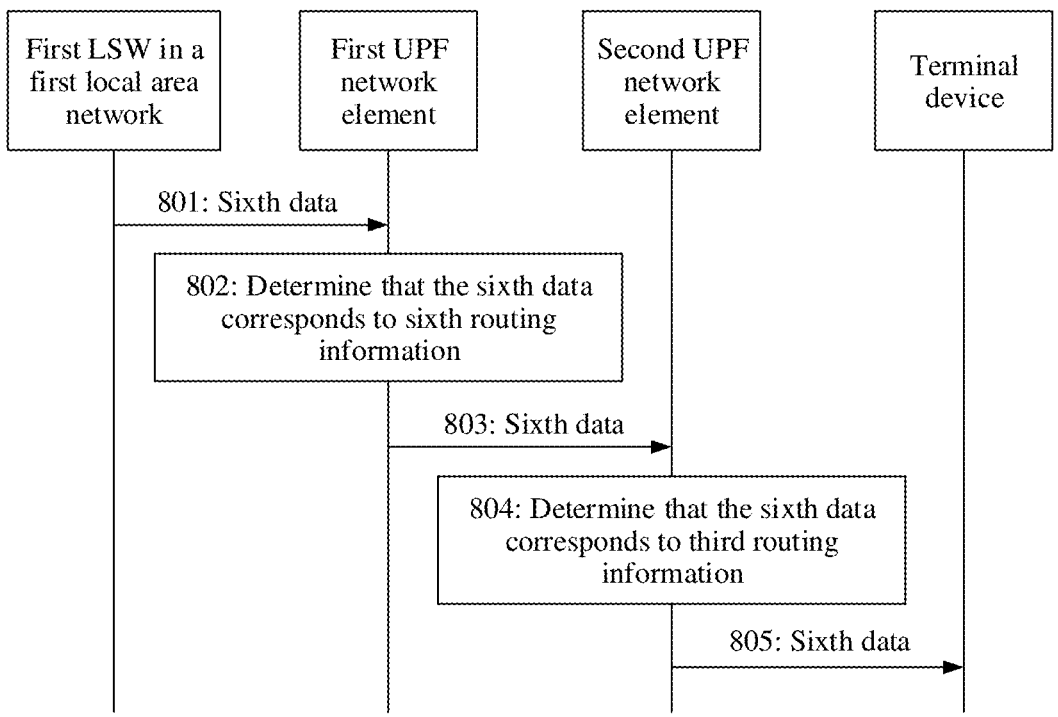
FIG. 8 is a schematic diagram of another embodiment of a communication processing method according to an embodiment of this application.

The following describes, by using an embodiment shown in FIG. 8, a process in which a LAN in a target group performs data communication with a 3GPP terminal device in the target group by using a 5GVN. In FIG. 8, descriptions are provided by using an example in which data of a terminal device in a first LAN is forwarded to a 3GPP terminal device. This is also applicable to data communication between the 3GPP terminal device in the target group and another LAN in the target group. As shown in FIG. 8, the method includes the following steps.

801: A first LSW in the first LAN sends sixth data to a first UPF network element.

A destination address of the sixth data is an IP address of the terminal device. For example, the destination address of the sixth data is 172.166.0.1/32.

For example, as shown in FIG. 2B, the LSW 1 in the LAN 1 stores routing information indicating a route to the UPF 1. Specifically, an NEF network element may deliver the routing information to the LSW 1. The LSW 1 may forward the sixth data to a fifth tunnel interface of the UPF 1 through a first tunnel interface based on the routing information indicating the route to the UPF 1.

802: The first UPF network element determines that the sixth data corresponds to sixth routing information.

With reference to FIG. 2B and Table 9, the address of the destination node is 172.166.0.1/32, and the destination address of the sixth data is 172.166.0.1/32. Therefore, the first UPF network element may determine, according to Table 9, that the sixth data corresponds to the sixth routing information. The sixth routing information includes an IP address of a second UPF network element and a second TEID of a sixth tunnel interface of the second UPF network element.

803: The first UPF network element sends the sixth data to the second UPF network element.

The first UPF network element may encapsulate the sixth data based on the second TEID of the sixth tunnel interface, and forward the encapsulated sixth data to the sixth tunnel interface of the second UPF network element.

804: The second UPF network element determines that the destination address of the sixth data corresponds to third routing information.

After receiving the sixth data, the second UPF network element decapsulates the sixth data, and determines that the sixth data corresponds to the third routing information.

For example, with reference to FIG. 2B and Table 7, the address of the destination node is 172.166.0.1/32, and the destination address of the sixth data is 172.166.0.1/32. Therefore, the second UPF network element may determine, according to Table 7, that the sixth data corresponds to the third routing information. The third routing information includes the IP address of the second UPF network element and a tunnel identifier of a third tunnel interface of the second UPF network element.

805: The second UPF network element sends the sixth data to the terminal device.

For example, as shown in FIG. 2B, the second UPF network element sends the sixth data to the terminal device through the third tunnel interface.

In this embodiment of this application, the first LSW in the first LAN sends the sixth data to the first UPF network element, where the destination address of the sixth data is any address included in address segment information of the first LAN. Then, the first UPF network element determines that the sixth data corresponds to the sixth routing information, and forwards the sixth data to the sixth tunnel interface of the second UPF network element based on the sixth routing information. After receiving the sixth data, the second UPF network element may determine that the sixth data corresponds to the third routing information, and forward the sixth data to the terminal device based on the third routing information. It can be learned that data communication can be performed between the terminal device in the LAN in the target group and the 3GPP terminal device by using the 5GVN.

In this embodiment of this application, FIG. 2B is used as an example for description. The UPF 2 receives a data packet, where a destination address of the data packet is 172.167.0.0. As shown in FIG. 2B, a network segment of the terminal device 3 is 172.167.0.0/32. If address segment information of the LAN 2 is 172.167.0.0/16, the destination address of the data packet may be the terminal device 3 or the LAN 2. Therefore, the UPF 2 may use a device with a larger subnet mask as the destination address of the data packet. It can be learned that the subnet mask of the terminal device 3 is greater than the subnet mask of the LAN 2. Therefore, the UPF 2 determines routing information that corresponds to the data packet and that indicates a route from the UPF 2 to the terminal device 3, and forwards the data packet to the terminal device 3 based on the routing information.

Figure 9:
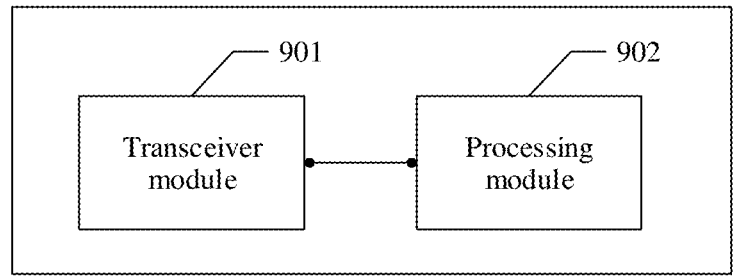
FIG. 9 is a schematic diagram of a structure of a communication processing apparatus according to an embodiment of this application.

The following describes a communication processing apparatus provided in the embodiments of this application. FIG. 9 shows an embodiment of a communication processing apparatus in the embodiments of this application. The communication processing apparatus may be an SMF network element, or a chip or a chip system located on the SMF network element. The communication processing apparatus may be configured to perform the steps performed by the SMF network element in the embodiments shown in FIG. 2A, FIG. 3A and FIG. 3B, and FIG. 4A and FIG. 4B, and further configured to perform the steps performed by the first SMF network element in the embodiments shown in FIG. 5A to FIG. 5C and FIG. 6A and FIG. 6B. For details, refer to the related descriptions in the foregoing method embodiments.

The communication processing apparatus includes a transceiver module 901 and a processing module 902.

The transceiver module 901 is configured to receive a first application request, where the first application request is used to request to provide a service of a 5GVN for a first local area network in a data network, and the first application request carries address segment information of the first LAN, information that is about a target group and that corresponds to the first LAN, and interface information of a first tunnel interface of a first LSW in the first local area network.

The processing module 902 is configured to determine a first UPF network element that provides the service of the 5GVN for the first local area network.

The transceiver module 901 is further configured to send first routing information to the first UPF network element, where the first routing information includes the address segment information of the first LAN and the interface information of the first tunnel interface, the first routing information is used to indicate the first UPF network element to forward received first data to the first tunnel interface, and a destination address of the first data is any address included in the address segment information of the first LAN.

In a possible implementation, the processing module 902 is further configured to: determine a first online device, where the first online device is a device that is in the target group and managed by the SMF network element and that has joined the 5GVN; and determine, by the SMF network element, a second UPF network element at which the first online device is anchored.

The transceiver module 901 is further configured to:
send second routing information to the second UPF network element, where the second routing information is used to indicate the second UPF network element to forward received second data to the first UPF network element, and a destination address of the second data is any address included in the address segment information of the first LAN.

In another possible implementation, the second routing information includes the address segment information of the first LAN, an IP address of the first UPF network element, and a first TEID of a second tunnel interface of the first UPF network element.

In another possible implementation, the processing module 902 is further configured to:
determine that the first LAN is a group member that is in the target group and that is first anchored at the first UPF network element; and
determine the first TEID of the second tunnel interface of the first UPF network element.

In another possible implementation, the first online device includes a terminal device. The transceiver module 901 is further configured to:
receive a PDU session establishment request from the terminal device.

The processing module 902 is further configured to:
determine the second UPF network element at which the terminal device is anchored.

The transceiver module 901 is further configured to:
obtain an IP address of the terminal device; and send third routing information to the second UPF network element, where the third routing information is used to indicate the second UPF network element to forward received third data to the terminal device, and a destination address of the third data is the IP address of the terminal device.

In another possible implementation, the third routing information includes the IP address of the terminal device and interface information of a third tunnel interface that is on the second UPF network element and that is connected to the terminal device.

In another possible implementation, the first online device includes a second LAN in the data network. The transceiver module 901 is further configured to:
receive a second application request, where the second application request is used to request to provide the service of the 5GVN for the second LAN in the data network, and the second application request carries address segment information of the second LAN, the information that is about the target group and that corresponds to the second LAN, and interface information of a fourth tunnel interface of a second LSW in the second LAN; and
send fourth routing information to the second UPF network element, where the fourth routing information is used to indicate the second UPF network element to forward received fourth data to the fourth tunnel interface, a destination address of the fourth data is any address included in the address segment information of the second LAN, and the fourth routing information includes the address segment information of the second LAN and the interface information of the fourth tunnel interface.

In another possible implementation, the processing module 902 is further configured to:
determine a second online device, where the second online device is a device that is in the target group and managed by the communication processing apparatus and that has joined the 5GVN; and
determine a third UPF network element at which the second online device is anchored.

The transceiver module 901 is further configured to:
send fifth routing information to the third UPF network element, where the fifth routing information is used to indicate the third UPF network element to forward received fifth data to the second UPF network element, and a destination address of the fifth data is any address included in the address segment information of the second LAN.

In another possible implementation, the transceiver module 901 is specifically configured to:
receive the first application request sent by an NEF network element, where the first application request further includes a first DNAI of the first LAN.

The processing module 902 is specifically configured to:
determine the first UPF network element based on the first DNAI; and
determine interface information of a fifth tunnel interface that is on the first UPF network element and that is connected to the first LSW in the first LAN.

The transceiver module 901 is further configured to:
send a first application response to the NEF network element, where the first application response includes the interface information of the fifth tunnel interface.

In another possible implementation, the transceiver module 901 is specifically configured to:
receive the first application request sent by a management device, where the first application request further includes a first DNAI of the first LAN.

The processing module 902 is specifically configured to:
determine the first UPF network element based on the first DNAI.

The transceiver module 901 is further configured to:
send a first application response to the management device, where the first application response includes interface information of a fifth tunnel interface that is on the first UPF network element and that is connected to the first LSW in the first LAN.

In this embodiment of this application, the transceiver module 901 receives the first application request, where the first application request is used to request to provide the service of the 5GVN for the first local area network in the data network, and the first application request carries the address segment information of the first LAN, the information that is about the target group and that corresponds to the first LAN, and the interface information of the first tunnel interface of the first LSW in the first local area network. Then, the processing module 902 determines the first UPF network element that provides the service of the 5GVN for the first local area network. The transceiver module 901 sends the first routing information to the first UPF network element, where the first routing information includes the address segment information of the first LAN and the interface information of the first tunnel interface, the first routing information is used to indicate the first UPF network element to forward the received first data to the first tunnel interface, and the destination address of the first data is any address included in the address segment information of the first LAN. It can be learned that, when the service of the 5GVN is to be provided for the first LAN in the target group, the first routing information delivered by the communication processing apparatus to the first UPF network element carries the address segment information of the first LAN. Therefore, the first UPF network element may forward the received first data whose destination address is any address included in the address segment information of the first LAN to the first tunnel interface based on the first routing information. Therefore, when the service of the 5GVN is to be provided for a plurality of LANs included in the target group by using the technical solutions of this application, a UPF network element may determine a corresponding LAN based on an IP address of received data, and then forward the data to the corresponding LAN based on corresponding routing information by using the 5GVN. This implements communication between different LANs in the same data network by using the 5GVN.

Figure 10:
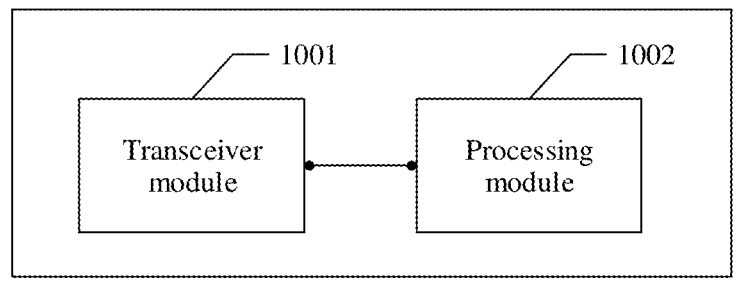
FIG. 10 is a schematic diagram of another structure of a communication processing apparatus according to an embodiment of this application.

The following describes a communication processing apparatus provided in the embodiments of this application. FIG. 10 shows an embodiment of a communication processing apparatus in the embodiments of this application. The communication processing apparatus may be a UPF network element, or a chip or a chip system located on the UPF network element. The communication processing apparatus may be configured to perform the steps performed by the first UPF network element in the embodiments shown in FIG. 2A, FIG. 3A and FIG. 3B, FIG. 4A and FIG. 4B, FIG. 5A to FIG. 5C, and FIG. 6A and FIG. 6B. For details, refer to the related descriptions in the foregoing method embodiments.

The communication processing apparatus includes a transceiver module 1001 and a processing module 1002.

The transceiver module 1001 is configured to: receive first routing information that is sent by an SMF network element for a target group, where the first routing information includes address segment information of a first LAN in a data network and interface information of a first tunnel interface of a first LSW in the first LAN, the first routing information is used to indicate the first UPF network element to forward received first data to the first tunnel interface, a destination address of the first data is any address included in the address segment information of the first LAN, and the target group is a group to which the first LAN belongs.

The processing module 1002 is configured to: determine a first group session corresponding to the target group; and install the first routing information in the first group session.

In a possible implementation, the transceiver module 1001 is further configured to:
receive fifth routing information that is sent by the SMF network element for the target group, where the fifth routing information is used to indicate the first UPF network element to forward received fifth data to a second UPF network element, and a destination address of the fifth data is any address in address segment information of a second LAN in the data network.

The processing module 1002 is further configured to: determine the first group session corresponding to the target group; and install the fifth routing information in the first group session.

In another possible implementation, the fifth routing information includes the address segment information of the second LAN, an IP address of the second UPF network element, and a second TEID of a sixth tunnel interface of the second UPF network element.

In another possible implementation, the transceiver module 1001 is further configured to:

receive, through a fifth tunnel interface of the communication processing apparatus, the fifth data sent by a first terminal device in the first LAN.

The processing module 1002 is further configured to determine that the fifth data corresponds to the fifth routing information.

The transceiver module 1001 is further configured to forward the fifth data to the second UPF network element based on the fifth routing information.

In another possible implementation, the first routing information further includes a first TEID of the fifth tunnel interface of the communication processing apparatus. The processing module 1002 is further configured to:

allocate the first group session to the communication processing apparatus; and allocate the first TEID to the fifth tunnel interface of the communication processing apparatus.

In this embodiment of this application, the transceiver module 1001 receives the first routing information that is sent by the SMF network element for the target group, where the first routing information includes the address segment information of the first LAN in the data network and the interface information of the first tunnel interface of the first LSW in the first LAN, the first routing information is used to indicate the first UPF network element to forward the received first data to the first tunnel interface, the destination address of the first data is any address included in the address segment information of the first LAN, and the target group is the group to which the first LAN belongs. Then, the processing module 1002 determines the first group session corresponding to the target group, and installs the first routing information in the first group session. It can be learned that, according to the communication processing apparatus in this embodiment of this application, the transceiver module 1001 receives the first routing information sent by the SMF network element, and then the processing module 1002 determines the first group session corresponding to the target group, and installs the first routing information in the first group session, so that the communication processing apparatus can forward the first data to the first tunnel interface based on the first routing information.

Figure 11:
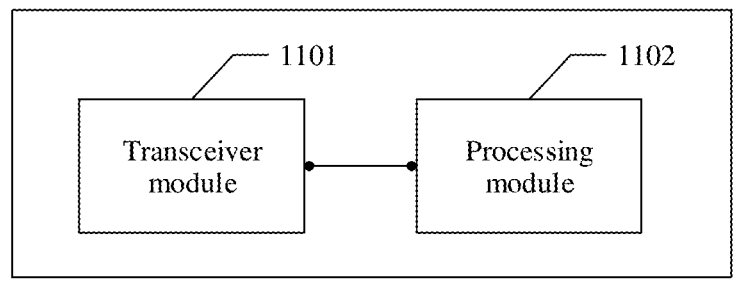
FIG. 11 is a schematic diagram of another structure of a communication processing apparatus according to an embodiment of this application.

The following describes a communication processing apparatus provided in the embodiments of this application. FIG. 11 shows an embodiment of a communication processing apparatus in the embodiments of this application. The communication processing apparatus may be a management device, or a chip or a chip system located on the management device. The communication processing apparatus may be configured to perform the steps performed by the GSMF network element in the embodiments shown in FIG. 5A to FIG. 5C and FIG. 6A and FIG. 6B. For details, refer to the related descriptions in the foregoing method embodiments.

The communication processing apparatus includes a transceiver module 1101. Optionally, the communication processing apparatus further includes a processing module 1102.

The transceiver module 1101 is configured to: send a first application request to a first SMF network element, where the first application request is used to request to provide a service of a 5GVN for a first LAN in a data network, and the first application request carries address segment information of the first LAN, information that is about a target group and that corresponds to the first LAN, and interface information of a first tunnel interface of a first LSW in the first LAN.

The transceiver module 1101 is configured to receive a first application response sent by the first SMF network element, where the first application response is used to indicate that establishment of first routing information in a first group session of the target group on a first UPF network element is completed, the first routing information is used to indicate the first UPF network element to forward received first data to the first tunnel interface, a destination address of the first data is any address included in the address segment information of the first LAN, the first application response carries interface information of a fifth tunnel interface that is on the first UPF network element and that is connected to the first tunnel interface, and the first UPF network element is a UPF network element determined by the first SMF network element and connected to the first tunnel interface.

In a possible implementation, the transceiver module 1101 is further configured to:

receive second routing information sent by the first SMF network element; and send the second routing information to a second SMF network element, where the second routing information is used to indicate a second user plane function network element at which a first online device in the target group is anchored to forward received second data to a second tunnel interface of the first UPF network element, a destination address of the second data is any address included in the address segment information of the first LAN, and the first online device is a device that is in the target group and managed by the second SMF network element and that has joined the 5GVN.

In another possible implementation, the transceiver module 1101 is further configured to:

send a second application request to the second SMF network element, where the second application request is used to request to provide the service of the 5GVN for a second LAN in the data network, and the second application request carries address segment information of the second LAN, the information that is about the target group and that corresponds to the second LAN, and interface information of a fourth tunnel interface of a second LSW in the second LAN; and receive a second application response sent by the second SMF network element, where the second application response is used to indicate that installation of fourth routing information in a second group session of the target group on the second UPF network element is completed, the fourth routing information is used to indicate the second UPF network element to forward received fourth data to the fourth tunnel interface, a destination address of the fourth data is any address included in the address segment information of the second LAN, the second application response carries the address segment information of the second LAN and interface information of a seventh tunnel interface that is on the second UPF network element and that is connected to the fourth tunnel interface, and the second UPF network element is a UPF network element determined by the second SMF network element and connected to the fourth tunnel interface.

In another possible implementation, the transceiver module 1101 is further configured to:

obtain a third application request, where the third application request is used to request to provide the service of the 5GVN for the first LAN in the data network, and the third application request carries the address segment information of the first LAN, the information that is about the target group and that corresponds to the first LAN, and the interface information of the first tunnel interface of the first LSW in the first LAN.

In another possible implementation, the transceiver module 1101 is specifically configured to receive the third application request sent by an NEF network element.

The processing module 1102 is configured to determine the interface information of the fifth tunnel interface.

The transceiver module 1101 is specifically configured to send a third application response to the NEF network element, where the third application response carries the interface information of the fifth tunnel interface.

In this embodiment of this application, the transceiver module 1101 sends the first application request to the first SMF network element, where the first application request is used to request to provide the service of the 5GVN for the first LAN in the data network, and the first application request carries the address segment information of the first LAN, the information that is about the target group and that corresponds to the first LAN, and the interface information of the first tunnel interface of the first LSW in the first LAN. Then, the first SMF network element determines the first UPF network element at which the first LAN is anchored, and installs the first routing information on the first UPF network element. Then, the transceiver module 1101 receives the first application response sent by the first SMF network element, where the first application response is used to indicate that establishment of the first routing information in the first group session of the target group on the first UPF network element is completed, the first routing information is used to indicate the first UPF network element to forward the received first data to the first tunnel interface, the destination address of the first data is any address included in the address segment information of the first LAN, the first application response carries the interface information of the fifth tunnel interface that is on the first UPF network element and that is connected to the first tunnel interface, and the first UPF network element is the UPF network element determined by the first SMF network element and connected to the first tunnel interface. In this way, the first SMF network element is requested, by using the first application request sent by the management device, to select the first UPF network element to provide the service of the 5GVN for the first LAN.

Figure 12:
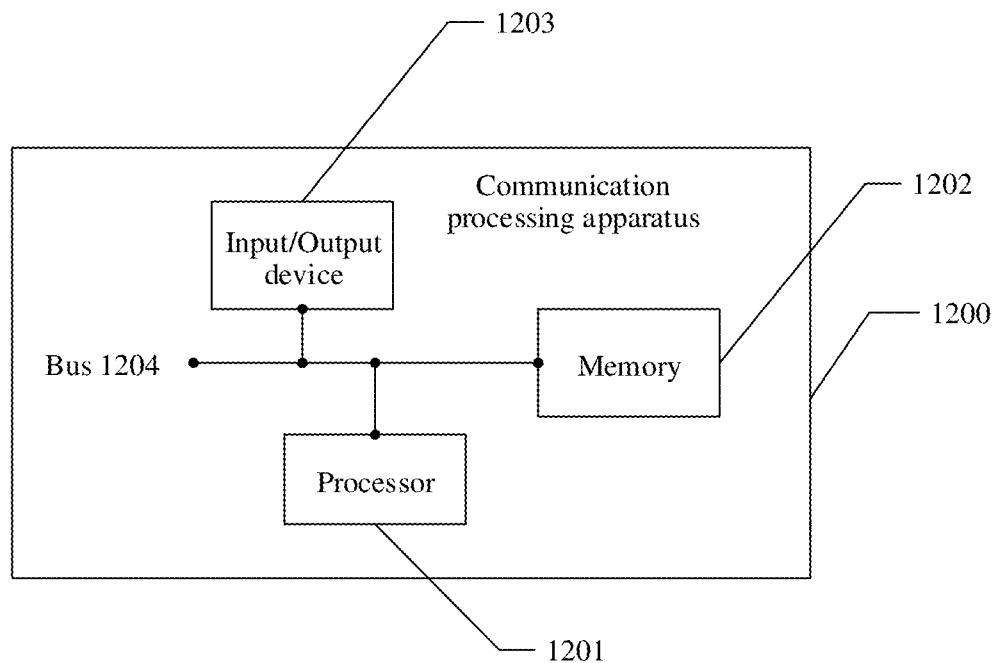
FIG. 12 is a schematic diagram of another structure of a communication processing apparatus according to an embodiment of this application.

This application further provides a communication processing apparatus 1200. FIG. 12 shows an embodiment of the communication processing apparatus in the embodiments of this application. The communication processing apparatus may be an SMF network element, or a chip or a chip system located on the SMF network element. The communication processing apparatus may be configured to perform the steps performed by the SMF network element in the embodiments shown in FIG. 2A, FIG. 3A and FIG. 3B, and FIG. 4A and FIG. 4B, and further configured to perform the steps performed by the first SMF network element in the embodiments shown in FIG. 5A to FIG. 5C and FIG. 6A and FIG. 6B. For details, refer to the related descriptions in the foregoing method embodiments.

The communication processing apparatus 1200 includes a processor 1201, a memory 1202, an input/output device 1203, and a bus 1204.

In a possible implementation, the processor 1201, the memory 1202, and the input/output device 1203 are separately connected to the bus 1204, and the memory stores computer instructions.

The processing module 902 in the foregoing embodiment in FIG. 9 may be specifically the processor 1201 in this embodiment. Therefore, a specific implementation of the processor 1201 is not described again. The transceiver module 901 in the foregoing embodiment in FIG. 9 may be specifically the input/output device 1203 in this embodiment. Therefore, a specific implementation of the input/output device 1203 is not described again.

Figure 13:
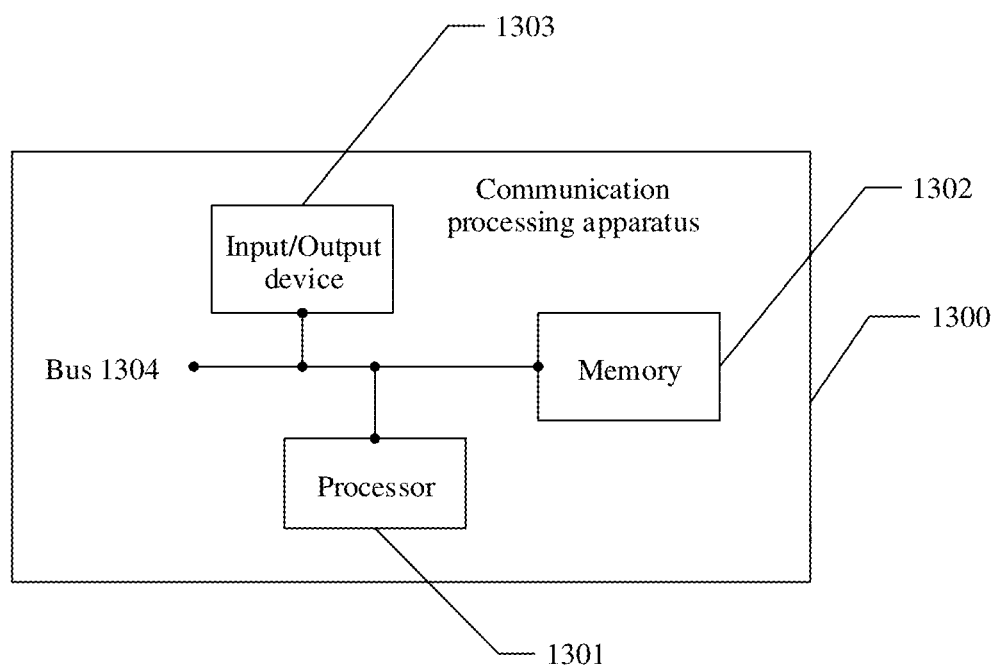
FIG. 13 is a schematic diagram of another structure of a communication processing apparatus according to an embodiment of this application.

This application further provides a communication processing apparatus 1300. FIG. 13 shows an embodiment of the communication processing apparatus in the embodiments of this application. The communication processing apparatus may be a UPF network element, or a chip or a chip system located on the UPF network element. The communication processing apparatus may be configured to perform the steps performed by the first UPF network element in the embodiments shown in FIG. 2A, FIG. 3A and FIG. 3B, FIG. 4A and FIG. 4B, FIG. 5A to FIG. 5C, FIG. 6A and FIG. 6B, FIG. 7, and FIG. 8. For details, refer to the related descriptions in the foregoing method embodiments.

The communication processing apparatus 1300 includes a processor 1301, a memory 1302, an input/output device 1303, and a bus 1304.

In a possible implementation, the processor 1301, the memory 1302, and the input/output device 1303 are separately connected to the bus 1304, and the memory stores computer instructions.

The processing module 1002 in the foregoing embodiment in FIG. 10 may be specifically the processor 1301 in this embodiment. Therefore, a specific implementation of the processor 1301 is not described again. The transceiver module 1001 in the foregoing embodiment in FIG. 10 may be specifically the input/output device 1303 in this embodiment. Therefore, a specific implementation of the input/output device 1303 is not described again.

Figure 14:
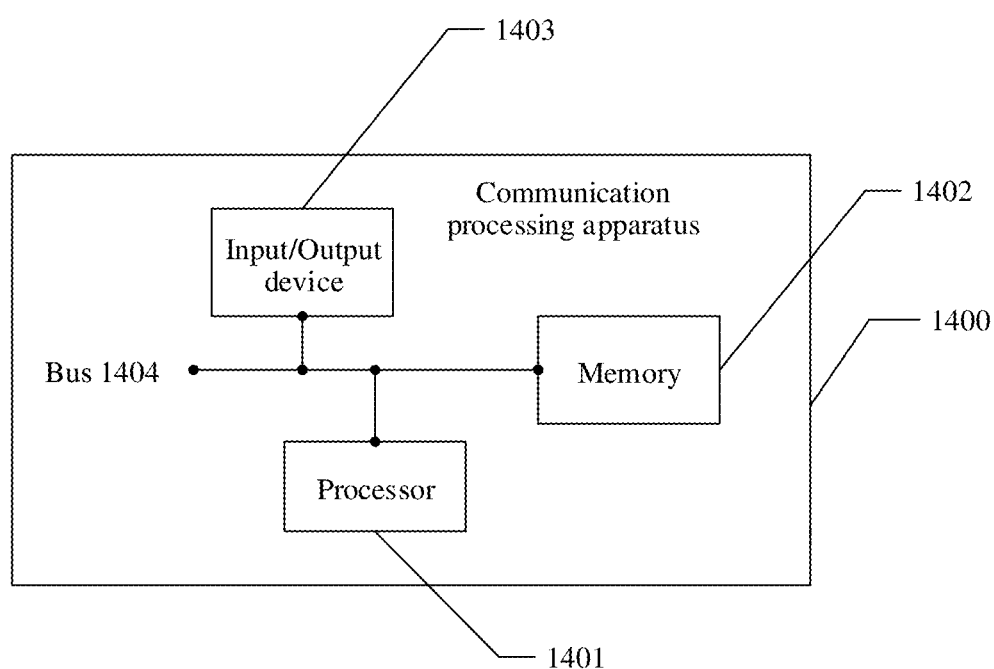
FIG. 14 is a schematic diagram of another structure of a communication processing apparatus according to an embodiment of this application.

This application further provides a communication processing apparatus 1400. FIG. 14 shows an embodiment of the communication processing apparatus in the embodiments of this application. The communication processing apparatus may be a management device, or a chip or a chip system located on the management device. The communication processing apparatus may be configured to perform the steps performed by the GSMF network element in the embodiments shown in FIG. 5A to FIG. 5C and FIG. 6A and FIG. 6B. For details, refer to the related descriptions in the foregoing method embodiments.

The communication processing apparatus 1400 includes a processor 1401, a memory 1402, an input/output device 1403, and a bus 1404.

In a possible implementation, the processor 1401, the memory 1402, and the input/output device 1403 are separately connected to the bus 1404, and the memory stores computer instructions.

The processing module 1102 in the foregoing embodiment in FIG. 11 may be specifically the processor 1401 in this embodiment. Therefore, a specific implementation of the processor 1401 is not described again. The transceiver module 1101 in the foregoing embodiment in FIG. 11 may be specifically the input/output device 1403 in this embodiment. Therefore, a specific implementation of the input/output device 1403 is not described again.

Figure 15:
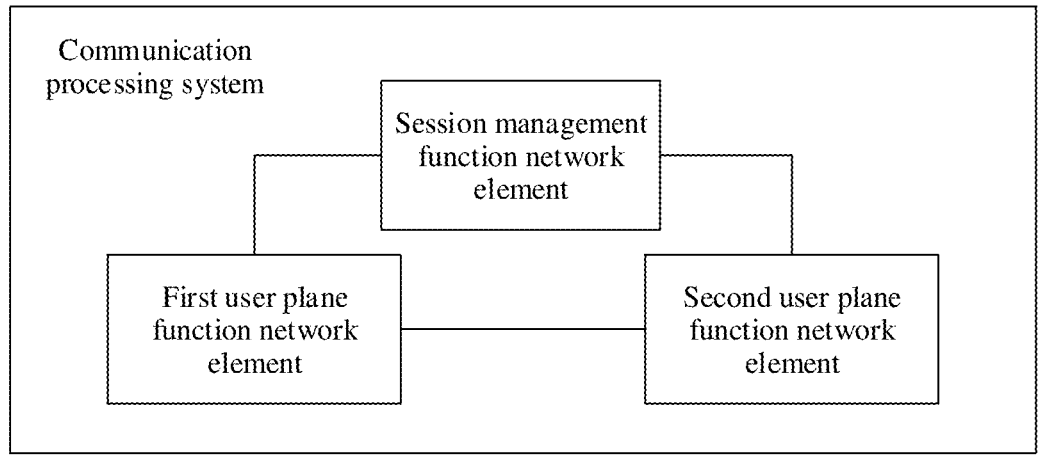
FIG. 15 is a schematic diagram of a structure of a communication processing system according to an embodiment of this application.

Refer to FIG. 15. An embodiment of this application further provides a communication processing system. The communication processing system includes a communication processing apparatus. Specifically, the communication processing apparatus may include an SMF network element and a first UPF network element. Optionally, the communication processing apparatus further includes a second UPF network element. The SMF network element may be configured to perform all or some of the steps performed by the SMF network element in the embodiments shown in FIG. 2A, FIG. 3A and FIG. 3B, and FIG. 4A and FIG. 4B. The first UPF network element is configured to perform all or some of the steps performed by the first UPF network element in the embodiments shown in FIG. 2A, FIG. 3A and FIG. 3B, FIG. 4A and FIG. 4B, FIG. 7, and FIG. 8. The second UPF network element is configured to perform all or some of the steps performed by the second UPF network element in the embodiments shown in FIG. 2A, FIG. 3A and FIG. 3B, FIG. 4A and FIG. 4B, FIG. 7, and FIG. 8.

Figure 16:
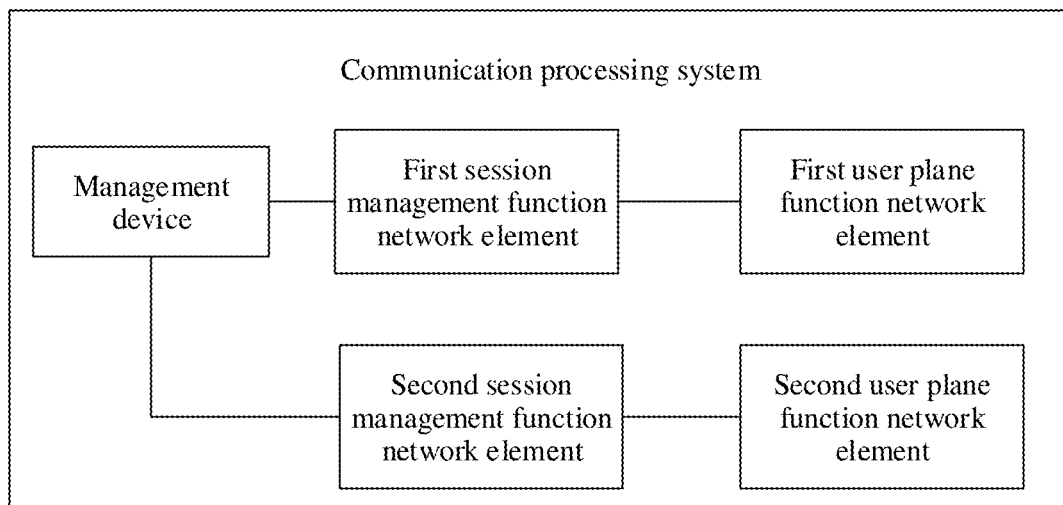
FIG. 16 is a schematic diagram of another structure of a communication processing system according to an embodiment of this application.

Refer to FIG. 16. An embodiment of this application further provides a communication processing system. The communication processing system includes a communication processing apparatus. Specifically, the communication processing apparatus may include a management device, a first SMF network element, and a first UPF network element. Optionally, the communication processing apparatus further includes a second SMF network element and a second UPF network element. The management device may be configured to perform all or some of the steps performed by the GSMF network element in the embodiments shown in FIG. 5A to FIG. 5C and FIG. 6A and FIG. 6B. The first SMF network element is configured to perform all or some of the steps performed by the first SMF network element in the embodiments shown in FIG. 5A to FIG. 5C and FIG. 6A and FIG. 6B. The first UPF network element is configured to perform all or some of the steps performed by the first UPF network element in the embodiments shown in FIG. 5A to FIG. 5C, FIG. 6A and FIG. 6B, FIG. 7, and FIG. 8. The second SMF network element is configured to perform all or some of the steps performed by the second SMF network element in the embodiments shown in FIG. 5A to FIG. 5C and FIG. 6A and FIG. 6B. The second UPF network element is configured to perform all or some of the steps performed by the second UPF network element in the embodiments shown in FIG. 5A to FIG. 5C, FIG. 6A and FIG. 6B, FIG. 7, and FIG. 8.

An embodiment of this application provides a chip system. The chip system includes a processor and an input/output port. The processor is configured to implement the processing functions in the embodiments shown in FIG. 2A, FIG. 3A and FIG. 3B, FIG. 4A and FIG. 4B, FIG. 5A to FIG. 5C, FIG. 6A and FIG. 6B, FIG. 7, and FIG. 8. The input/output port is configured to implement the sending and receiving functions in the embodiments shown in FIG. 2A, FIG. 3A and FIG. 3B, FIG. 4A and FIG. 4B, FIG. 5A to FIG. 5C, FIG. 6A and FIG. 6B, FIG. 7, and FIG. 8.

In a possible design, the chip system further includes a memory. The memory is configured to store program instructions and data that are used to implement the functions in the embodiments shown in FIG. 2A, FIG. 3A and FIG. 3B, FIG. 4A and FIG. 4B, FIG. 5A to FIG. 5C, FIG. 6A and FIG. 6B, FIG. 7, and FIG. 8.

The chip system may include a chip, or may include a chip and another discrete component.

Based on the methods provided in the embodiments of this application, this application further provides a computer program product. The computer program product includes computer program code. When the computer program code is run on a computer, the computer is enabled to perform the method in the embodiment shown in FIG. 2A, FIG. 3A and FIG. 3B, FIG. 4A and FIG. 4B, FIG. 5A to FIG. 5C, FIG. 6A and FIG. 6B, FIG. 7, or FIG. 8.

Based on the methods provided in the embodiments of this application, this application further provides a computer-readable medium. The computer-readable medium stores program code. When the program code is run on a computer, the computer is enabled to perform the method in the embodiment shown in FIG. 2A, FIG. 3A and FIG. 3B, FIG. 4A and FIG. 4B, FIG. 5A to FIG. 5C, FIG. 6A and FIG. 6B, FIG. 7, or FIG. 8.

An embodiment of this application further provides a processing apparatus, including a processor and an interface. The processor is configured to perform the method in any one of the foregoing method embodiments.

It should be understood that the processing apparatus may be a chip. For example, the processing apparatus may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable controller (PLD), or another integrated chip.

In an implementation process, the steps in the foregoing methods may be implemented by using a hardware integrated logic circuit in the processor, or by using instructions in a form of software. The steps of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and implements the steps in the foregoing methods in combination with hardware of the processor. To avoid repetition, details are not described herein again.

It should be noted that, the processor in the embodiments of this application may be an integrated circuit chip, and has a signal processing capability. In an implementation process, the steps in the foregoing method embodiments may be implemented by using a hardware integrated logic circuit in the processor or instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and the logical block diagrams that are disclosed in the embodiments of this application. The general-purpose processor may be a microprocessor, or the processor may be any conventional processor or the like. The steps of the methods disclosed with reference to the embodiments of this application may be directly performed by a hardware decoding processor, or may be performed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and implements the steps in the foregoing methods in combination with hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM). It should be noted that the memories in the systems and methods described in this specification include but are not limited to these memories and any memory of another appropriate type.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The communication processing apparatuses in the foregoing apparatus embodiments completely correspond to the SMF network element, the first UPF network element, and the management device in the method embodiments. Corresponding modules or units perform corresponding steps. For example, a communication unit (a transceiver) performs a receiving or sending step in the method embodiments. Steps other than the sending or receiving step may be performed by a processing unit (processor). For a function of a specific unit, refer to a corresponding method embodiment. There may be one or more processors.

In this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually represents an "or" relationship between associated objects. "At least one of the following items (pieces)" or a similar expression thereof means any combination of these items, including any combination of singular items (pieces) or plural items (pieces). For example, at least one item (piece) of a, b, or c may indicate a, b, c, a and b, a and c, b and c, or a, b, and c, where a, b, and c may be singular or plural.

Persons of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraints of the technical solutions. Persons of ordinary skill in the art may use different methods to implement the described functions for each particular application, but it should not be considered that the implementation goes beyond the scope of this application.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using the figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. The components may communicate with each other by using a local and/or remote process and based on, for example, a signal having one or more data packets (for example, data from two components interacting with another component in a local system or a distributed system and/or across a network such as the internet interacting with other systems by using a signal).

Persons of ordinary skill in the art may be aware that, various illustrative logical blocks (illustrative logical block) and steps (step) that are described with reference to the embodiments disclosed in this specification can be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application. Persons skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed systems, apparatuses, and methods may be implemented in other manners. For example, the foregoing described apparatus embodiments are merely used as examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

In the foregoing embodiments, all or some of the functions of the functional units may be implemented by software, hardware, firmware, or any combination thereof. When software is used to implement the embodiments, all or some of the embodiments may be implemented in a form of a computer program product. The computer program product includes one or more computer instructions (programs). When the computer program instructions (programs) are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A communication processing method, comprising:
receiving, by a session management function network element, a first application request, wherein the first application request includes a request to provide a service of a 5G virtual network for a first local area network in a data network, and the first application request carries address segment information of the first local area network, information that is about a target group and that corresponds to the first local area network, and interface information of a first tunnel interface of a first local switch in the first local area network;
determining, by the session management function network element, a first user plane function network element that provides the service of the 5G virtual network for the first local area network;
sending, by the session management function network element, first routing information to the first user plane function network element, wherein the first routing information includes a request to the first user plane function network element to forward received first data to the first tunnel interface when a destination address of the first data is any address comprised in the address segment information of the first local area network;
determining, by the session management function network element, a first online device, wherein the first online device is a device that is in the target group and managed by the session management function network element and that has joined the 5G virtual network;
determining, by the session management function network element, a second user plane function network element at which the first online device is anchored; and
sending, by the session management function network element, second routing information to the second user plane function network element, wherein the second routing information includes a request to the second user plane function network element to forward received second data to the first user plane function network element when a destination address of the second data is any address comprised in the address segment information of the first local area network.

2. The method according to claim 1, wherein the second routing information comprises the address segment information of the first local area network, an internet protocol (IP) address of the first user plane function network element, and a first tunnel endpoint identifier of a second tunnel interface of the first user plane function network element.

3. The method according to claim 1, wherein the first online device comprises a terminal device; and wherein, before the sending, by the session management function network element, first routing information to the first user plane function network element, the method further comprises:
- receiving, by the session management function network element, a protocol data unit (PDU) session establishment request from the terminal device;
- determining, by the session management function network element, the second user plane function network element at which the terminal device is anchored;
- obtaining, by the session management function network element, an internet protocol (IP) address of the terminal device; and
- sending, by the session management function network element, third routing information to the second user plane function network element, wherein the third routing information includes a request to the second user plane function network element to forward received third data to the terminal device when a destination address of the third data is the IP address of the terminal device.

4. The method according to claim 3, wherein the third routing information comprises the internet protocol (IP) address of the terminal device and interface information of a third tunnel interface that is on the second user plane function network element and that is connected to the terminal device.

5. The method according to claim 1, wherein the first online device comprises a second local area network in the data network; and wherein, before the sending, by the session management function network element, first routing information to the first user plane function network element, the method further comprises:
- receiving, by the session management function network element, a second application request, wherein the second application request includes a request to provide the service of the 5G virtual network for the second local area network in the data network, and the second application request carries address segment information of the second local area network, information about the target group, and interface information of a fourth tunnel interface of a second local switch in the second local area network; and
- sending, by the session management function network element, fourth routing information to the second user plane function network element, wherein the fourth routing information includes a request to the second user plane function network element to forward received fourth data to the fourth tunnel interface when a destination address of the fourth data is any address comprised in the address segment information of the second local area network.

6. The method according to claim 1, wherein the receiving, by a session management function network element, a first application request comprises:
- receiving, by the session management function network element, the first application request sent by a network exposure function (NEF) network element, wherein the first application request further comprises a first data network access identifier (DNAI) of the first local area network;
- the determining, by the session management function network element, a first user plane function network element that provides the service of the 5G virtual network for the first local area network comprises:
- determining, by the session management function network element, the first user plane function network element based on the first DNAI; and the method further comprises:
- determining, by the session management function network element, interface information of a fifth tunnel interface that is on the first user plane function network element and that is connected to the first local switch in the first local area network; and
- sending, by the session management function network element, a first application response to the NEF network element, wherein the first application response comprises the interface information of the fifth tunnel interface.

7. The method according to claim 1, wherein the receiving, by a session management function network element, a first application request comprises:
- receiving, by the session management function network element, the first application request sent by a management device, wherein the first application request further comprises a first data network access identifier (DNAI) of the first local area network;
- the determining, by the session management function network element, a first user plane function network element that provides the service of the 5G virtual network for the first local area network comprises:
- determining, by the session management function network element, the first user plane function network element based on the first DNAI; and the method further comprises:
- sending, by the session management function network element, a first application response to the management device, wherein the first application response comprises interface information of a fifth tunnel interface that is on the first user plane function network element and that is connected to the first local switch in the first local area network.

8. The method according to claim 1, wherein the method further comprises:
- receiving, by the first user plane function network element from the session management function network element, the first routing information;
- determining, by the first user plane function network element, a first group session corresponding to the target group; and
- installing, by the first user plane function network element, the first routing information in the first group session.

9. A communication processing system comprising:
- a session management function network element and a first user plane function network element, wherein
  - the session management function network element is configured to: receive a first application request, wherein the first application request includes a request to provide a service of a 5G virtual network for a first local area network in a data network, and the first application request carries address segment information of the first local area network, information that is about a target group and that corresponds to the first local area network, and interface information of a first tunnel interface of a first local switch in the first local area network; determine the first user plane function network element that provides the service of the 5G virtual network for the first local area network; and send first routing information to the first user plane function network element, wherein the first routing information includes a request to the first user plane function network element to forward received first data to the first tunnel interface when a destination address of the first data is any address comprised in the address segment information of the first local area network; and the first user plane function network element is configured to: receive the first routing information that is sent by the session management function network element for the target group, wherein the target group is a group to which the first local area network belongs; determine, on the first user plane function network element, a first group session corresponding to the target group; and install the first routing information in the first group session; and a second user plane function network element, wherein the session management function network element is further configured to: determine a first online device, wherein the first online device is a device that is in the target group and managed by the session management function network element and that has joined the 5G virtual network; determine that the first online device is anchored at the second user plane function network element; and send second routing information to the second user plane function network element, wherein the second routing information includes a request to second user plane function network element to forward received second data to the first user plane function network element when a destination address of the second data is any address comprised in the address segment information of the first local area network; and the second user plane function network element is configured to: receive the second routing information that is sent by the session management function network element for the target group; determine, on the second user plane function network element, a second group session corresponding to the target group; and install the second routing information in the second group session.

10. The communication processing system according to claim 9, wherein the second routing information comprises the address segment information of the first local area network, an internet protocol (IP) address of the first user plane function network element, and a first tunnel endpoint identifier of a second tunnel interface of the first user plane function network element.

11. The communication processing system according to claim 9, wherein the session management function network element is further configured to determine that the first local area network is a group member that is in the target group and that is first anchored at the first user plane function network element.

12. The communication processing system according to claim 9, wherein the first online device comprises a second local area network in the data network;

the session management function network element is further configured to: receive a second application request, wherein the second application request includes a request to provide the service of the 5G virtual network for the second local area network in the data network, and the second application request carries address segment information of the second local area network, the information that is about the target group and that corresponds to the second local area network, and interface information of a fourth tunnel interface of a second local switch in the second local area network; and send fourth routing information to the second user plane function network element, wherein the fourth routing information includes a request to the second user plane network element to forward received fourth data to the fourth tunnel interface when a destination address of the fourth data is any address comprised in the address segment information of the second local area network; and the second user plane function network element is configured to: receive the fourth routing information that is sent by the session management function network element for the target group; determine a second group session for the target group; and install the fourth routing information in the second group session.

13. A communication processing system comprising a session management function network element and a first user plane function network element, wherein the session management function network element is configured to: receive a first application request, wherein the first application request includes a request to provide a service of a 5G virtual network for a first local area network in a data network, and the first application request carries address segment information of the first local area network, information that is about a target group and that corresponds to the first local area network, and interface information of a first tunnel interface of a first local switch in the first local area network; determine the first user plane function network element that provides the service of the 5G virtual network for the first local area network; and send first routing information to the first user plane function network element, wherein the first routing information includes a request to the first user plane function network element to forward received first data to the first tunnel interface when a destination address of the first data is any address comprised in the address segment information of the first local area network;

the first user plane function network element is configured to: receive the first routing information that is sent by the session management function network element for the target group, wherein the target group is a group to which the first local area network belongs; determine, on the first user plane function network element, a first group session corresponding to the target group; and install the first routing information in the first group session;

a first online device comprises a terminal device;

the session management function network element is further configured to: receive a protocol data unit (PDU) session establishment request from the terminal device; determine a second user plane function network element at which the terminal device is anchored; obtain an internet protocol (IP) address of the terminal device; and send third routing information to the second user plane function network element, wherein the third routing information includes a request to the second user plane function network element to forward received third data to the terminal device, and a destination address of the third data is the IP address of the terminal device; and the second user plane function network element is configured to: receive the third routing information sent by the session management function network element; and install the third routing information, wherein the third routing information comprises the IP address of the terminal device and interface information of a third tunnel interface that is on the second user plane function network element and that is connected to the terminal device.

14. A communication processing apparatus, comprising:
at least one processor; and
a memory coupled to the at least one processor and having program instructions stored thereon which, when executed by the at least one processor, cause the apparatus to:
receive a first application request, wherein the first application request includes a request to provide a service of a 5G virtual network for a first local area network in a data network, and the first application request carries address segment information of the first local area network, information that is about a target group and that corresponds to the first local area network, and interface information of a first tunnel interface of a first local switch in the first local area network;
determine a first user plane function network element that provides the service of the 5G virtual network for the first local area network;
send first routing information to the first user plane function network element, wherein the first routing information includes a request to the first user plane function network element to forward received first data to the first tunnel interface when a destination address of the first data is any address comprised in the address segment information of the first local area network,
determine a first online device, wherein the first online device is a device that is in the target group and managed by the communication processing apparatus and that has joined the 5G virtual network;
determine a second user plane function network element at which the first online device is anchored; and
send second routing information to the second user plane function network element, wherein the second routing information includes a request to the second user plane function network element to forward received second data to the first user plane function network element when a destination address of the second data is any address comprised in the address segment information of the first local area network.

15. The communication processing apparatus according to claim 14, wherein the second routing information comprises the address segment information of the first local area network, an internet protocol (IP) address of the first user plane function network element, and a first tunnel endpoint identifier of a second tunnel interface of the first user plane function network element.

16. The communication processing apparatus according to claim 14, wherein the first online device comprises a terminal device; and wherein the instructions, when executed by the at least one processor, further cause the apparatus to:
receive a protocol data unit (PDU) session establishment request from the terminal device;
determine the second user plane function network element at which the terminal device is anchored;
obtain an internet protocol (IP) address of the terminal device; and
send third routing information to the second user plane function network element, wherein the third routing information includes a request to the second user plane function network element to forward received third data to the terminal device when a destination address of the third data is the IP address of the terminal device.

17. The communication processing apparatus according to claim 16, wherein the third routing information comprises the IP address of the terminal device and interface information of a third tunnel interface that is on the second user plane function network element and that is connected to the terminal device.

18. The communication processing apparatus according to claim 14, wherein the first online device comprises a second local area network in the data network; and wherein the instructions, when executed by the at least one processor, further cause the apparatus to:
receive a second application request, wherein the second application request includes a request to provide the service of the 5G virtual network for the second local area network in the data network, and the second application request carries address segment information of the second local area network, information about the target group, and interface information of a fourth tunnel interface of a second local switch in the second local area network; and
send fourth routing information to the second user plane function network element, wherein the fourth routing information includes a request to the second user plane function network element to forward received fourth data to the fourth tunnel interface when a destination address of the fourth data is any address comprised in the address segment information of the second local area network.

19. The communication processing apparatus according to claim 14, wherein the instructions, when executed by the at least one processor, further cause the apparatus to:
receive the first application request sent by a network exposure function (NEF) network element, wherein the first application request further comprises a first data network access identifier (DNAI) of the first local area network;
determine the first user plane function network element based on the first DNAI;
determine interface information of a fifth tunnel interface that is on the first user plane function network element and that is connected to the first local switch in the first local area network; and
send a first application response to the NEF network element, wherein the first application response comprises the interface information of the fifth tunnel interface.

* * * * *